(12) United States Patent
Kashiwagi

(10) Patent No.: US 11,378,837 B2
(45) Date of Patent: Jul. 5, 2022

(54) OPTICAL SHEET, LIGHT CONTROLLING MEMBER, SURFACE LIGHT SOURCE DEVICE, IMAGE SOURCE UNIT, AND DISPLAY

(71) Applicant: Dai Nippon Printing Co., Ltd., Tokyo (JP)

(72) Inventor: Tsuyoshi Kashiwagi, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 357 days.

(21) Appl. No.: 16/498,786

(22) PCT Filed: Mar. 30, 2018

(86) PCT No.: PCT/JP2018/013792
§ 371 (c)(1),
(2) Date: Sep. 27, 2019

(87) PCT Pub. No.: WO2018/181966
PCT Pub. Date: Oct. 4, 2018

(65) Prior Publication Data
US 2021/0397041 A1    Dec. 23, 2021

(30) Foreign Application Priority Data

Mar. 31, 2017 (JP) .............................. JP2017-073064
May 12, 2017 (JP) .............................. JP2017-096078
Aug. 31, 2017 (JP) .............................. JP2017-166515

(51) Int. Cl.
*G02F 1/1335* (2006.01)
*G02B 3/08* (2006.01)

(52) U.S. Cl.
CPC .. *G02F 1/133526* (2013.01); *G02F 1/133562* (2021.01); *G02B 3/08* (2013.01)

(58) Field of Classification Search
None
See application file for complete search history.

(56) References Cited

U.S. PATENT DOCUMENTS

2006/0104084 A1    5/2006 Amemiya et al.
2006/0238664 A1    10/2006 Uehara et al.
(Continued)

FOREIGN PATENT DOCUMENTS

JP    H11-052377 A1    2/1999
JP    2006-171701 A1    6/2006
(Continued)

OTHER PUBLICATIONS

International Search Report and Written Opinion (Application No. PCT/JP2018/013792) dated Jun. 19, 2018.
(Continued)

*Primary Examiner* — Phu Vu
(74) *Attorney, Agent, or Firm* — Burr & Brown, PLLC

(57) ABSTRACT

To provide an optical sheet that makes it possible to efficiently control a light exiting angle as desired, an optical functional layer has a plurality of light transmissive portions extending in one direction, the light transmissive portions being arranged at intervals in a direction different from the one direction, and a light absorbing portion that is arranged between respective adjacent light transmissive portions, and the optical element layer extends so as to be offset from the one direction at an angle of 0° to 45° in a front view of the optical sheet, the optical element layer having a plurality of unit optical elements that are ridges aligned in a direction different from a direction in which the optical element layer extends.

14 Claims, 35 Drawing Sheets

(56) References Cited

U.S. PATENT DOCUMENTS

| | | | |
|---|---|---|---|
| 2007/0133094 A1 | 6/2007 | Walton et al. | |
| 2010/0245738 A1* | 9/2010 | Nishihara | G02B 5/0236 |
| | | | 349/112 |
| 2010/0271721 A1 | 10/2010 | Gaides et al. | |
| 2011/0128470 A1 | 6/2011 | Yorita et al. | |
| 2011/0146904 A1 | 6/2011 | Kashiwagi et al. | |
| 2012/0320311 A1 | 12/2012 | Gotou et al. | |

FOREIGN PATENT DOCUMENTS

| | | | |
|---|---|---|---|
| JP | 2006-308700 A1 | 11/2006 | |
| JP | 2007-164193 A1 | 6/2007 | |
| JP | 2009-058660 A1 | 3/2009 | |
| JP | 2009-080153 A1 | 4/2009 | |
| JP | 2009-294468 A1 | 12/2009 | |
| JP | 2010-160360 A1 | 7/2010 | |
| JP | 2012-113054 A1 | 6/2012 | |
| JP | 2014-059565 A1 | 4/2014 | |
| JP | 2015-075535 A1 | 4/2015 | |
| JP | 2015-075635 A1 | 4/2015 | |
| JP | 2016-151711 A1 | 8/2016 | |
| JP | 2017-138357 A1 | 8/2017 | |
| JP | 2017-138411 A1 | 8/2017 | |
| JP | 2017-219619 A1 | 12/2017 | |
| WO | 2012/008212 A1 | 1/2012 | |
| WO | WO-2016063732 A1* | 4/2016 | H04N 5/2256 |

OTHER PUBLICATIONS

Extended European Search Report and Written Opinion (Application No. 18777208.2) dated Nov. 25, 2020.

* cited by examiner light exiting angle in vertical direction (°)

light exiting angle in horizontal direction (°)

OPTICAL SHEET, LIGHT CONTROLLING MEMBER, SURFACE LIGHT SOURCE DEVICE, IMAGE SOURCE UNIT, AND DISPLAY

TECHNICAL FIELD

The present invention relates to optical sheets to control an exiting direction of an incident light, and light controlling members, surface light source devices, image source units, and displays including the optical sheet.

BACKGROUND ART

Displays such as monitors for car navigation systems, televisions, and personal computers include an image source from which an image to be displayed exits, and an optical sheet for improving the quality of an image light to give the light on the watcher side.

Exiting directions of an image light are mostly the front, and offset up, down, left, and right from the front. This makes it possible to visually recognize an image shown on a screen from a desired position. Exiting directions of light are also limited as necessary, for example, for preventing peeks.

For example, Patent Literatures 1 to 3 disclose optical sheets to control light exiting angles.

CITED DOCUMENTS

Patent Literature

Patent Literature 1: JP 2006-171701 A
Patent Literature 2: JP 2014-059565 A
Patent Literature 3: JP 2012-113054 A

SUMMARY OF INVENTION

Technical Problem

Diverse devices in recent years have required different or more precise control of an exiting direction of an image light than before. For example, car navigation systems do not always need a wide viewing angle because positions where people seat themselves are almost determined in an automobile, and thus car navigation systems have only to let images exit toward the positions where people are to exist, especially toward a driver. It is, therefore, easier for a driver to watch an image light exiting obliquely upwards than that exiting to the front. An image light exiting too upwards, however, leads to a problem of a reflection of the image in a windshield. Such a light exiting angle is different according to types of automobiles etc., which requires precise control thereof. For example, those patent literatures encompass the following problems:

For example, it is difficult to precisely control a viewing angle using an optical sheet as described in Patent Literature 1. Even if the viewing angle is controlled, the use efficiency of an image light lowers, which is problematic.

For example, an optical sheet as described in Patent Literature 2 gives high exiting performance of an image light in a desired direction, but limits the image light exiting in any other direction. This may lead to a relatively dark outer circumferential portion of a screen compared to its center although the center is bright especially when a display has a large screen. This tendency further notably manifests itself especially when the screen is viewed obliquely from the front.

For example, a technique as described in Patent Literature 3 requires that light transmissive portions and light absorbing portions on the center of the sheet are significantly different from those on the outer circumferential portion thereof in shape, and does not always make it possible to control light precisely. In this case, increased difficulty in production makes it also difficult to give an accurate shape.

An object of the present invention is to provide an optical sheet that makes it possible to efficiently control a light exiting angle as desired, and to provide a light controlling member, a surface light source device, an image source unit, and a display including this optical sheet.

Solution to Problem

Hereinafter the present invention will be described.

One aspect of the present invention is an optical sheet that is made of a plurality of laminated layers, the optical sheet comprising: an optical functional layer that is one of a plurality of the laminated layers; and an optical element layer that is another one of a plurality of the laminated layers, wherein the optical functional layer has a plurality of light transmissive portions extending in one direction, the light transmissive portions being arranged at intervals in a direction different from the one direction, and a light absorbing portion that is arranged between respective adjacent light transmissive portions, and the optical element layer extends so as to be offset from the one direction at an angle of 0° to 45° in a front view of the optical sheet, the optical element layer having a plurality of unit optical elements that are ridges aligned in a direction different from a direction in which the optical element layer extends.

Here, "a front view of the optical sheet" means a point of view when the optical sheet is viewed from a face of the sheet on the light exiting side. "At an angle of 0° to 45° in a front view of the optical sheet" means that the unit optical elements extend so as to be offset from the extending direction of the light transmissive portions (one direction) by 0° to 45° when the optical sheet is viewed in the front view of the optical sheet.

Each of the light transmissive portions may have a trapezoidal cross section, a longer lower base of the trapezoidal cross section facing the unit optical elements.

Each of the unit optical elements may have a main refracting face, a rise face, and a triangular cross section, and the main refracting face may be a face inclining in a direction of a normal line of a light exiting face of the optical functional layer at more than 45° and no more than 89°.

An angle formed by one of the main refracting faces of the unit optical elements and the normal line of the light exiting face of the optical functional layer may be different between a central area of the optical sheet and an outer circumferential area of the optical sheet. Here, the optical element layer may be made of a linear Fresnel lens.

Each of the unit optical elements may have a main refracting face, a rise face, and a triangular cross section, and the main refracting face may incline toward a face of the optical functional layer at more than 0° and less than 17°.

Each of the light transmissive portions may have a trapezoidal cross section, a shorter upper base of the trapezoidal cross section facing the unit optical elements.

A surface of each of the unit optical elements may be formed into a rough face.

$P_{mx}$ may be no more than 10000 (μm) where an aligning pitch of the light transmissive portions is $P_a$ (μm), an aligning pitch of the unit optical elements is $P_o$ (μm), a and b are each integers of 1 to 10, $$P_m = |(a \cdot P_a \cdot b \cdot P_o)/(a \cdot P_a - b \cdot P_o)|, \text{ and}$$

largest $P_m$ obtained by all combinations of a and b for $P_a$ and $P_o$ is $P_{mx}$ (μm).

A surface light source device comprising: a light source; and the optical sheet, which is arranged closer to a watcher than the light source is, may be provided.

A light controlling member, wherein the number of the optical sheets arranged is at least two, and an extending direction of the light transmissive portions of one of the optical sheets and that of the light transmissive portions of another one of the optical sheets cross each other in the front view of the optical sheets may be provided.

A surface light source device comprising: a light source; and the light controlling member, which is arranged closer to a watcher than the light source is, may be provided.

An image source unit comprising: the surface light source device; and a liquid crystal panel that is arranged on a light exiting side of the surface light source device may be provided.

In the image source unit, the light transmissive portions, the light absorbing portion, and the unit optical elements may extend in a horizontal direction, and may be aligned in a vertical direction.

A display comprising: a housing; and the image source unit, which is housed in the housing, may be provided.

Advantageous Effects of Invention

The present invention makes it possible to efficiently control a light exiting angle.

DESCRIPTION OF EMBODIMENTS

Figure 1:
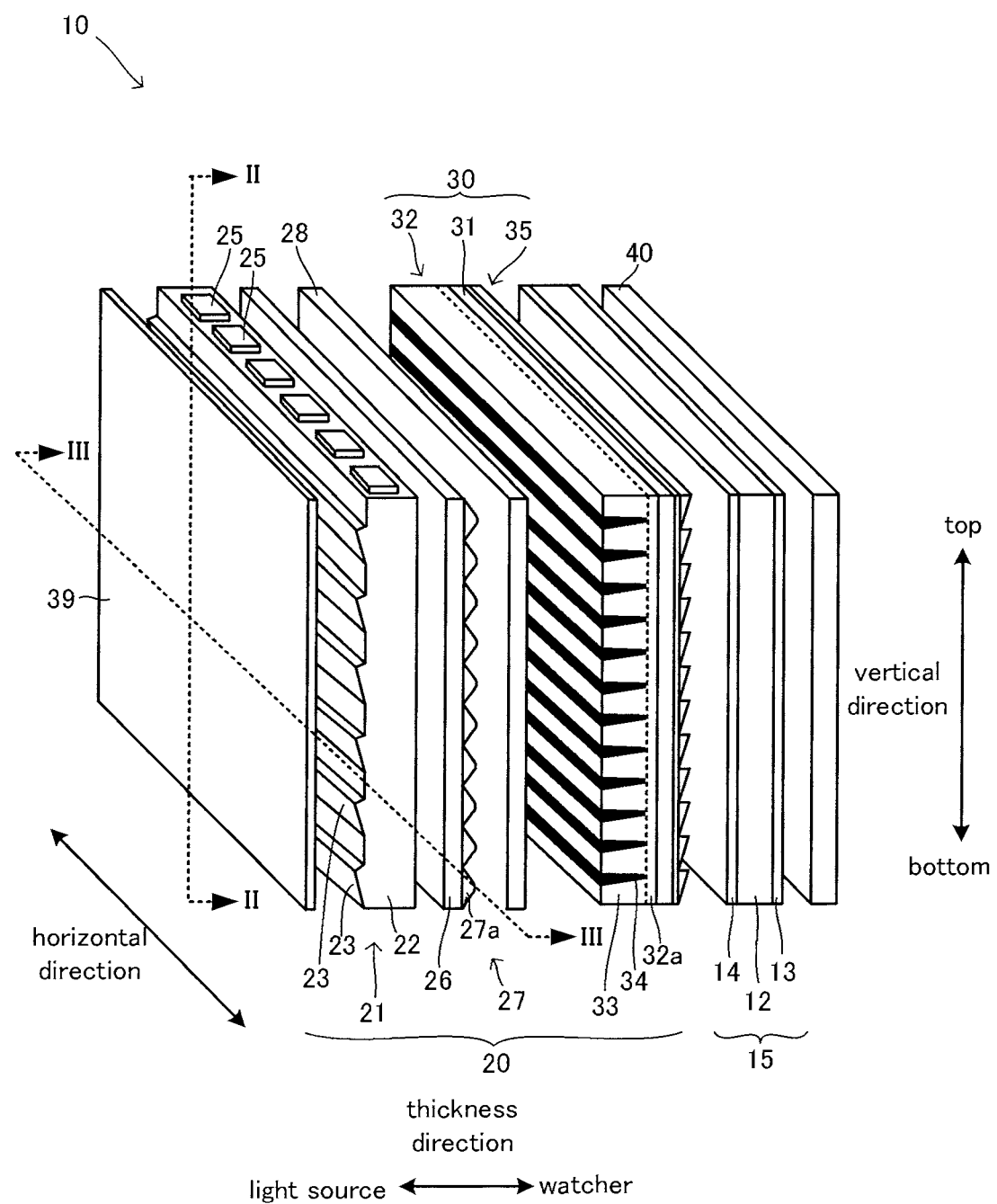
FIG. 1 is an explanatory exploded perspective view of an image source unit 10.

Hereinafter the present invention will be described based on the embodiments shown by the drawings. The present invention is not limited to these embodiments. In the drawings, the shapes may be enlarged, modified, and exaggerated for easy understanding, and the repeating symbols may be partially omitted.

Figure 2:
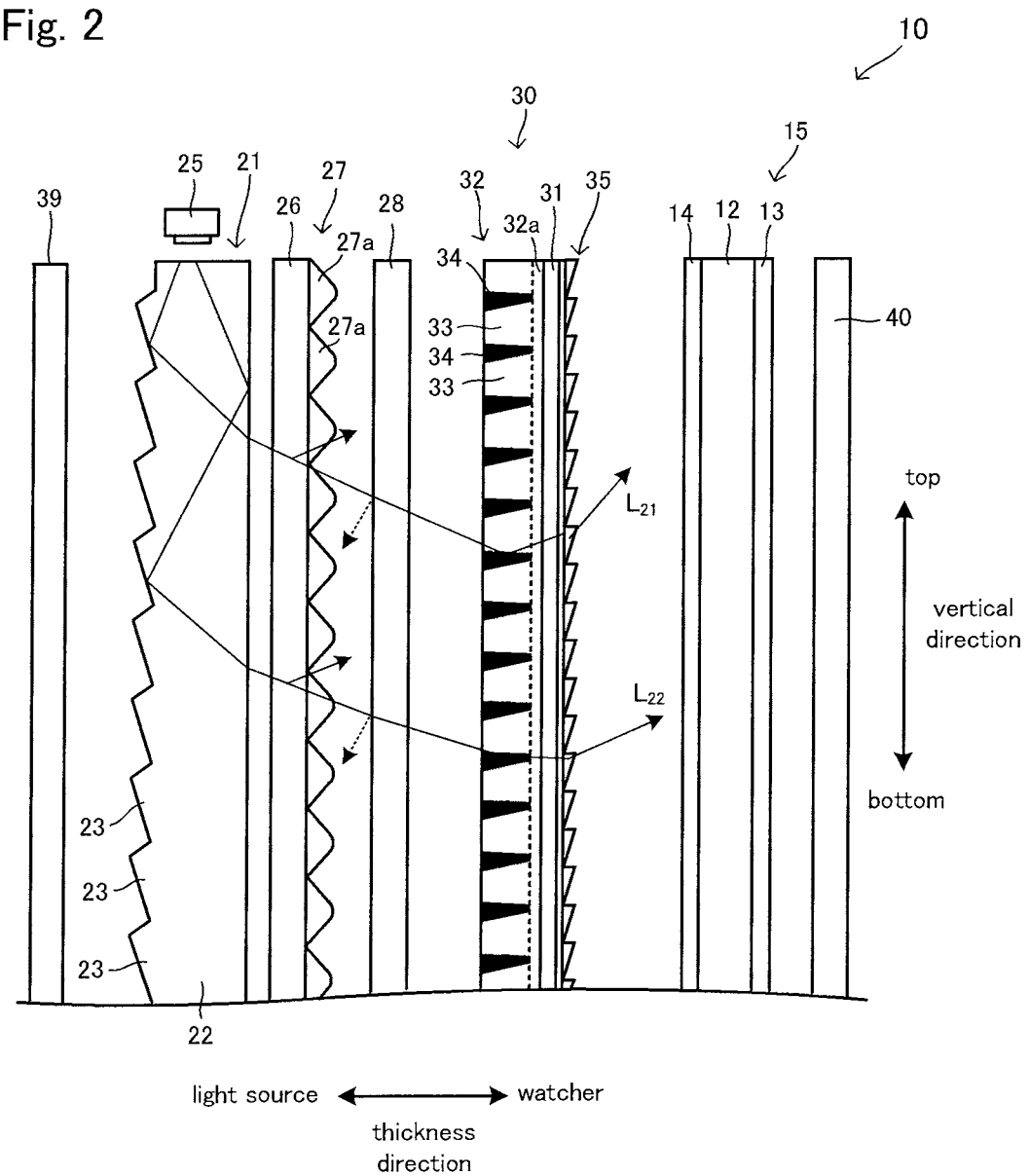
FIG. 2 is an exploded view showing a cross section of the image source unit 10.
Figure 3:
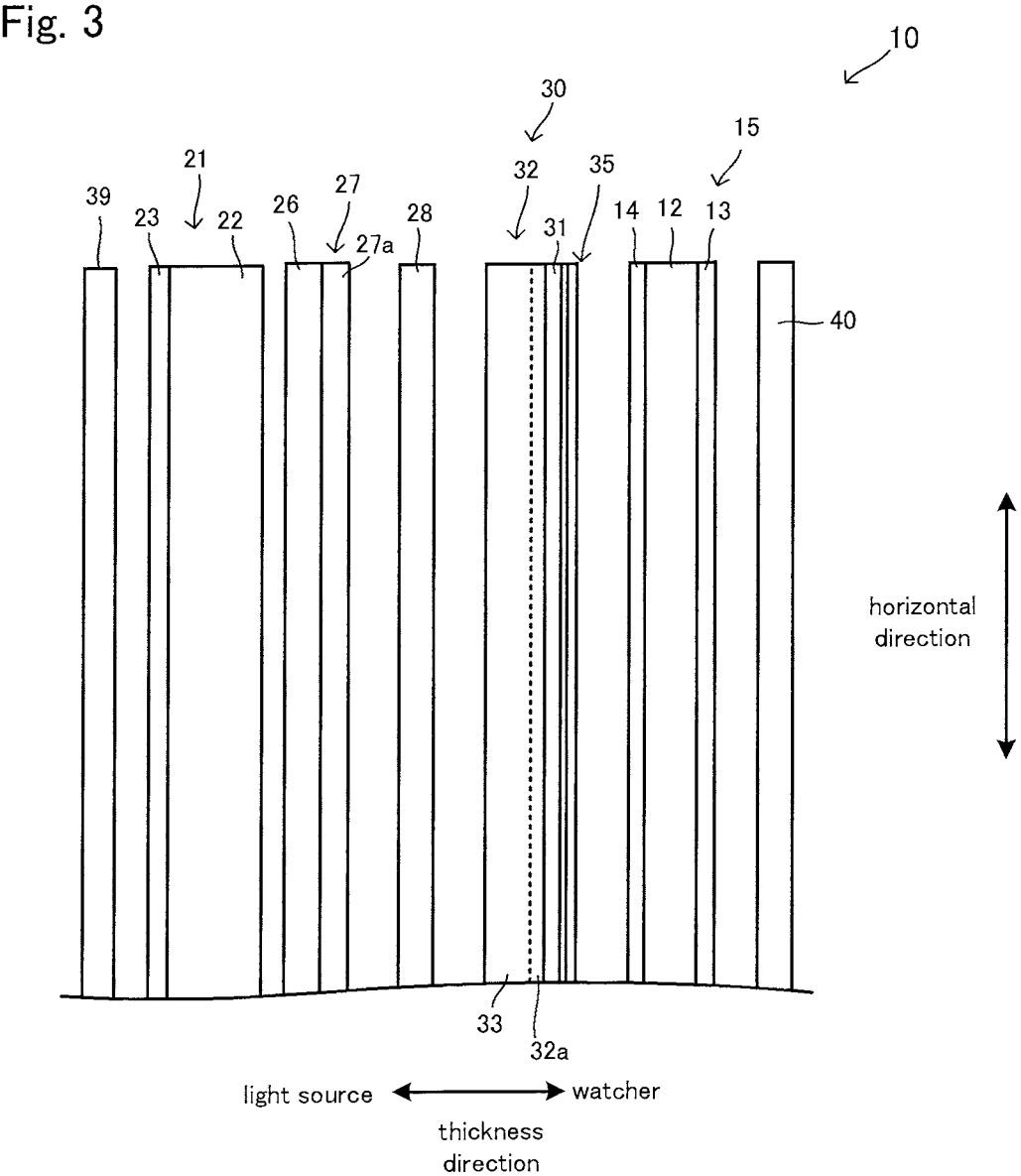
FIG. 3 is an exploded view showing another cross section of the image source unit 10.

FIG. 1, which is an explanatory view of the first embodiment, is an exploded perspective view of an image source unit 10 including an optical sheet 30. FIG. 2 partially shows an exploded cross-sectional view of the image source unit 10 taken along the line II-II (line in the vertical direction) in FIG. 1. FIG. 3 partially shows an exploded cross-sectional view of the image source unit 10 taken along the line (line in the horizontal direction). The vertical and horizontal directions here indicate directions of the optical sheet 30 in a display when the display in which the optical sheet 30 is arranged is used.

Such an image source unit 10 is housed in a housing that is not shown, along with general devices necessary to operate as the image source unit 10 such as a power source to activate the image source unit 10, and an electronic circuit to control the image source unit 10, to constitute the display, detailed description of which is omitted. This embodiment will describe a liquid crystal image source unit as one aspect of the image source unit, and a liquid crystal display as one aspect of the display. Hereinafter the image source unit 10 will be described.

The image source unit 10 includes a liquid crystal panel 15, a surface light source device 20, and a functional film 40. In this embodiment, the optical sheet 30 is included in the surface light source device 20. FIGS. 1 to 3 show the directions when the display is installed, together.

The liquid crystal panel 15 includes an upper polarizing plate 13 that is arranged on the watcher side, a lower polarizing plate 14 that is arranged on the surface light source device 20 side, and a liquid crystal layer 12 that is arranged between the upper polarizing plate 13 and the lower polarizing plate 14. The upper polarizing plate 13 and the lower polarizing plate 14 have functions of: decomposing an incident light into two polarization components (P and S waves) that are orthogonal to each other; transmitting a polarization component in one direction (direction parallel to the transmission axis: for example, a P wave); and absorbing the polarization component in the other direction, which is orthogonal to the one direction (direction parallel to the absorption axis: for example, a S wave).

In the liquid crystal layer 12, a plurality of pixels are two-dimensionally aligned vertically and horizontally along the layer face, which makes it possible to create an electric field for each region that forms one pixel. The orientation of a pixel where an electric field is created is changed. Thus, the polarization direction of the polarization component that is transmitted through the lower polarizing plate 14 arranged on the surface light source device 20 side (that is, the light entering side), and is parallel to the transmission axis (for example, a P wave) rotates by 90° C. when the polarization component passes through a pixel for which an electric field is created, whereas being maintained when the polarization component passes through a pixel for which an electric field is not created. As such, the polarization component transmitted through the lower polarizing plate 14 (for example, a P wave) may be controlled to be further transmitted through the upper polarizing plate 13 arranged on the light exiting side, or to be absorbed and blocked by the upper polarizing plate 13 according to the presence or absence of an electric field for a pixel.

As described above, the liquid crystal panel 15 has the structure to control transmission or block of light from the surface light source device 20 for each pixel, to display an image.

The type of the liquid crystal panel is not particularly limited in this embodiment, while there exit some types of liquid crystal panels. A liquid crystal panel of any known type may be used. Specific examples thereof include TN, STN, VA, MVA, IPS, and OCB.

The surface light source device 20 will be described.

The surface light source device 20 is arranged on the opposite side of the watcher side across the liquid crystal panel 15, and is a lighting device to exit a planar light toward the liquid crystal panel 15. As can be seen from FIGS. 1 to 3, the surface light source device 20 in this embodiment is configured as an edge light type surface light source device, and includes a light guiding plate 21, a light source 25, a light diffusion plate 26, a prism layer 27, a reflection type polarizing plate 28, the optical sheet 30, and a reflection sheet 39.

As can be seen from FIGS. 1 to 3, the light guiding plate 21 includes a base portion 22 and back face optical elements 23. The light guiding plate 21 is a member in the form of a plate as a whole, and is formed by a translucent material. In this embodiment, one plate face of the light guiding plate 21 which is on the watcher side forms a smooth face, and the opposite other plate face forms a back face. A plurality of the back face optical elements 23 are aligned over the back face.

Various materials may be used as the materials constituting the base portion 22 and the back face optical elements 23 as long as the materials are widely used as materials for an optical sheet to be incorporated into a display, have excellent mechanical characteristics, optical characteristics, stability, processability, etc., and are inexpensively available. Examples thereof include thermoplastic resins such as polymer resins having an alicyclic structure, methacrylate resins, polycarbonate resins, polystyrene resins, acrylonitrile-styrene copolymers, methyl methacrylate-styrene copolymers, ABS resins, and polyether sulfone; and epoxy acrylate or urethane acrylate reactive resins (e.g. ionizing radiation curable resins).

The base portion 22 is a portion of the base of the back face optical elements 23, the inside of which light is guided to, and is in the form of a plate having a suitable thickness.

Each of the back face optical elements 23 is a projecting element formed on the back face side of the base portion 22, and is in the form of a triangular prism in this embodiment. The back face optical element 23 in this embodiment is in the form of a column, a ridge line of the projecting apex of which extends in the horizontal direction. A plurality of the back face optical elements 23 are aligned in the direction orthogonal to the extending direction of the ridge lines (vertical direction). The cross section of the back face optical element 23 in this embodiment is a triangle, but is not limited to this. The cross section thereof may be in any shape such as a polygonal shape, a hemispherical shape, a partial sphere, and a shape of a lens.

The aligning direction of a plurality of the back face optical elements 23 is preferably a light guiding direction. That is, the back face optical elements 23 are aligned in a separating direction from the light source 25, and the ridge lines thereof extend in parallel to the aligning direction of the light source 25, or the extending direction of the light source if one long light source is used.

In the present description, "triangular shape" encompasses not only an exact triangular shape, but also an approximate triangular shape due to limitations in a production technique, errors in molding, etc. Likewise, the meanings of the terms used in the present description to identify a shape and geometric conditions other than the above, for example, "parallel", "orthogonal", "oval", and "circle", are not limited to their strict meanings, but the terms shall be interpreted as encompassing some difference as long as similar optical functions may be expected.

The light guiding plate 21 having such a structure can be produced by extrusion molding or by forming the back face optical elements 23 over the base portion 22. The base portion 22 and the back face optical elements 23 may be integrally shaped in the light guiding plate 21 produced by extrusion molding. When the light guiding plate 21 is produced by forming, the material of the back face optical elements 23 may be the resin material same as, or a different material from the base portion 22.

Returning to FIGS. 1 and 3, the light source 25 will be described. The light source 25 is arranged on one of side faces (end faces) of the base portion 22 of the light guiding plate 21 which is along the aligning direction of the back face optical elements 23. The type of the light source is not particularly limited, and the light source may be configured to have any aspect such as a fluorescent lamp like a linear cold cathode tube, a point-like LED (light emitting diode), and an incandescent light bulb. In this embodiment, the light source 25 is constituted of a plurality of LEDs, and is configured so that a controlling device not shown may separately and individually adjust the LEDs to turning on and off, and/or the brightness of a LED when the LED is turned on.

In this embodiment, the example of arranging the light source 25 on one side face (end face) is given. In another embodiment, however, a light source may be further arranged on the side face (end face) opposite to this face (end face), too. In this case, the shape of the back face optical elements is formed according to a known example so as to be suitable for the arrangement of the light sources.

The light diffusion plate 26 will be described. The light diffusion plate 26 is a layer arranged on the light exiting side of the light guiding plate 21, and having a function of diffusing light entering the plate, to let the diffused light exit the plate. This improves uniformity of the light exiting the light guiding plate 21 further more, which makes it possible for scratches on the light guiding plate 21 to be less distinct.

An aspect of a known light diffusion plate may be used for a specific aspect of the light diffusion plate. Examples thereof include an embodiment of dispersing a light diffusing agent in a parent material.

The light diffusion plate 26 may be also used as a supporting plate of the prism layer 27 like this embodiment. When the light exiting face of the light guiding plate 21 is smooth, the light diffusion plate 26 may be laminated to, and united with the light guiding plate 21.

The prism layer 27 is, as can be seen from FIGS. 1 to 3, a layer that is provided closer to the liquid crystal panel 15 than the light diffusion plate 26 is provided, and includes unit prisms 27a convex toward the liquid crystal panel 15. Each of the unit prisms 27a in this embodiment has a triangular cross section, and extends in the direction orthogonal to the light guiding direction of the light guiding plate 21 (horizontal direction in this embodiment). A plurality of the unit prisms 27a are aligned in the light guiding direction of the light guiding plate 21 (vertical direction in this embodiment). This makes it possible to collect light in a direction where light is controlled in an optical functional layer 32 (vertical direction in this embodiment), and to totally reflect light efficiently on the optical functional layer 32, which makes it possible to improve the use efficiency of light.

A known shape (a triangle, a quadrangle, and other polygons) may be employed in a cross-sectional shape of each unit prism of such a prism layer depending on a necessary function. This shape makes it possible to collect light as described above on one hand, and to further diffuse light on the other hand.

The extending and aligning directions of the unit prisms are not limited to the above described embodiment. In another embodiment, for example, the unit prisms may extend in the light guiding direction of the light guiding plate, and a plurality of the unit prisms may be aligned in the direction orthogonal to the light guiding direction of the light guiding plate.

The reflection type polarizing plate 28 has functions of: decomposing an incident light into two polarization components (P and S waves) that are orthogonal to each other; transmitting a polarization component in one direction (direction parallel to the transmission axis: for example, a P wave); and reflecting the polarization component in the other direction, which is orthogonal to the one direction (direction parallel to the reflection axis: for example, a S wave). A known structure may be employed for the structure of such a reflection type polarizing plate.

Figure 4:
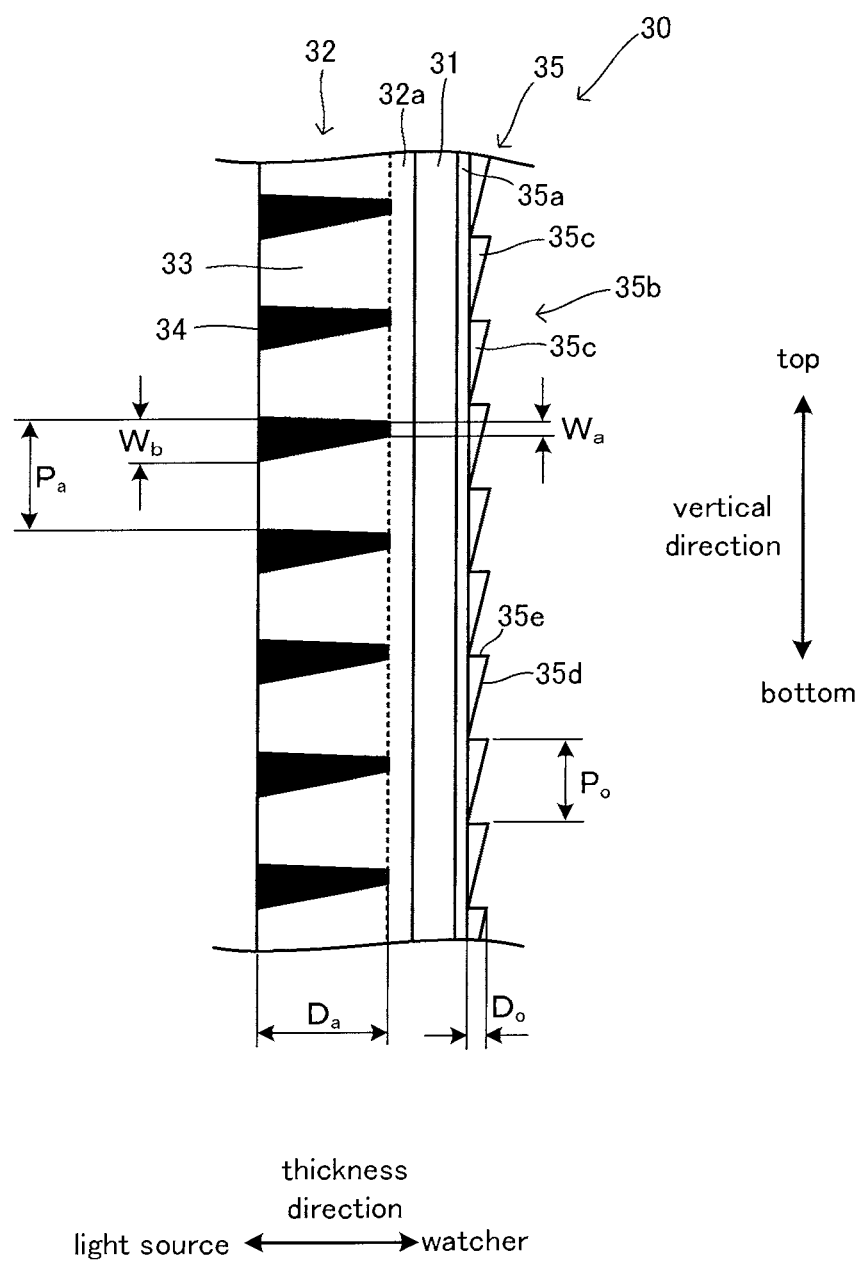
FIG. 4 is an enlarged cross-sectional view focusing on an optical sheet 30.

The optical sheet 30 will be described. FIG. 4 shows a partially enlarged optical sheet 30 from the point of view of FIG. 2. As is seen from FIGS. 1 to 4, the optical sheet 30 includes a base material layer 31 formed in a sheet shape, the optical functional layer 32 provided for one face of the base material layer 31 (face on the light guiding plate 21 side in this embodiment), and a light exiting side light controlling layer 35 arranged on the other face of the base material layer 31 (face on the liquid crystal panel 15 side in this embodiment).

The base material layer 31 is a plate-like sheet member supporting the optical functional layer 32 and the light exiting side light controlling layer 35.

Various materials may be used as the materials constituting the base material layer 31 as long as the materials are widely used as materials for an optical sheet to be incorporated into a display, have excellent mechanical characteristics, optical characteristics, stability, processability, etc., and are inexpensively available. Examples thereof include polyethylene terephthalate resins (PET), triacetylcellulose resins (TAC), methacrylate resins, and polycarbonate resins. Among them, TAC, methacrylate resins, and polycarbonate resins which have low retardation are preferably used in view of the combination of the surface light source device 20 and the lower polarizing plate 14. Further, for use where a high heat resisting property is required, such as on-vehicle use, polycarbonate resins having a high glass transition point is desirable. Specifically, the glass transition point of polycarbonate resins is 143° C., which is suitable for on-vehicle use where durability at 105° C. is generally required.

The optical functional layer 32 is a layer laminated on one face of the base material layer 31 (face on the light guiding plate 21 side in this embodiment), and is constituted of light transmissive portions 33 and light absorbing portions 34. The optical functional layer 32 has a shape having the cross section shown in FIG. 4, and extending from the back to the front on the drawing sheet (horizontal direction when the image source unit 10 is viewed in the front view in this embodiment). The light transmissive portions 33 and the light absorbing portions 34 are alternately aligned along a face of the optical functional layer 32 in a direction different from the extending direction thereof (vertical direction in this embodiment).

Each of the light transmissive portions 33 is a portion whose main function is to transmit light. In this embodiment, the light transmissive portion 33 is an element having an approximately trapezoidal cross-sectional shape that has a longer lower base on the base material layer 31 side and a shorter upper base on the opposite side (light guiding plate 21 side) on the cross section shown in FIGS. 2 and 4.

A plurality of the light transmissive portions 33 extend in one direction (horizontal direction in this embodiment) along the layer face of the base material layer 31 as keeping the above described cross sections, and are aligned at intervals in a different direction from the extending direction (vertical direction in this embodiment). A gap (groove) having an approximately trapezoidal cross section is formed between respective adjacent light transmissive portions 33. Therefore, each gap (groove) has a trapezoidal cross section having a longer lower base on the upper base side of the light transmissive portions 33 (light guiding plate 21 side), and a shorter upper base on the lower base side of the light transmissive portions 33 (base material layer 31 side). Necessary materials described later are filled in the gaps, to form the light absorbing portions 34.

In this embodiment, a sheet-like sill portion 32a links a plurality of the light transmissive portions 33 at their lower base side (base material layer 31 side).

The refractive index of each of the light transmissive portions 33 is $N_t$. Such a light transmissive portion 33 may be formed by curing a light transmissive portion constituting composition. The value of the refractive index $N_t$ is not particularly limited, and is preferably no less than 1.47 in view of reflecting (or totally reflecting) light suitably on interfaces with the light absorbing portions 34 which are oblique faces on the trapezoidal cross section as described later. The refractive index is preferably no more than 1.61 since a material having too high a refractive index tends to easily crack. The refractive index is more preferably 1.49 to 1.56, and further preferably 1.56.

Each of the light absorbing portion 34 functions as an in-between portion that is formed in the above described gap (groove) formed between respective adjacent light transmissive portions 33, and has the same cross-sectional shape as that of the gap (groove). Therefore, the shorter upper base faces the liquid crystal panel 15 (base material layer 31), and the longer lower base is on the opposite side thereof (light guiding plate 21 side in this embodiment). The refractive index of the light absorbing portion 34 is $N_r$. The light absorbing portion 34 is configured so as to be able to absorb light. Specifically, light absorbing particles are dispersed in a transparent resin whose refractive index is $N_r$. The refractive index $N_r$ is a lower index than the refractive index $N_t$ of the light transmissive portion 33. The refractive index of the light absorbing portion 34 is lower than that of the light transmissive portion 33 as described above, which makes it possible to totally reflect the light that satisfies conditions to enter the light transmissive portion 33 suitably on interfaces with the light absorbing portions 34. Even if the conditions of total reflection are not satisfied, the light is partially reflected on the interfaces.

The value of the refractive index $N_r$ is not particularly limited, and is preferably no less than 1.47 assuming that the total reflection is suitably carried out. The refractive index is preferably no more than 1.61 since a material having too high a refractive index tends to easily crack. The refractive index is more preferably 1.49 to 1.56, and further preferably 1.49.

The difference between the refractive index $N_t$ of the light transmissive portion 33 and the refractive index $N_r$ of the light absorbing portion 34 is not particularly limited, and preferably more than 0 and no more than 0.14, and more preferably 0.05 to 0.14. A bigger difference in refractive index makes it possible to totally reflect more light.

Figure 5:
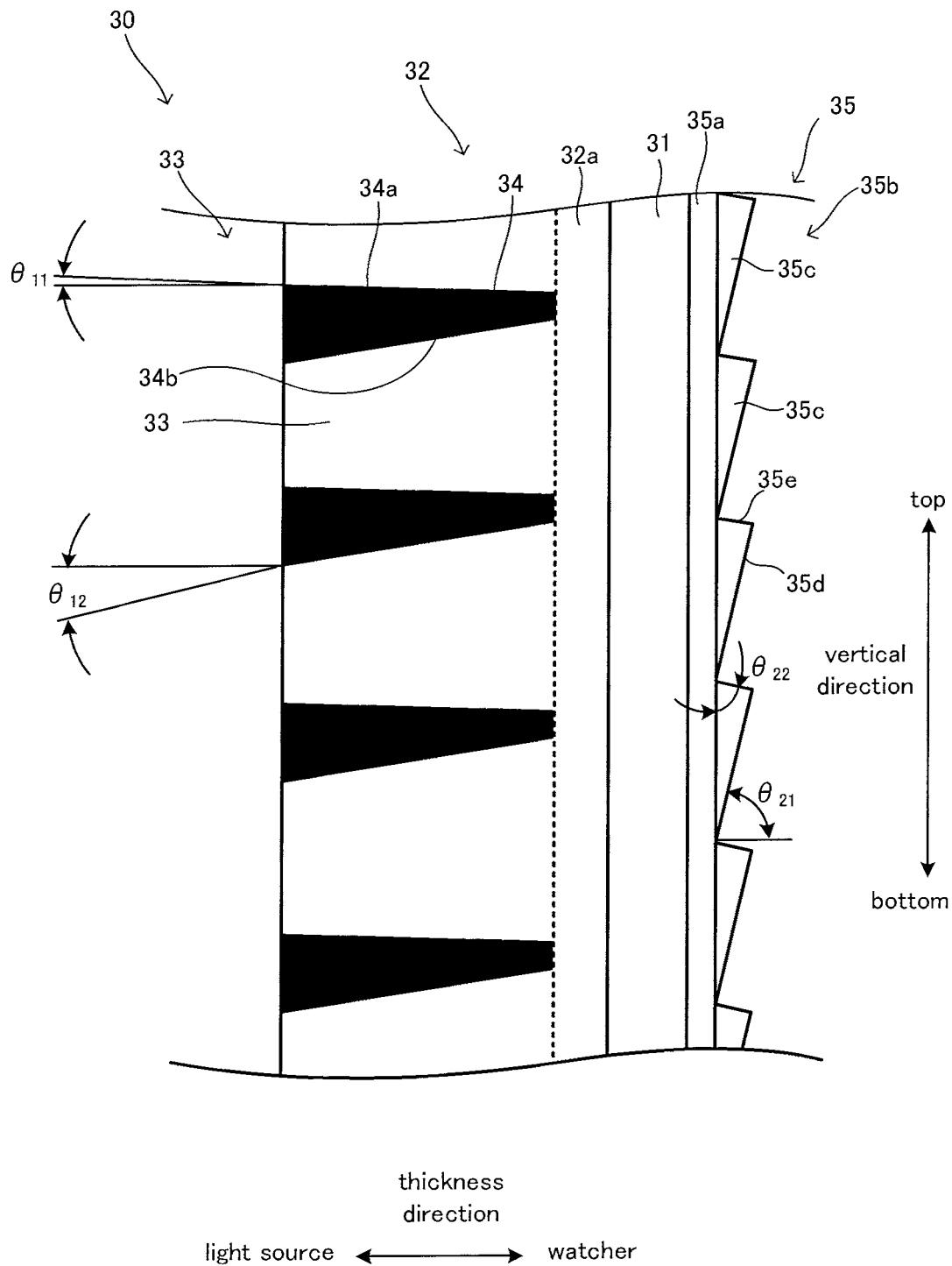
FIG. 5 is a further enlarged cross-sectional view of the optical sheet 30.

The optical functional layer 32 is not specifically limited, and for example, may have the following shape. FIG. 5 is a partially further enlarged view of FIG. 4.

$\theta_{11}$ shown in FIG. 5 is an angle formed by an interface 34a, and the normal line of the layer face of the optical functional layer 32: the interface 34a is one of each interface between the light transmissive portions 33 and the light absorbing portions 34 which is on the upper side of the light absorbing portion 34 when the optical sheet 30 is arranged in a state as FIG. 1. $\theta_{12}$ is an angle formed by an interface 34b, and the normal line of the layer face of the optical functional layer 32: the interface 34b is one of each interface between the light transmissive portions 33 and the light absorbing portions 34 which is on the lower side of the light absorbing portion 34 in the same state.

$\theta_{11}$ is preferably 0° to 10°. $\theta_{11}$ of more than 0° means downward inclination from the light guiding plate 21 side (light entering side) to the liquid crystal panel 15 side (light exiting side, base material layer 31 side).

$\theta_{12}$ is preferably 0° to 10°. $\theta_{12}$ of more than 0° means upward inclination from the light guiding plate 21 side (light entering side) to the liquid crystal panel 15 side (light exiting side, base material layer 31 side).

The relationship between the sizes of the angles $\theta_{11}$ and $\theta_{12}$ may be set as necessary.

The pitch of the light transmissive portion 33 and the light absorbing portion 34, shown by $P_a$ in FIG. 4, is preferably 20 μm to 100 μm, and more preferably 30 μm to 100 μm. The thickness of the light absorbing portion 34 shown by $D_a$ in FIG. 4 is preferably 50 μm to 150 μm, and more preferably 60 μm to 150 μm. The pitch and thickness within these ranges make it possible to give more suitably balanced transmission and absorption of light.

In this embodiment, the example where each interface between the light transmissive portions 33 and the light absorbing portions 34 is in the form of a straight line on the cross section is given. The interface may be in the form of a polygonal, a convex curved line, a concave curved line, etc. without limitation to the above. A plurality of the light transmissive portions 33 and the light absorbing portions 34 may have the same cross-sectional shape, or different cross-sectional shapes having regularity.

The example where the extending direction of the light transmissive portions 33 and the light absorbing portions 34 is horizontal is described above. This direction is preferably offset from the aligning direction of the pixels of the liquid crystal layer 12 in the front view of the image source unit (bias angle $\alpha_1$) in view of suppressing moire. This bias angle $\alpha_1$ is not specifically restricted as long as moire is prevented, and is preferably 1° to 10°.

The light exiting side light controlling layer 35 will be described. The light exiting side light controlling layer 35 functions as a light controlling layer, to control the direction of light in combination with the optical functional layer 32.

In this embodiment, the light exiting side light controlling layer 35 controls the direction of the light exiting the optical functional layer 32, to let the light exit. That is, in this embodiment, the light exiting side light controlling layer 35 further controls the direction of the light which is controlled in the optical functional layer 32, to make the angle where the light exits a desired angle.

The light exiting side light controlling layer 35 is therefore constituted of a supporting layer 35a and an optical element layer 35b.

The supporting layer 35a is a transparent sheet-like member that functions as a supporting body of the optical element layer 35b. The supporting layer 35a may be made from materials same as those of the base material layer 31 and the light transmissive portions 33.

The optical element layer 35b is a layer to change the direction of the light exiting the optical functional layer 32, and is formed of a plurality of unit optical elements 35c aligned over a face of the supporting layer 35a which is on the opposite side to the optical functional layer 32.

The unit optical elements 35c further control the direction of the light controlled in the optical functional layer 32, so that, in this embodiment, the viewing angle is efficiently shifted upwards in the vertical direction in the state of FIGS. 1 to 3. FIGS. 4 and 5 show the cross-sectional shapes of the unit optical elements 35c.

In this embodiment, the unit optical elements 35c specifically have the following structure:

Each of the unit optical elements 35c is in the form of a triangular prism having a triangular cross section protruding opposite to the optical functional layer 32, which is across the base material layer 31, a ridge of which is constituted of a ridge line extending in the same direction as the extending direction of the light transmissive portions 33 and the light absorbing portions 34 (bias angle $\alpha_2=0°$), or extending as being offset in the front view of the optical sheet (bias angle $\alpha_2\neq 0°$, as having that cross section. A plurality of the unit optical elements 35c are aligned in a direction different from their extending direction.

When the ridge line of each of the unit optical elements 35c extends as being offset from the extending direction of the light transmissive portions 33 and the light absorbing portions 34 in the front view of the optical sheet (bias angle $\alpha_2\neq 0°$, preferably, the extending direction of the light transmissive portions 33 of the optical functional layer 32 relatively inclines from the extending direction of the ridge lines of the unit optical elements 35c by the bias angle $\alpha_2$ of more than 0° and no more than 45° in the front view of the optical sheet 30. This makes it possible to prevent moire due to the aligning structure of the light transmissive portions 33 and the light absorbing portions 34, and the aligning structure of the unit optical elements 35c. The angle $\alpha_2$ of more than 45° leads to lowered efficiency of the control of the direction of light in the unit optical elements 35c. The angle $\alpha_2$ is more preferably 1° to 10°.

Each of the unit optical elements 35c includes a main refracting face 35d and a rise face 35e as seen from FIG. 5. These main refracting face 35d and rise face 35e form two faces of a triangular prism, and the other one face is over the supporting layer 35a to be fixed to the supporting layer 35a.

In this embodiment, the main refracting face 35d is a refracting face to change the direction of the light exiting the optical functional layer 32 so that the light is further directed upwards in the state of FIGS. 1 to 5. This makes it possible to efficiently shift the range where light exits upwards in the vertical direction. In this case, the main refracting face 35d inclines downwards as being close to the optical functional layer 32 (here, this direction is defined as a positive (+) direction). Thus, in one unit optical element 35c, the main refracting face 35d is the bottom and the rise face 35e is the top. The inclination of the main refracting face 35d forms an angle $\theta_{21}$ shown in FIG. 5 with the direction of the normal line of the optical functional layer 32.

A specific angle of $\theta_{21}$ is preferably more than 45° and less than 90° (the absolute value of the inclination angle of the main refracting face is more than 45° and less than 90°). This makes it possible to surely control light for improving brightness in a desired direction (control of a light exiting angle). $\theta_{21}$ of no more than 45° makes it easy for total reflection to occur on the main refracting face 35d, which may increase light that does not exit. $\theta_{21}$ of no less than 90° makes it almost impossible for the main refracting face to function.

$\theta_{21}$ is more preferably 80° to 89°. $\theta_{21}$ of this range makes it possible to use a small rise face 35e, to reduce a stray light due to the rise face 35e.

The rise face 35e is a face necessary for forming the main refracting face 35d.

The rise face 35e preferably forms the inclination angle, which is shown by $\theta_{22}$ in FIG. 5, of 80° to 100° with the direction along the layer face of the optical functional layer 32. $\theta_{22}$ is more preferably 80° to 90° in view of production. $\theta_{22}$ of less than 80°, and $\theta_{22}$ of more than 100° may increase a stray light due to the rise face 35e.

The vertex angle of the unit optical element 35c is naturally determined by $\theta_{21}$ and $\theta_{22}$, and is preferably no less than 45° and less than 90°.

The pitch of the unit optical element 35c shown by $P_o$ in FIG. 4 is preferably short from the viewpoint that moire of a short pitch makes it difficult for the moire to be seen even if the moire appears. Specifically, the pitch $P_o$ is preferably no more than 50 µm.

It is desirable that the pitch $P_o$ of the unit optical element 35c be shorter than the pitch $P_a$ of the light transmissive portion 33 of the optical functional layer 32 (see FIG. 4) since the optical functional layer 32 is more difficult than the optical element layer 35b in production. It is further desirable that $P_o$ be no more than ½ of $P_a$. It is most desirable that an end part of the light transmissive portion 33 and an end part of the unit optical element 35c be not at the same location as long as possible when $P_o$ is regularly magnified like $P_a/2$, $P_a/3$, and $P_a/4$. In other words, it is desirable that the least common multiple of $P_o$ and $P_a$ be a large number.

$P_o$ is preferably no less than 10 µm since a small unit optical element 35c lowers accuracy.

$P_{mx}$ (µm) is more preferably no more than 10000 (µm) when the aligning pitch of the light transmissive portion 33 is $P_a$ (µm) and the aligning pitch of the unit optical element 35c is $P_o$ (µm). This makes it possible to more surely prevent moire. Here, $P_{mx}$ can be obtained as follows:

$P_{mx}$ can be obtained based on $P_m$, and $P_m$ is represented by the following formula:

$$P_m = |(a \cdot P_a \cdot b \cdot P_o)/(a \cdot P_a - b \cdot P_o)|$$

Here, $P_a \geq P_o$, and a and b are each integers of 1 to 10. All the combinations of $P_a$ and $P_o$, which is a pitch from the same magnification (once) as, to ten times larger than $P_a$ are considered. This makes it possible to evaluate appearance of moire in a wide range of considering pitches at integral multiples.

The maximum $P_m$ in $P_m$ obtained from all the combinations of varied a and b in a certain combination of $P_a$ and $P_o$ is $P_{mx}$.

The protruding height of the unit optical element 35c from the supporting layer 35a, which is shown by $D_o$ in FIG. 4 is preferably 1 µm to 10 µm. The height lower than this lower limit may lead to deteriorated accuracy of processing, which leads to defects such that stripe lines are visually recognized. The height higher than this upper limit makes it easy for moire to appear due to the light absorbing portions 34 and the unit optical elements 35c.

In this embodiment, a plurality of the unit optical elements 35c are continuously arranged without any gaps, but not limited to this. In another aspect, a gap may be provided between adjacent unit optical elements 35c, from which a face of the supporting layer 35a may be partially exposed.

In this embodiment, the main refracting face 35d of the unit optical element 35c is linear on the cross section shown in FIGS. 4 and 5, but is not always limited to this. The main refracting face 35d may be in the form of a convex or concave curved line, or a polygonal line on its cross section.

The main refracting face 35d and the rise face 35e may be rough faces. This makes it possible to scatter light to suppress moire. A method for forming the main refracting face 35d and the rise face 35e into rough faces is not specifically limited. Examples thereof include direct blasting on the unit optical element, and blasting on a die for molding the unit optical element.

All of a plurality of the unit optical elements 35c are not always necessary to have the same shape, and may suitably have different shapes from each other.

In this embodiment, the supporting layer 35a is provided for the light exiting side light controlling layer 35. The supporting layer 35a is not always necessary to be provided.

Figure 6:
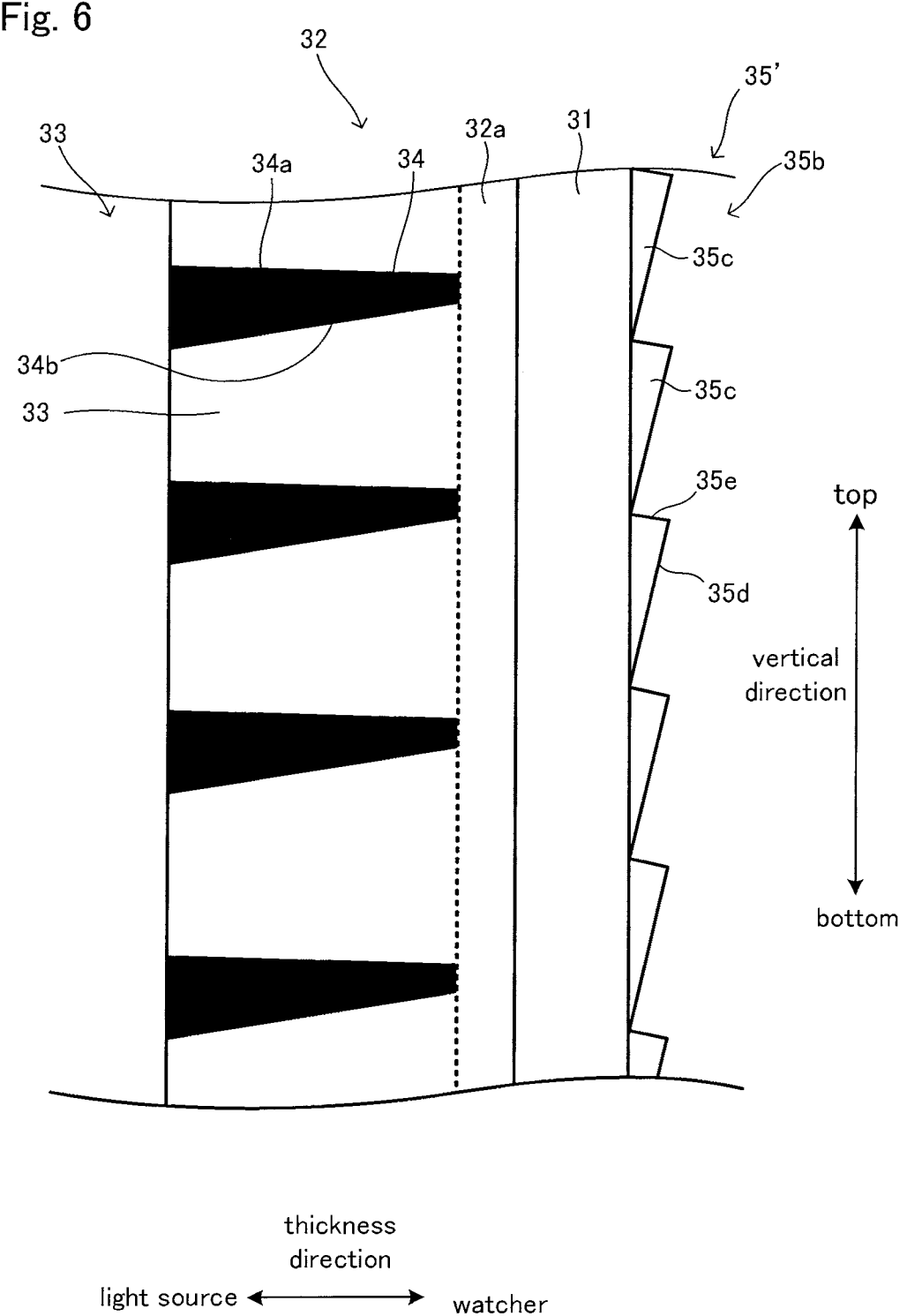
FIG. 6 is an explanatory view of a modification of the optical sheet 30.

For example, the optical element layer 35b may be directly formed over the base material layer 31 as shown by a light exiting side light controlling layer 35' in FIG. 6, which is a modification.

At this time, a face of the base material layer 31 which forms the interface with the optical element layer 35b may be formed into a rough face, and the base material layer 31 may be different from the optical element layer 35b in refractive index. This makes it possible to scatter light on the rough face to suppress moire.

Such a supporting layer 35a and an optical element layer 35b (unit optical element 35c) of the light exiting side light controlling layer 35 may be made from materials same as those of the base material layer 31 and the light transmissive portions 33.

For example, the optical sheet 30 is made in the following manner:

First, the light transmissive portions 33 are formed on one face of the base material layer 31: a base material sheet to become the base material layer 31 is inserted into a space between a die roll having on its surface a shape that enables the shapes of the light transmissive portions 33 to be transferred, and a nip roll arranged so as to be opposite to the die roll. At this time, a further space is provided between the die roll and the nip roll, to be the sill portion 32a. The die roll and the nip roll are rotated while a composition to constitute the light transmissive portions is supplied to the space between the base material sheet and the die roll. This results in grooves filled with the composition to constitute the light transmissive portions, to allow the composition to be along the surface shape of the die roll: the grooves are formed over the surface of the die roll and correspond to the light transmissive portions (having a reversed shape of the light transmissive portions).

Here, examples of the composition to constitute the light transmissive portions include ionizing radiation-curable resins such as epoxy acrylate, urethane acrylate, polyether acrylate, polyester acrylate, and polythiol ionizing radiation-curable resins.

The composition between the die roll and the base material sheet to constitute the light transmissive portions with which the space between them is filled is irradiated with light for curing from a light irradiation device on the base material sheet side. This makes it possible to cure the composition, to fix its shape. The base material layer 31 and the molded light transmissive portions 33 are then released from the die roll by a release roll.

The light absorbing portions 34 will be formed. First, gaps (grooves) between the molded light transmissive portions 33 are filled with a composition to constitute the light absorbing portions. Thereafter, an excessive composition is scraped off by a doctor blade or the like. The remaining composition is then irradiated with an ultraviolet ray from the light transmissive portions 33 side, to cure the composition, which makes it possible to form the light absorbing portions 34.

Materials used as the light absorbing portions are not particularly limited. Examples thereof include a composition formed of colored light absorbing particles dispersed in photocurable resins such as urethane(meth)acrylate, polyester(meth)acrylate, epoxy(meth)acrylate, and butadiene (meth)acrylate.

Instead of dispersion of light absorbing particles, the whole light absorbing portions may be colored by a pigment or dye.

When light absorbing particles are used, colored particles having a light absorbing property such as carbon black are preferably used. Light absorbing particles are however not limited to them, and colored particles which selectively absorb light of a certain wavelength may be employed in accordance with properties of an image light. Specific examples include: carbon black, graphite, metallic salts such as black iron oxide, and organic particulates or glass beads colored by a dye, a pigment, and the like. Especially, colored organic particulates are preferably used in view of costs, quality, availability, and the like. The mean particle diameter of the colored particles is preferably 1.0 µm to 20 µm, more preferably 1.0 µm to 10 µm, and further preferably 1.0 µm to 4.0 µm.

Here, "mean particle diameter" means a diameter calculated by: observing 100 light absorbing particles with an electron microscope to measure diameters thereof, and calculating the arithmetic mean of the measured diameters.

Other than the optical functional layer 32, the light exiting side light controlling layer 35 formed of the optical element layer 35b laminated onto one face of the supporting layer 35a is prepared. This may be made in the same manner as the method of laminating the light transmissive portions 33 onto the base material layer 31 in the optical functional layer 32. When the bias angle $\alpha_2$ is not 0°, a groove to mold the unit optical elements 35c on a roll-mold to form the optical element layer 35b is preferably formed spirally (like a thread groove) along the outer circumferential face of the roll-mold. This makes it possible to give a suitable bias angle $\alpha_2$ in view of accuracy and efficiency.

The face of the base material layer 31 which is on the opposite side of the side where the optical functional layer 32 is arranged is adhered to the face of the supporting layer 35a of the light exiting side light controlling layer 35 which is on the opposite side of the side where the optical element layer 35b is arranged with an adhesive to be united, to obtain the optical sheet 30.

Returning to FIGS. 1 to 3, the reflection sheet 39 of the surface light source device 20 will be described. The reflection sheet 39 is a member for reflecting the light exiting the back face of the light guiding plate 21 to let the light enter the light guiding plate 21 again. Any sheet that enables so-called specular reflection may be preferably employed as the reflection sheet 39. Examples thereof include a sheet made of a material having a high reflectance such as metal, and a sheet including, as a surface layer, a thin film made of a material having a high reflectance (for example, thin metal film).

The functional film 40 is a layer that is arranged on the light exiting side of the liquid crystal panel 15, and has functions of improving the quality of an image light, and protecting the image source unit 10. Examples thereof include an anti-reflection film, an anti-glare film, a hard coating film, a color compensation film, and a light diffuser film. One or a plurality of them are used alone or in combination, to constitute the functional film 40.

Operations of the image source unit 10 having the above described structure will be described as showing examples of an optical path. The examples of an optical path are for conceptualistic explanation, and do not strictly give degrees of reflection and refraction.

First, the light exiting the light source 25 enters the light guiding plate 21 from a light entering face that is a side face (end face) of the light guiding plate 21 as shown in FIG. 2. FIG. 2 shows examples of the optical paths of lights $L_{21}$ and $L_{22}$ entering the light guiding plate 21 from the light source 25 as one example.

As shown in FIG. 2, the lights $L_{21}$ and $L_{22}$ entering the light guiding plate 21 repeat total reflection due to the difference in refractive index from the air, on a face of the light guiding plate 21 on the light exiting side, and the back face opposite to that face; and travel in the light guiding direction (downwards on the drawing sheet of FIG. 2).

The back face optical elements 23 are arranged over the back face of the light guiding plate 21. The traveling directions of the lights $L_{21}$ and $L_{22}$ travelling through the light guiding plate 21 are therefore changed by the back face optical elements 23, and the lights $L_{21}$ and $L_{22}$ may enter the light exiting face and the back face at an incident angle narrower than the total reflection critical angle as shown in FIG. 2. In this case, the lights may exit the light exiting face of the light guiding plate 21, and the back face that is opposite to the light exiting face.

The lights $L_{21}$ and $L_{22}$ exiting the light exiting face are directed toward the light diffusion plate 26 arranged on the light exiting side of the light guiding plate 21. The light exiting the back face is reflected by the reflection sheet 39 arranged on the rear face of the light guiding plate 21; and enters again the light guiding plate 21 to travel through the light guiding plate 21.

The light travelling through the light guiding plate 21 and the light whose direction is changed on the back face optical elements 23 and which reaches the light exiting face at an incident angle narrower than the total reflection critical angle appear in each zone along the light guiding direction of the light guiding plate 21. Therefore, the light travelling through the light guiding plate 21 exits the light exiting face little by little. This enables a light amount distribution of the light exiting the light exiting face of the light guiding plate 21, along the light guiding direction, to be even.

The light exiting the light guiding plate 21 thereafter reaches the light diffusion plate 26, which improves uniformity thereof. The light diffused or collected as necessary by the prism layer 27 to exit the prism layer 27 then reaches the reflection type polarizing plate 28. Here, the light in a polarization direction along the transmission axis of the reflection type polarizing plate 28 is transmitted through the reflection type polarizing plate 28, to be directed toward the optical sheet 30.

The light in a polarization direction along the reflection axis of the reflection type polarizing plate 28 is reflected and returned to the light guiding plate 21 side as shown by the dotted arrows in FIG. 2. The returned light is reflected on the light guiding plate 21, the back face optical elements 23, or the reflection sheet 39, to travel again toward the reflection type polarizing plate 28. In this reflection, the polarization directions of some lights are changed, and these lights are partially transmitted through the reflection type polarizing plate 28. The rest of the lights is returned again to the light guiding plate side. In this way, repeated reflection makes it possible for the light reflected on the reflection type polarizing plate 28 to be also transmitted through the reflection type polarizing plate 28. This increases the use efficiency of the light from the light source 25.

Here, the polarization direction of the light exiting the reflection type polarizing plate 28 is a direction along the transmission axis of the lower polarizing plate 14, and this light is a light in a polarized state which allows the light to be transmitted through the lower polarizing plate 14.

Figure 7:
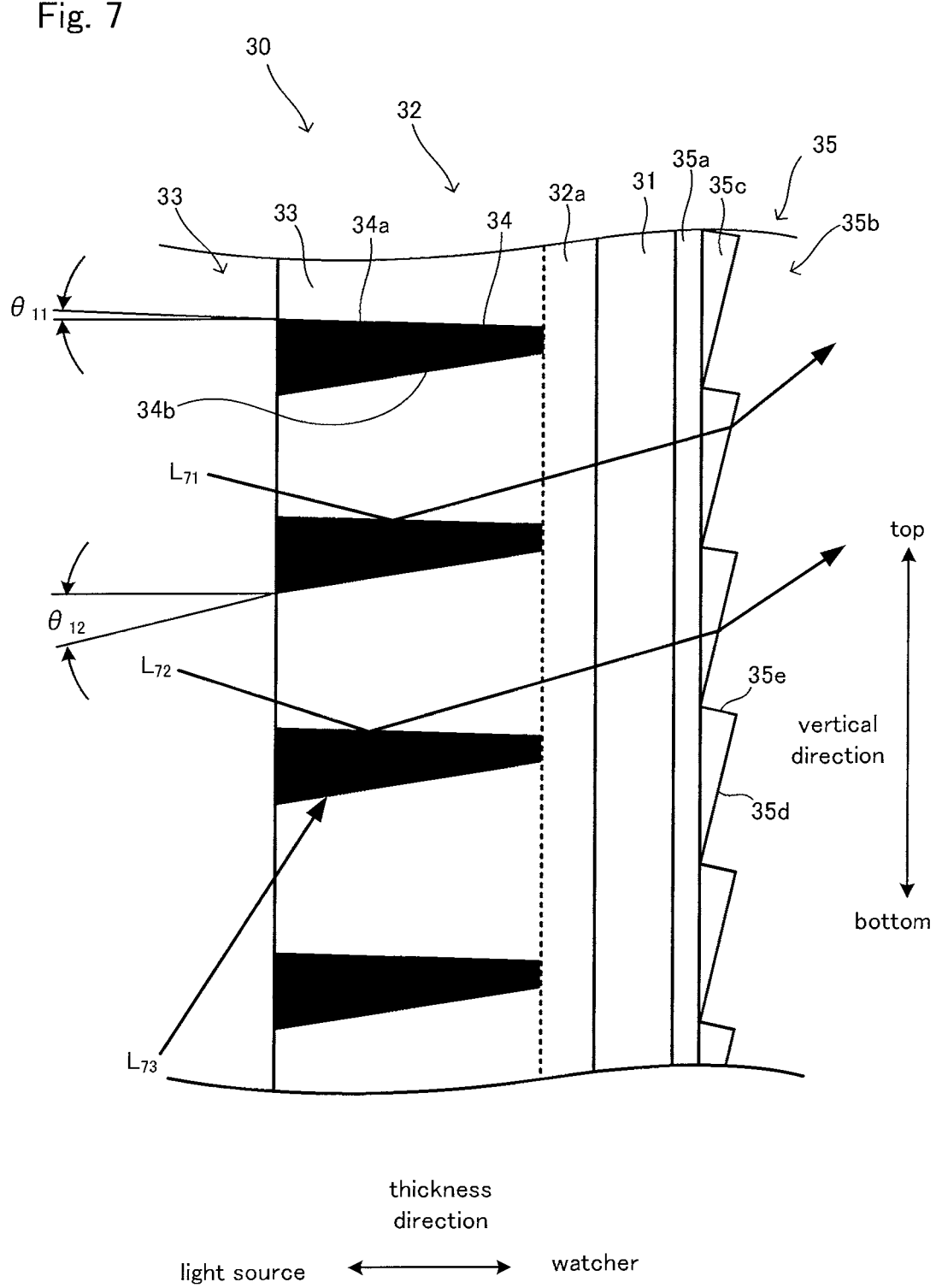
FIG. 7 is an explanatory view of examples of an optical path of light transmitted through the optical sheet 30.

The light exiting the reflection type polarizing plate 28 reaches the optical sheet 30. The light entering the optical sheet 30 travels as having an optical path as follows. FIG. 7 shows examples of an optical path in the optical sheet 30.

The light is directed toward the interface 34a of interfaces between the light transmissive portions 33 and the light absorbing portions 34, which is on the upper side of the light absorbing portion 34 in the direction where the light trans-missive portions 33 and the light absorbing portions 34 are alternately aligned (vertical direction in this embodiment) as shown by the lights $L_{21}$ and $L_{22}$ in FIG. 2, and lights $L_{71}$ and $L_{72}$ in FIG. 7. Then the light is totally reflected on the interface 34a to be an obliquely upward light directed toward the watcher side, to be controlled in a desired direction.

At this time, if the interface 34b of interfaces of the light transmissive portions 33 and the light absorbing portions 34, which is on the lower side of the light absorbing portion 34, inclines obliquely upwards as being close to the watcher side, it becomes difficult for the light absorbing portions 34 to block light as the lights $L_{21}$, $L_{22}$, $L_{71}$, and $L_{72}$ from travelling, which makes it possible to guide more light in a desired direction.

Since $L_{73}$ shown in FIG. 7 travels obliquely upwards toward the watcher side at such an angle as to be transmitted through the interface 34b between the light transmissive portion 33 and light absorbing portion 34 without total reflection on this interface, $L_{73}$ is transmitted through the interface 34b, to be absorbed in the light absorbing portion 34.

This makes it possible to efficiently absorb and block the light exiting at a viewing angle that is no less than a desired angle, and further to efficiently control the travelling direction of light.

This also makes it possible to absorb such light entering the liquid crystal panel to probably lead to defects such as deteriorated contrast and color inversion, and a low quality.

The direction of the light transmitted through the optical functional layer 32 is further changed in the optical element layer 35b. Specifically, in this embodiment, the main refracting face 35d refracts the lights $L_{71}$ and $L_{72}$ further upwards, to be exited as shown by the lights $L_{71}$ and $L_{72}$ in FIG. 7. This makes it possible to shift a light exiting range further upwards.

Figure 8:
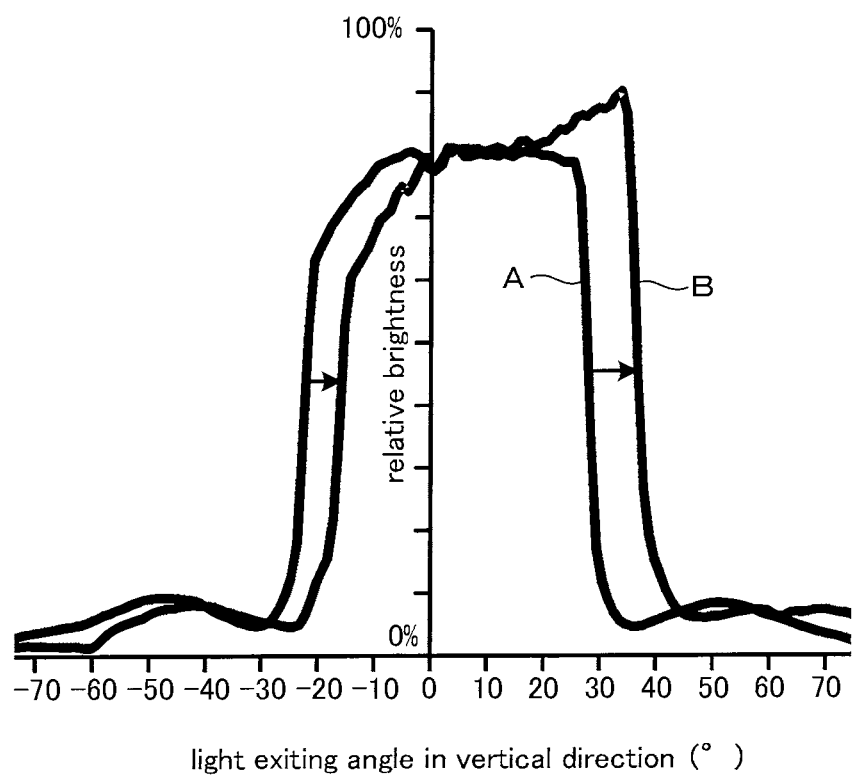
FIG. 8 is an explanatory graph showing control of a light exiting angle when a light exiting side light controlling layer 35 is included.

Therefore, the optical sheet 30 in this embodiment (B in FIG. 8) makes it possible to efficiently increase light exiting more upwards in the vertical direction than the case where no light exiting side light controlling layer 35 is included (A in FIG. 8) as shown in FIG. 8. In FIG. 8, the horizontal axis represents the light exiting angle with the normal line of the sheet face in the vertical direction; the positive indicates the upward and the negative indicates the downward. The vertical direction represents a relative brightness when a certain brightness is defined as 100%. It is difficult to adjust the light exiting angle as described above only by the optical functional layer. Even if do so, the adjustment can be accompanied with defects such as a lowered brightness. Against this, further including the optical element layer 35b like the optical sheet 30 makes it possible to efficiently control the light exiting angle.

The optical element layer 35b for controlling light as described above has a simple structure as described above, and takes an effect with such an easy structure.

In this embodiment, $\theta_{11}$ and $\theta_{12}$ of the optical functional layer 32 (see FIG. 5) of $\theta_{11} < \theta_{12}$ makes it possible to control the viewing angle in a wider range.

The light exiting the optical sheet 30 enters the lower polarizing plate 14 of the liquid crystal panel 15. The lower polarizing plate 14 transmits one polarization component in the incident light, and absorbs the other polarization component. The light transmitted through the lower polarizing plate 14 is selectively transmitted through the upper polarizing plate 13 in accordance with the state of creation of an electric field for each pixel. In this manner, the liquid crystal panel 15 selectively transmits the light from the surface light source device 20 for each pixel, which makes it possible for a watcher of the liquid crystal display to observe an image. At this time, an image light is given a watcher via the functional film 40, to improve the quality of an image.

Figure 9:
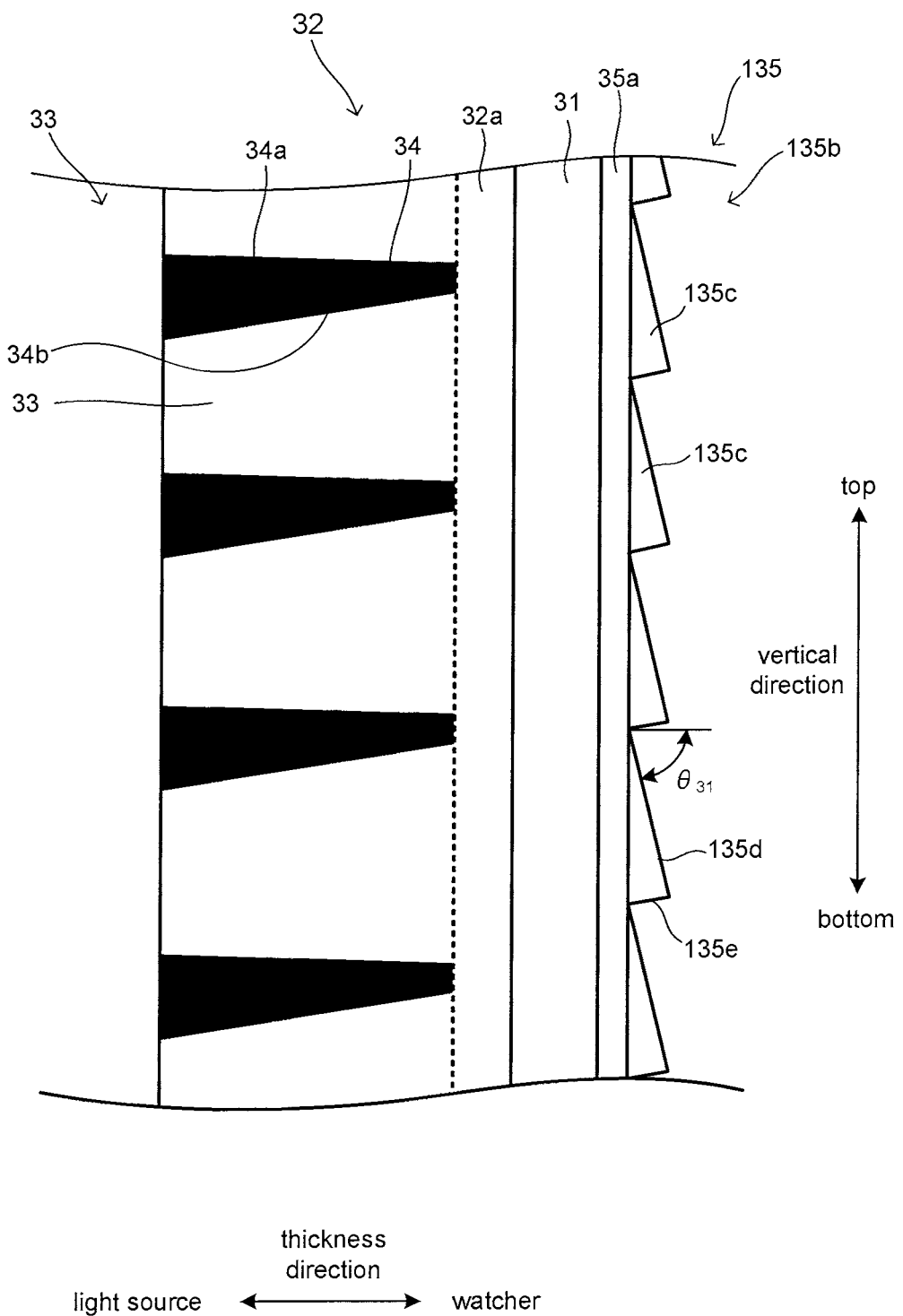
FIG. 9 is an explanatory view of an embodiment of including a light exiting side light controlling layer 135.

FIG. 9 is an explanatory view of the second embodiment, and corresponds to FIG. 5. In this embodiment, a light exiting side light controlling layer 135 as a light controlling layer is employed instead of the light exiting side light controlling layer 35. The other portions are the same as those of the image source unit 10, and thus the structure and operations of the light exiting side light controlling layer 135 will be described here.

The light exiting side light controlling layer 135 controls the direction of the light exiting the optical functional layer 32, to let the light exit. The light exiting side light controlling layer 135 is therefore constituted of the supporting layer 35a and an optical element layer 135b. The supporting layer 35a is the same as the supporting layer 35a of the light exiting side light controlling layer 35.

The optical element layer 135b is a layer to change the direction of the light exiting the optical functional layer 32, and is formed of a plurality of unit optical elements 135c aligned over a face of the supporting layer 35a which is on the opposite side to the optical functional layer 32.

In this embodiment, the unit optical elements 135c specifically have the following structure: each of the unit optical elements 135c is in the form of a triangular prism having a triangular cross section protruding opposite to the optical functional layer 32, a ridge of which is constituted of a ridge line extending in parallel to the extending direction of the light transmissive portions 33 and the light absorbing portions 34 (bias angle $\alpha_2=0°$), or extending as being offset by a bias angle (bias angle $\alpha_2 \neq 0°$, as having that cross section. A plurality of the unit optical elements 135c are aligned in a direction different from their extending direction. The bias angle $\alpha_2$ formed by the unit optical element 135c and the light transmissive portions 33 is understood same as in the case of the unit optical element 35c.

Each of the unit optical elements 135c includes a main refracting face 135d and a rise face 135e as seen from FIG. 9. These main refracting face 135d and rise face 135e form two faces of a triangular prism, and the other one face is over the supporting layer 35a to be fixed to the supporting layer 35a.

In this embodiment, the main refracting face 135d is a refracting face to change the angle of the light exiting upwards from the optical functional layer 32 so that the light is close to the front direction in a state as FIG. 1. This makes it possible to adjust the light exiting angle in the vertical direction to a desired direction. In this case, the main refracting face 135d inclines downwards as being separate from the optical functional layer 32 (here, this direction is defined as a negative (−) direction). Thus, in one unit optical element 135c, the main refracting face 135d is the top and the rise face 135e is the bottom.

The inclination of the main refracting face 135d forms an angle $\theta_{31}$ with the direction of the normal line of the light exiting face of the optical functional layer 32 as shown in FIG. 9.

A specific angle of $\theta_{31}$ is preferably no less than −89° and less than −45° (the absolute value of the inclination angle is more than 45° and no more than 89°). This makes it possible to surely control light for improving brightness in a desired direction (control of the light exiting angle). $\theta_{31}$ of no less than −45° may increase light totally reflected on the main refracting face 135d not to exit. $\theta_{31}$ of less than −89° makes it almost impossible for the main refracting face to function.

$\theta_{31}$ is more preferably −89° to −80° (the absolute value of the inclination angle is 80° to 89°). $\theta_{31}$ of this range makes it possible to use a small rise face 135e, to reduce a stray light due to the rise face 135e.

The other preferred aspects of the unit optical elements 135c in view of their shapes may be understood same as those in the unit optical elements 35c.

Figure 10:
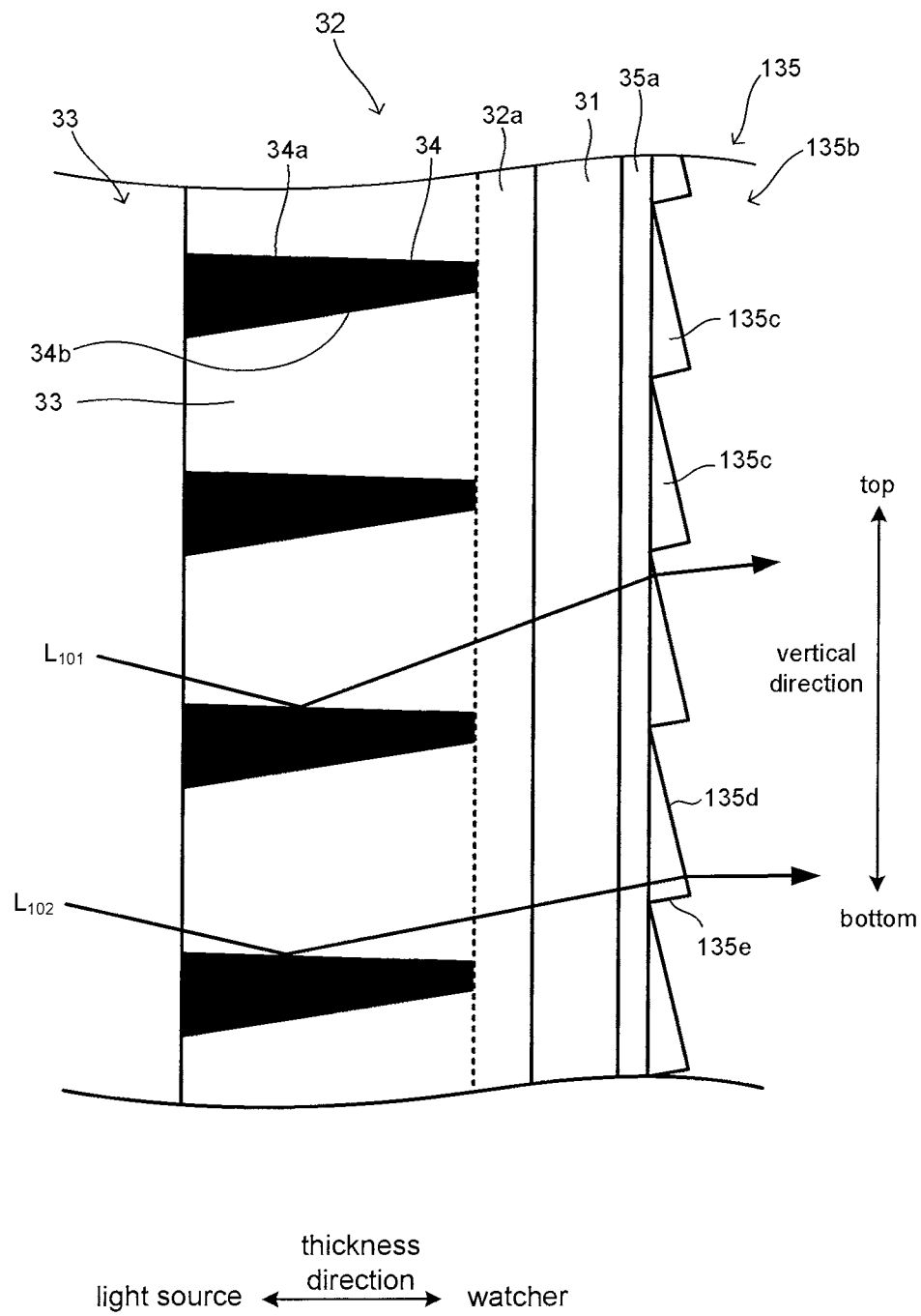
FIG. 10 is an explanatory view of examples of an optical path with the light exiting side light controlling layer 135.

Operations of an image source unit including the light exiting side light controlling layer 135 will be described. FIG. 10 shows examples of an optical path. Optical paths in the other portions are the same as in the image source unit 10, and thus description thereof will be omitted here.

The direction of the light transmitted through the optical functional layer 32 is further changed in the optical element layer 135b. Specifically, in this embodiment, the main refracting face 135d refracts lights $L_{101}$ and $L_{102}$ so that the lights $L_{101}$ and $L_{102}$ travels toward the front as close as possible, to be exited as shown by the lights $L_{101}$ and $L_{102}$ in FIG. 10. This leads to control of the light exiting angle in a desired direction.

Figure 11:
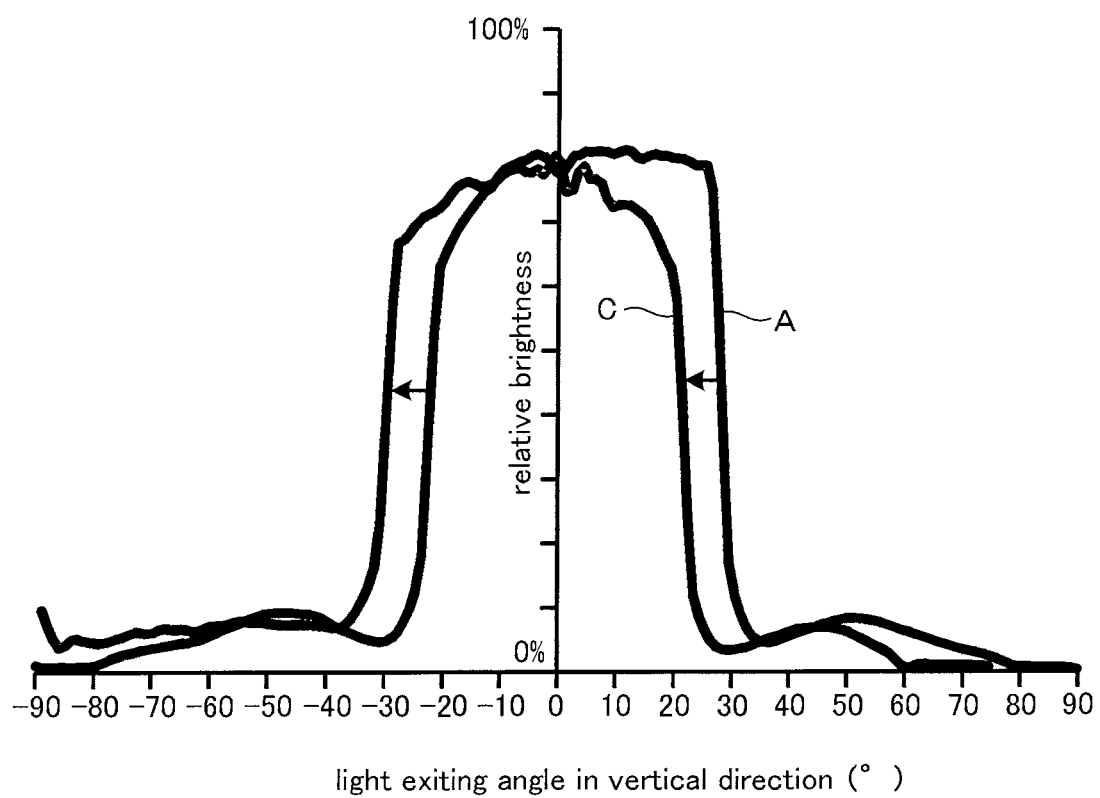
FIG. 11 is an explanatory graph showing a change in the light exiting angle when the light exiting side light controlling layer 135 is included.

Therefore, an optical sheet including the light exiting side light controlling layer 135 makes it possible to efficiently shift the viewing angle (C in FIG. 11) compared with the case where no light exiting side light controlling layer 135 is included (A in FIG. 11) as shown in FIG. 11. In FIG. 11, the horizontal axis represents a light exiting angle with the normal line of the sheet face in the vertical direction; the positive indicates the upward and the negative indicates the downward. The vertical direction represents a relative brightness when a certain brightness is defined as 100%. It is difficult to adjust the light exiting angle as described above only by the optical functional layer. Even if do so, the adjustment can be accompanied with defects such as a lowered brightness. Against this, further including the light exiting side light controlling layer 135 makes it possible to efficiently control the viewing angle.

The optical element layer 135b for controlling light as described above has a simple structure as described above, and takes an effect with such an easy structure.

Figure 12:
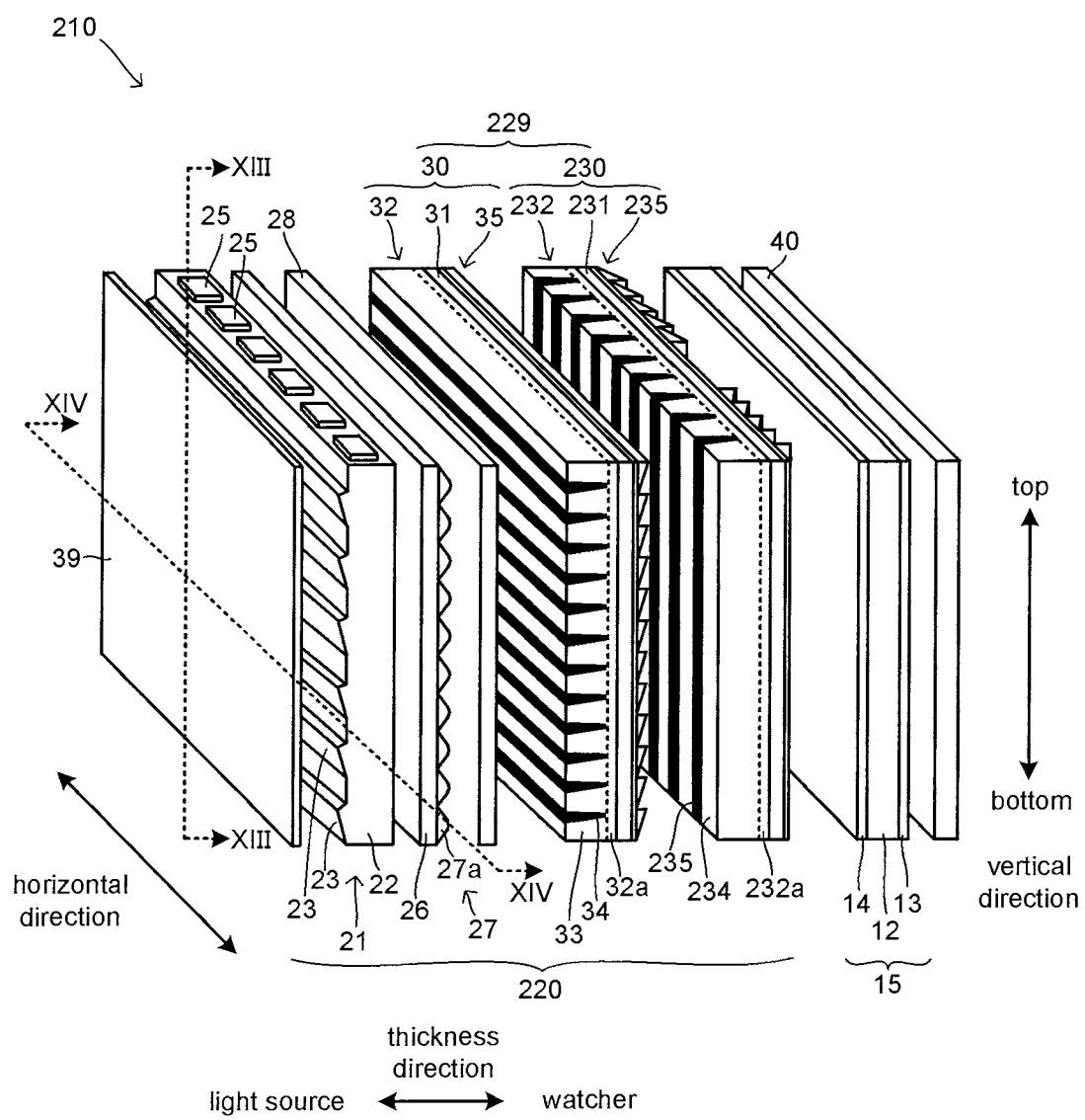
FIG. 12 is an explanatory exploded perspective view of an image source unit 210.

FIG. 12 is an explanatory view of the third embodiment, and is an exploded perspective view of an image source unit 210 including an optical sheet 230. In this embodiment, the optical sheet 30 is arranged closer to the light entering side (light guiding plate 21 side) than the optical sheet 230 is, and these two optical sheets 30 and 230 constitute a light controlling member 229. In this embodiment, the optical sheet 30 may be referred to as a first optical sheet 30, and the optical sheet 230 may be referred to as a second optical sheet 230 for easy understanding.

Figure 13:
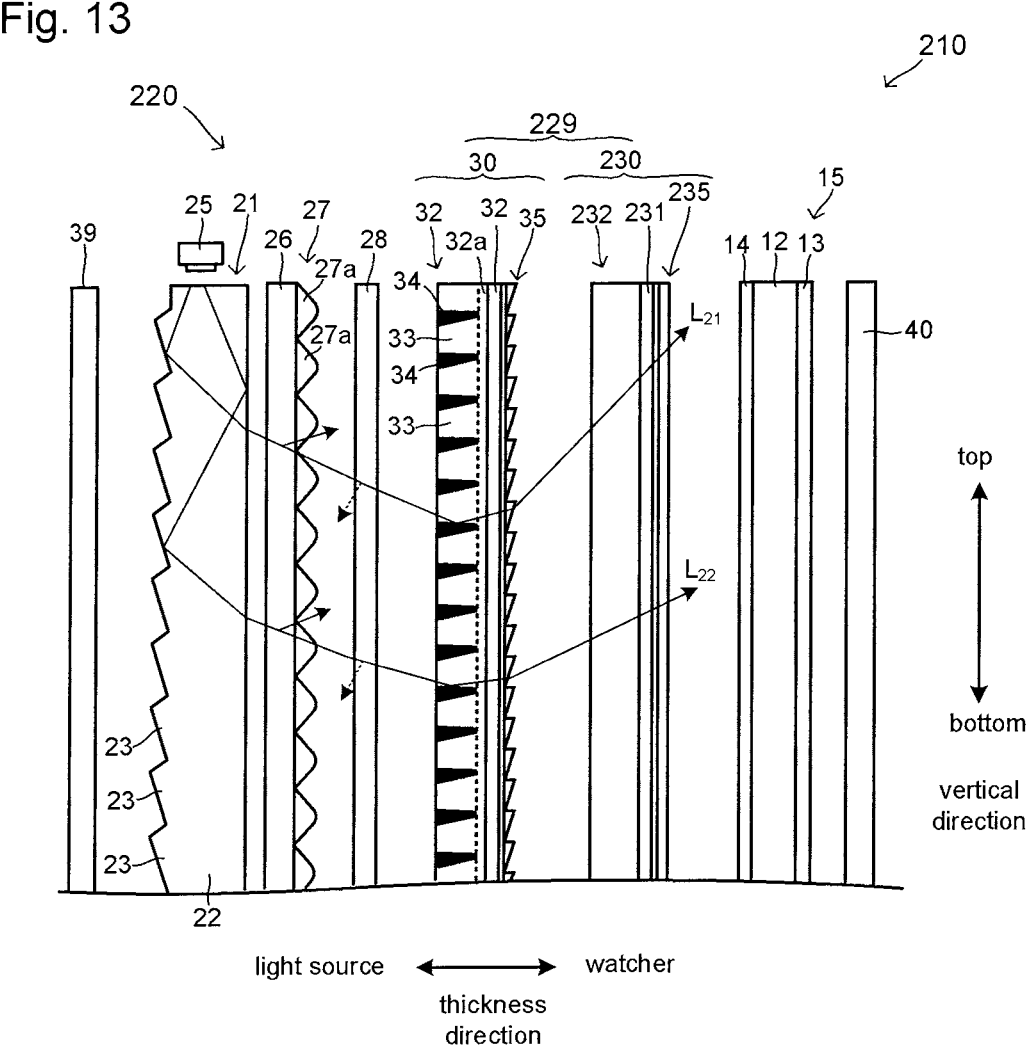
FIG. 13 is an exploded view showing a cross section of the image source unit 210.
Figure 14:
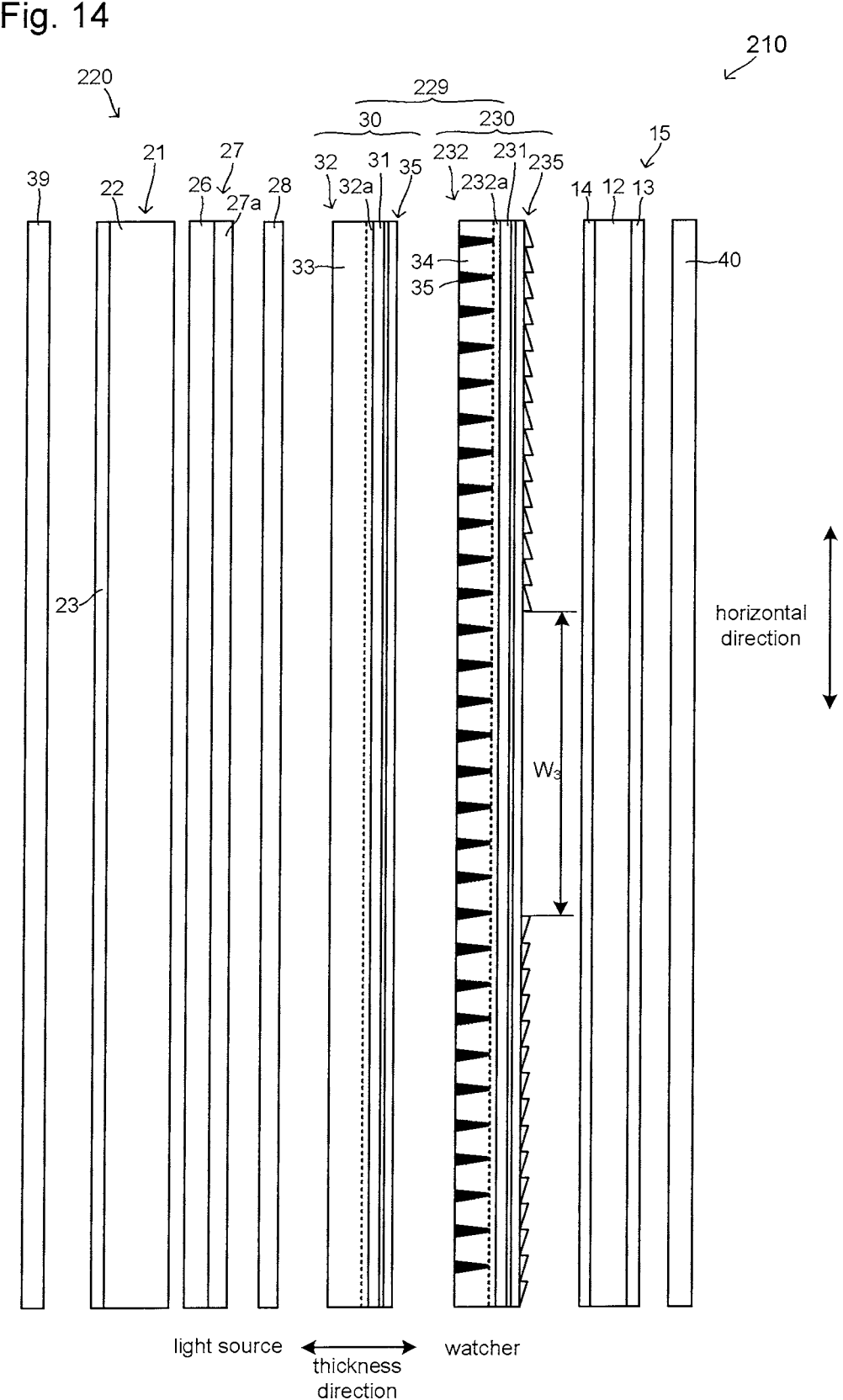
FIG. 14 is an exploded view showing another cross section of the image source unit 210.

FIG. 13 is a partially exploded cross-sectional view of the image source unit 210 taken along the line XIII-XIII in FIG. 12 (line along the vertical direction), and FIG. 14 is an exploded cross-sectional view of the image source unit 210 taken along the line XIV-XIV in FIG. 12 (line along the horizontal direction). The vertical and horizontal directions here indicate directions of the light controlling member 229 in a display when the display in which the light controlling member 229 is arranged is used.

Such an image source unit 210 is also housed in a housing that is not shown, along with general devices necessary to operate as the image source unit 210 such as a power source to activate the image source unit 210, and an electronic circuit to control the image source unit, to constitute the display, detailed description of which is omitted. This embodiment will describe a liquid crystal image source unit as one aspect of the image source unit, and a liquid crystal display as one aspect of the display. Hereinafter the image source unit 210 will be described.

The image source unit 210 includes the liquid crystal panel 15, a surface light source device 220, and the functional film 40. In this embodiment, the optical sheet 230, and the light controlling member 229 including this sheet are included in the surface light source device 220. FIGS. 12 to 14 show the directions when the display is installed, together.

Here, the liquid crystal panel 15 and the functional film 40 may be understood same as in the image source unit 10 in the first embodiment, and thus the same reference signs are given them to omit description thereof.

The surface light source device 220 is arranged on a side opposite to the watcher side across the liquid crystal panel 15, and is a lighting device to exit a planar light toward the liquid crystal panel 15. As can be seen from FIGS. 12 to 14, the surface light source device 220 in this embodiment is configured as an edge light type surface light source device, including the light guiding plate 21, the light source 25, the light diffusion plate 26, the prism layer 27, the reflection type polarizing plate 28, the light controlling member 229, and the reflection sheet 39.

Here, the members other than the light controlling member 229 may be understood same as in the surface light source device 20 included in the image source unit 10 in the first embodiment, and thus the same reference signs are given them to omit description thereof.

In this embodiment, the light controlling member 229 is constituted of the first optical sheet 30 and the second optical sheet 230. The first optical sheet 30 is arranged on the light guiding plate 21 side, and the second optical sheet 230 is arranged on the liquid crystal panel 15 side.

Here, the first optical sheet 30 may be understood same as the optical sheet 30 included in the surface light source device 20, and thus the same reference sign is given it to omit description thereof.

Figure 15:
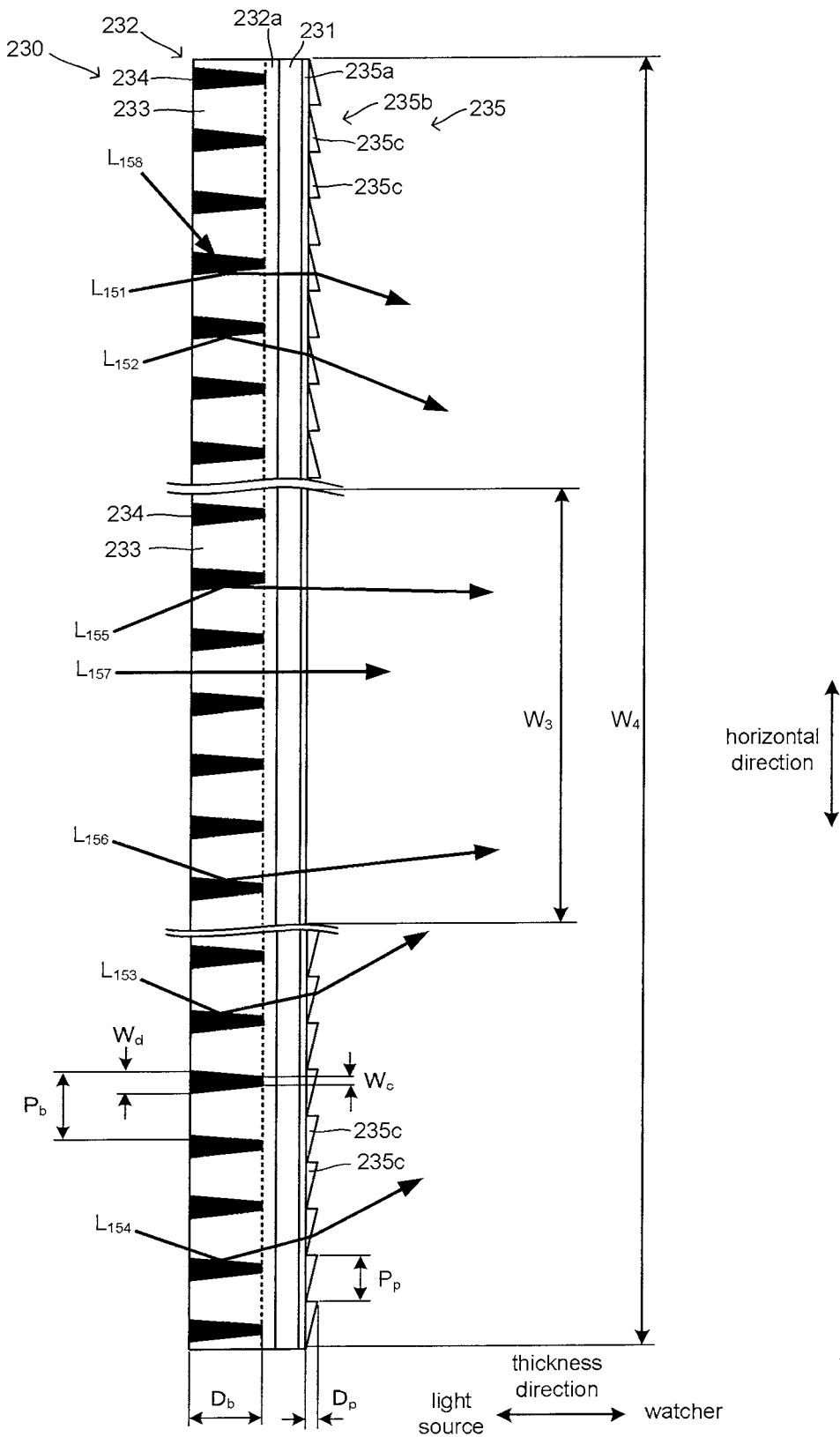
FIG. 15 is an enlarged cross-sectional view focusing on a second optical sheet 230.

FIG. 15 partially shows an enlarged second optical sheet 230 from the point of view of FIG. 14. As is seen from FIGS. 12 to 15, the second optical sheet 230 includes a base material layer 231 formed in a sheet shape, an optical functional layer 232 provided for one face of the base material layer 231 (face on the first optical sheet 30 side in this embodiment), and a light exiting side light controlling layer 235 arranged on the other face of the base material layer 231 (face on the liquid crystal panel 15 side in this embodiment).

Here, the base material layer 231 may be understood same as the base material layer 31 in the optical sheet 30.

The optical functional layer 232 is a layer laminated on one surface of the base material layer 231 (face on the first optical sheet 30 side in this embodiment), and is constituted of light transmissive portions 233 and light absorbing portions 234. The optical functional layer 232 has a shape having the cross section shown in FIGS. 14 and 15, and extending from the back to the front on the drawing sheet (vertical direction when the image source unit 210 is viewed in the front view in this embodiment). The light transmissive portions 233 and the light absorbing portions 234 are alternately aligned along a face of the optical functional layer 232 in a direction different from the extending direction thereof (horizontal direction in this embodiment).

Each of the light transmissive portions 233 is a portion whose main function is to transmit light. In this embodiment, the light transmissive portion 233 is an element having an approximately trapezoidal cross-sectional shape that has a longer lower base on the base material layer 231 side and a shorter upper base on the opposite side (first optical sheet 30 side) on the cross section shown in FIGS. 14 and 15.

A plurality of the light transmissive portions 233 extend in one direction (vertical direction in this embodiment) along the layer face of the base material layer 231 as keeping the above described cross sections, and are aligned at intervals in a different direction from the extending direction (horizontal direction in this embodiment). A gap (groove) having an approximately trapezoidal cross section is formed between respective adjacent light transmissive portions 233. Therefore, each gap (groove) has a trapezoidal cross section having a longer lower base on the upper base side of the light transmissive portions 233 (first optical sheet 30 side), and a shorter upper base on the lower base side of the light transmissive portions 233 (base material layer 231 side). Necessary materials described later are filled in the gaps, to form the light absorbing portions 234.

In this embodiment, a sheet-like sill portion 232a links a plurality of the light transmissive portions 233 at their lower base side (base material layer 231 side).

Such a structure leads to such arrangement that the extending direction of the light transmissive portions 33 of the first optical sheet 30 and that of the light transmissive portions 233 of the second optical sheet 230 cross each other in the front view of the optical sheets.

The refractive indexes of the light transmissive portions 233 and the light absorbing portions 234 may be understood same as those of the light transmissive portions 33 and the light absorbing portions 34 of the optical sheet 30.

Figure 16:
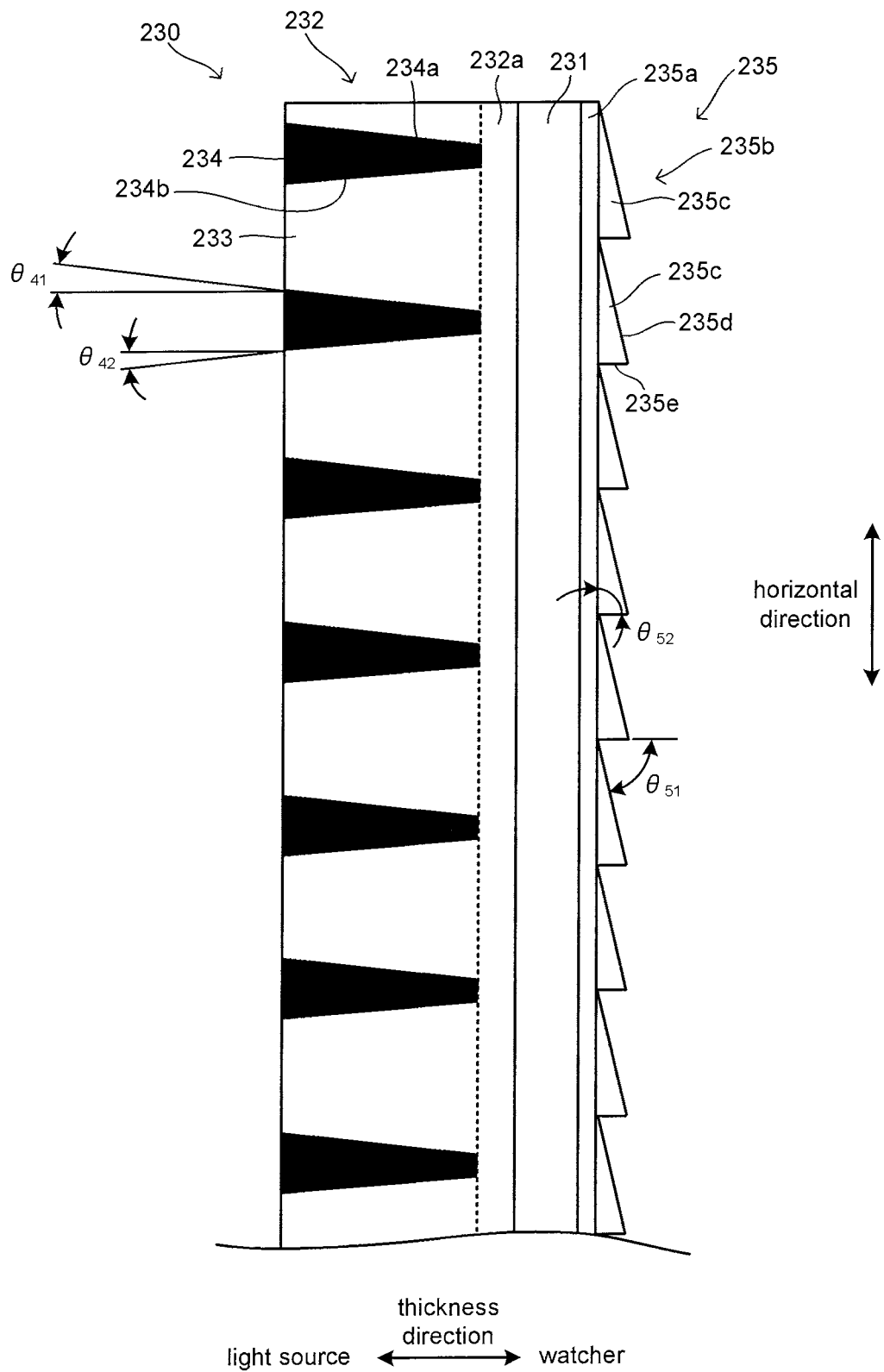
FIG. 16 is a further enlarged partial cross-sectional view of the second optical sheet 230.

The optical functional layer 232 is not specifically limited, and for example, may have the following shape. FIG. 16 is a partially further enlarged view of FIG. 15 (top portion of FIG. 15).

$\theta_{41}$ shown in FIG. 16 is an angle formed by an interface 234a, and the normal line of the layer face of the optical functional layer 232: the interface 234a is left or right one of each interface between the light transmissive portions 233 and the light absorbing portions 234 in the horizontal direction when the second optical sheet 230 is arranged in a state as FIG. 12. $\theta_{42}$ is an angle formed by an interface 234b, and the normal line of the layer face of the optical functional layer 232: the interface 234b is the other left or right one of each interface between the light transmissive portions 233 and the light absorbing portions 234 in the horizontal direction when the second optical sheet 230 is arranged in a state as FIG. 12.

$\theta_{41}$ and $\theta_{42}$ are preferably 0° to 10° in this embodiment. The relationship between the sizes of the angles $\theta_{41}$ and $\theta_{42}$ may be set as necessary.

The pitch of the light transmissive portion 233 and the light absorbing portion 234, shown by $P_b$ in FIG. 15, is preferably 20 μm to 100 μm, and more preferably 30 μm to 100 μm. The thickness of the light absorbing portion 234 shown by $D_b$ in FIG. 15 is preferably 50 μm to 150 μm, and more preferably 60 μm to 150 μm. The pitch and thickness within these ranges make it possible to give suitably balanced transmission and absorption of light.

In this embodiment, the example where each interface between the light transmissive portions 233 and the light absorbing portions 234 is in the form of a straight line on the cross section is given. The interface may be in the form of a polygonal, a convex curved line, a concave curved line, etc. without limitation to the above. A plurality of the light transmissive portions 233 and the light absorbing portions 234 may have the same cross-sectional shape, or different cross-sectional shapes having regularity.

The example where the extending direction of the light transmissive portions 233 and the light absorbing portions 234 is vertical is described above. This direction is preferably offset from the aligning direction of the pixels of the liquid crystal layer 12 in the front view of the image source unit (bias angle $\alpha_3$) in view of suppressing moire. This bias angle $\alpha_3$ is not specifically restricted as long as moire is prevented, and is preferably 1° to 10°.

The light exiting side light controlling layer 235 will be described. The light exiting side light controlling layer 235 controls the direction of light exiting the optical functional layer 232, to let the light exit. In this embodiment, the light exiting side light controlling layer 235 controls the direction of the light which is controlled in the optical functional layer 232, to make the angle where the light exits a desired angle. More specifically, the light exiting the outer circumference area of the sheet is controlled so as to travel as inclining to the center compared with the direction of the normal line of the sheet.

The light exiting side light controlling layer 235 is therefore constituted of a supporting layer 235a and an optical element layer 235b.

The supporting layer 235a is a transparent sheet-like member that functions as a supporting body of the optical element layer 235b, and may be understood same as the supporting layer 35a of the optical sheet 30.

The optical element layer 235b is a layer to change the direction of the light exiting the optical functional layer 232, and is formed of a plurality of unit optical elements 235c aligned over a face of the supporting layer 235a which is on the opposite side to the optical functional layer 232.

In this embodiment, the optical element layer 235b is arranged over the supporting layer 235a. The optical element layer 235b is not limited the above, and may be directly arranged over a face of the base material layer 231 which is opposite to the side where the optical functional layer 232 is arranged. In this case, the light exiting side light controlling layer does not have any supporting layer, and is constituted of the optical element layer 235b only.

In this embodiment, the optical element layer 235b is a layer to change the direction of the light exiting toward the outer circumference of the sheet, which is controlled in the optical functional layer 232, so that the light exits as inclining to the center compared with the direction of the normal line of the sheet in the aligning direction of a plurality of the unit optical elements 235c (horizontal direction in this embodiment).

Each of the unit optical elements 235c is in the form of a triangular prism having a triangular cross section protruding opposite to the optical functional layer 232 as shown in FIGS. 14 to 16, a ridge of which is constituted of a ridge line extending in the same direction as the extending direction of the light transmissive portions 233 and the light absorbing portions 234 (bias angle $\alpha_4$=0°), or extending as being offset in the front view of the optical sheet (bias angle $\alpha_4 \neq 0°$) (extending in the vertical direction in this embodiment), as having that cross section. A plurality of the unit optical elements 235c are aligned in a direction different from their extending direction (horizontal direction in this embodiment).

When the ridge line of each of the unit optical elements 235c extends as being offset from the extending direction of the light transmissive portions 233 and the light absorbing portions 234 in the front view of the optical sheet (bias angle $\alpha_4 \neq 0°$), preferably, the extending direction of the light transmissive portions 233 of the optical functional layer 232 relatively inclines from the extending direction of the ridge lines of the unit optical elements 235c by the bias angle $\alpha_4$ of $0° < \alpha_4 \leq 45°$ in the front view of the light controlling member 229. This makes it possible to prevent moire due to the aligning structure of the light transmissive portions 233 and the light absorbing portions 234, and the aligning structure of the unit optical elements 235c. The angle $\alpha_4$ of more than 45° leads to lowered efficiency of the control of the direction of light in the unit optical elements 235c. The angle $\alpha_4$ is more preferably $1° \leq \alpha_4 \leq 10°$.

As seen from FIG. 15, the cross-sectional shapes of the unit optical elements 235c are in symmetry on one and the other end sides of the optical element layer 235b in this embodiment across the center of the sheet in the aligning direction of the unit optical elements 235c, and a central area between the one and the other end sides does not include unit optical element 235c (portion of $W_3$ in FIG. 15). That is, this portion is flat, and, in other words, is a portion where an angle formed by a main refracting face of the unit optical element and the normal line of the sheet face ($\theta_{51}$ in FIG. 16) is 90°.

Such a portion where no unit optical element is included is not always necessary to be provided. The unit optical elements 235c to be in symmetry may be adjacent to each other across the center of the sheet. The adjacent unit optical elements in symmetry across the center of the sheet as described above, however, cause a line along the boarder therebetween, which may be visually recognized. Thus, it is preferable that no unit optical element exist at least on the center of the sheet, and the center thereof be flat. For example, a surface of a die has only to be processed so that a cutting tool is over part of the surface which corresponds to the center of the sheet when the die for forming the optical element layer 235 is made by cutting, in order that no line appears on the center of the sheet as described above.

Such a plurality of the unit optical elements 235c may be aligned according to, for example, a linear Fresnel lens.

Each of the unit optical elements 235c includes a main refracting face 235d and a rise face 235e as seen from FIG. 16. These main refracting face 235d and rise face 235e form two faces of a triangular prism, and the other one face is over the supporting layer 235a to be fixed to the supporting layer 235a.

In this embodiment, the main refracting face 235d is a refracting face to change the direction of the light exiting the optical functional layer 232 in the horizontal direction so that the light travels as inclining toward the central side compared with the normal line of the sheet in the state of FIGS. 12 to 16. This directs the light exiting an end part of a screen toward the central side in the aligning direction of the unit optical elements 235c (horizontal direction in this embodiment), thus to direct the light from the end part of the screen toward a watcher who views the center of the screen in the front view, which makes it possible for the watcher to clearly watch the light exiting the end part of the screen. In this case, when one main refracting face 235d is focused on, this main refracting face 235d inclines in a separating direction (more protruding direction) from the optical functional layer 232 as being close to the central side of the sheet. Thus, when one unit optical element 235c is focused on, the main refracting face 235d is on the outer circumferential side of the sheet, and the rise face 235e is on the central side of the sheet. The inclination of the main refracting face 235d forms an angle $\theta_{51}$ shown in FIG. 16 with the direction of the normal line of the optical functional layer 232.

A specific angle of $\theta_{51}$ is preferably more than 45° and less than 90° (the absolute value of the inclination angle of the main refracting face is more than 45° and less than 90°).

This makes it possible to surely control light for improving brightness in a desired direction (control of the light exiting angle). $\theta_{51}$ of no more than 45° may increase light totally reflected on the main refracting face 235d not to exit. $\theta_{51}$ of no less than 90° makes it almost impossible for the main refracting face to function. $\theta_{51}$ is more preferably 80° to 89°. $\theta_{51}$ of this range makes it possible to use a small rise face 235e, to reduce a stray light due to the rise face 235e.

$\theta_{51}$ is preferably different between the unit optical elements 235c on the central side and those on the outer circumferential side in the aligning direction of the unit optical elements 235c (horizontal direction in this embodiment). This makes it possible to further accurately control light. $\theta_{51}$ is more preferably formed so as to be narrower from the unit optical element 235c on the central side to those on the outer circumferential side. This makes it possible to efficiently control the direction of light travelling to the center.

The rise face 235e is a face necessary for forming the main refracting face 235d.

The rise face 235e preferably forms the inclination angle, which is shown as $\theta_{52}$ in FIG. 16, of 80° to 100° with the direction along the light exiting face of the optical functional layer 232. $\theta_{52}$ is more preferably 80° to 90° in view of production. $\theta_{52}$ of less than 80°, and $\theta_{52}$ of more than 100° may increase a stray light due to the rise face 235e.

The vertex angle of the unit optical element 235c is naturally determined by $\theta_{51}$ and $\theta_{52}$, and is preferably no less than 45° and less than 90°.

The pitch of the unit optical element 235c shown by $P_p$ in FIG. 15 is preferably short from the viewpoint that moire of a short pitch makes it difficult for the moire to be seen even if the moire appears. Specifically, the pitch $P_p$ is preferably no more than 50 μm.

It is desirable that the pitch $P_p$ of the unit optical element 235c be shorter than the pitch $P_b$ of the light transmissive portion 233 of the optical functional layer 232 (see FIG. 15) since the optical functional layer 232 is more difficult than the optical element layer 235b in production. It is further desirable that $P_p$ be no more than ½ of $P_b$. It is most desirable that an end part of the light transmissive portion 233 and an end part of the unit optical element 235c be not at the same location as long as possible when $P_p$ is regularly magnified like $P_b/2$, $P_b/3$, and $P_b/4$. In other words, it is desirable that the least common multiple of $P_p$ and $P_b$ be a large number.

$P_p$ is preferably no less than 10 μm since a small unit optical element 235c leads to lowered accuracy.

$P_{mx}$ (μm) is more preferably no more than 10000 (μm) when the aligning pitch of the light transmissive portions 233 is $P_b$ (μm) and the aligning pitch of the unit optical elements 235c is $P_p$ (μm). $P_{mx}$ may be understood in the same way as described above.

The protruding height of the unit optical element 235c from the supporting layer 235a, which is shown by $D_p$ in FIG. 15 is preferably 1 μm to 10 μm. The height lower than this lower limit may lead to deteriorated accuracy of processing, which leads to defects such that stripe lines are visually recognized. The height higher than this upper limit makes it easy for moire to appear due to the light absorbing portions 234 and the unit optical elements 235c.

In this embodiment, a plurality of the unit optical elements 235c are continuously arranged without any gaps, but not limited to this. In another aspect, a gap may be provided between adjacent unit optical elements 235c, from which a face of the supporting layer 235a may be exposed.

In this embodiment, the main refracting face 235d of the unit optical element 235c is linear on the cross section shown in FIGS. 14 to 16, but is not always limited to this. The main refracting face 235d may be in the form of a convex or concave curved line, or a polygonal line on its cross section.

The main refracting face 235d and the rise face 235e may be rough faces. This makes it possible to scatter light to suppress moire. A method for forming the main refracting face 235d and the rise face 235e into rough faces is not specifically limited. Examples thereof include direct blasting on the unit optical element, and blasting on a die for molding the unit optical element.

All of a plurality of the unit optical elements 235c are not always necessary to have the same shape, and may suitably have different shapes from each other.

In this embodiment, the supporting layer 235a is provided for the light exiting side light controlling layer 235. The supporting layer 235a is not always necessary to be provided as described above, and the optical element layer 235b may be directly formed over the base material layer 231. At this time, a face of the base material layer 231 which forms the interface with the optical element layer 235b may be formed into a rough face, and the base material layer 231 may be different from the optical element layer 235b in refractive index. This makes it possible to scatter light on the rough face to suppress moire.

The light exiting side light controlling layer is not always necessary to be united with the base material layer and the optical functional layer, and may be provided separately. Therefore, an air layer may be formed, or another functional layer may be arranged between the light exiting side light controlling layer, and the base material layer or the optical functional layer.

Such a supporting layer 235a and optical element layer 235b (unit optical element 235c) of the light exiting side light controlling layer 235 may be made from materials same as those of the supporting layer 35a and the optical element layer 35b of the optical sheet 30.

The second optical sheet 230 can be produced according to the optical sheet 30 as described above.

Operations of the image source unit 210 having the above described structure will be described as showing examples of an optical path. The examples of an optical path are for conceptualistic explanation, and do not strictly give degrees of reflection and refraction. The manner of exiting the light source 25 to reach the light controlling member 229 is the same as that in the examples of an optical path described concerning the image source unit 10, and thus description thereof will be omitted (see FIG. 2).

Figure 17:
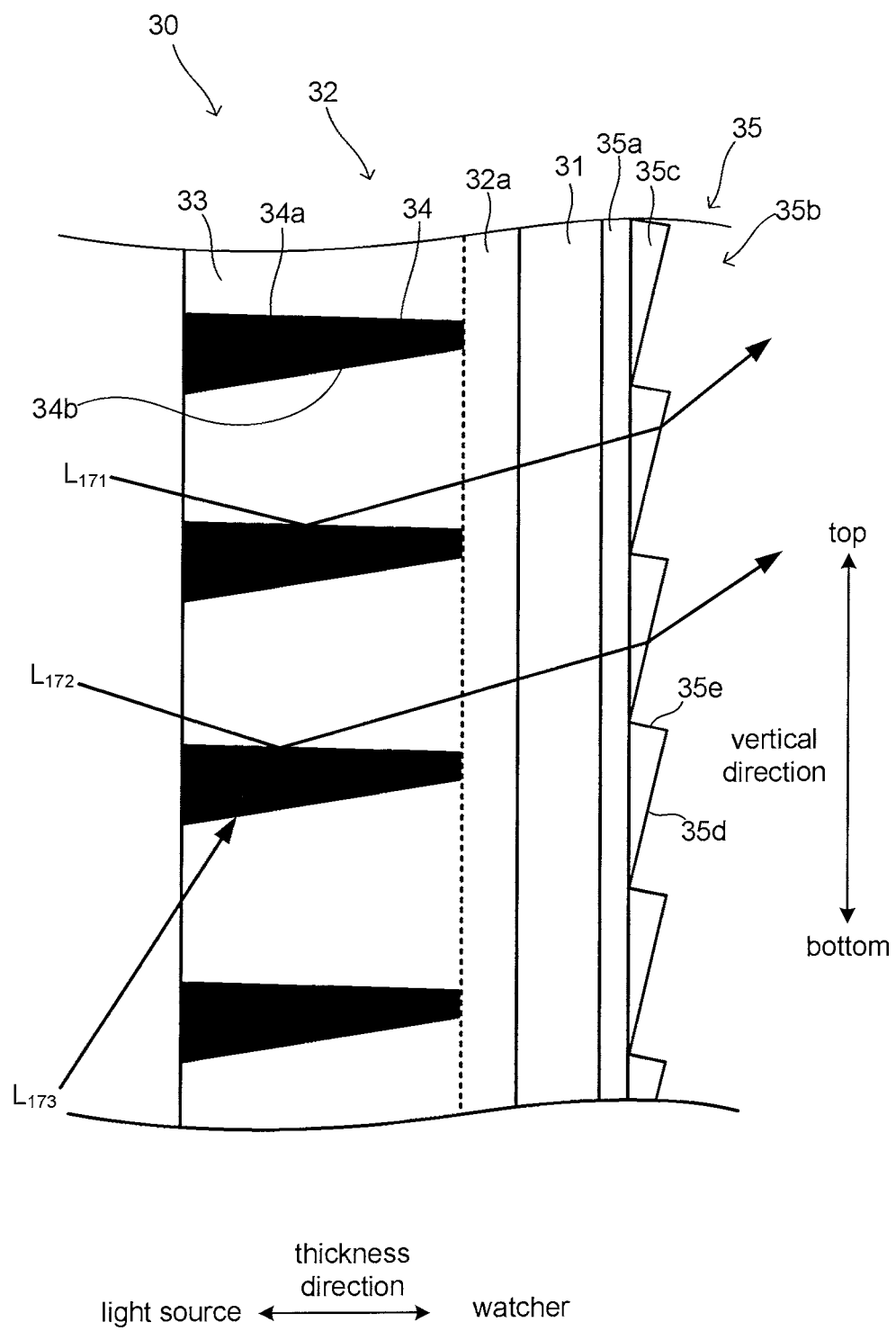
FIG. 17 is an explanatory view of examples of an optical path in the first optical sheet 30.

The light entering the light controlling member 229 enters the first optical sheet 30 first, and travels as having an optical path as follows. FIG. 17 shows examples of an optical path in the first optical sheet 30.

The entering light is directed toward the interface 34a of interfaces between the light transmissive portions 33 and the light absorbing portions 34, which is on the upper side of the light absorbing portion 34 in the direction where the light transmissive portions 33 and the light absorbing portions 34 are alternately aligned (vertical direction in this embodiment) as shown by lights $L_{171}$ and $L_{172}$ in FIG. 17. Then the light is totally reflected on the interface 34a to be an obliquely upward light toward the watcher side, to be controlled in a desired direction.

At this time, if the interface 34b of interfaces of the light transmissive portions 33 and the light absorbing portions 34, which is on the lower side of the light absorbing portion 34, inclines obliquely upwards toward the watcher, it becomes difficult for the light absorbing portions 34 to block light as the lights $L_{171}$, and $L_{172}$ from travelling, which makes it possible to guide more light in a desired direction.

Since $L_{173}$ shown in FIG. 17 travels obliquely upwards toward the watcher side at such an angle as to be transmitted through the interface 34b between the light transmissive portion 33 and light absorbing portion 34 without total reflection on this interface, $L_{173}$ is transmitted through the interface 34b, to be absorbed in the light absorbing portion 34.

This makes it possible to efficiently absorb and block the light exiting at a light exiting angle that is no less than a desired angle, and further to efficiently control the travelling direction of light.

This also makes it possible to absorb such light entering the liquid crystal panel to probably lead to defects such as deteriorated contrast and color inversion, and the low quality of an image.

The direction of the light transmitted through the optical functional layer 32 is further changed in the optical element layer 35b. Specifically, in this embodiment, the main refracting face 35d refracts the lights $L_{171}$ and $L_{172}$ further upwards, to be exited as shown by the lights $L_{171}$ and $L_{172}$ in FIG. 17. This makes it possible to shift a light exiting range further upwards.

Therefore, the first optical sheet 30 in this embodiment (B in FIG. 8) also makes it possible to efficiently increase light exiting more upwards in the vertical direction than the case where no light exiting side light controlling layer 35 is included (A in FIG. 8) as shown in FIG. 8. It is difficult to adjust the light exiting angle as described above only by the optical functional layer 32. Even if do so, the adjustment can be accompanied with defects such as a lowered brightness. Against this, further including the optical element layer 35b like the first optical sheet 30 makes it possible to efficiently control the light exiting angle.

The optical element layer 35b for controlling light as described above has a simple structure as described above, and takes an effect with such an easy structure.

The light exiting the first optical sheet 30 reaches the second optical sheet 230. The light entering the second optical sheet 230 travels as having an optical path as follows. FIG. 15 shows examples of an optical path in the second optical sheet 230.

Lights $L_{151}$ to $L_{156}$ in FIG. 15 are totally reflected on interfaces between the light transmissive portions 233 and the light absorbing portions 234 in a direction where the light transmissive portions 233 and the light absorbing portions 234 are alternately aligned (horizontal direction in this embodiment), and are changed so as to direct toward the normal line of the sheet face. This makes it easy to control light in the optical element layer 235b as desired.

Light $L_{157}$ is a light travelling almost in the front direction in the horizontal direction first of all, and is transmitted through the light transmissive portion 233 without reaching the light absorbing portion 234.

Light $L_{158}$ shown in FIG. 15 is a light travelling at a wide angle with the front in the horizontal direction. This light travels at such an angle as to be transmitted through an interface between the light transmissive portions 233 and the light absorbing portions 234 without total reflection on the interface, and thus is transmitted through the interface to be absorbed in the light absorbing portion 234.

This makes it possible to efficiently absorb and block the light exiting at no less than a desired angle, and further to efficiently control the direction of travelling light. This also makes it possible to absorb such light entering the liquid crystal panel to probably lead to defects such as deteriorated contrast and color inversion.

The direction of the light transmitted through the optical functional layer 232 is further changed in the optical element layer 235b. Specifically, in this embodiment, light may exit the main refracting face 235d so as to travel as inclining toward the center compared with the normal line of the sheet face in the aligning direction of the unit optical elements 235c (horizontal direction in this embodiment) as the lights $L_{151}$, $L_{152}$, $L_{153}$, and $L_{154}$ shown in FIG. 15.

The lights $L_{155}$, $L_{156}$, and $L_{157}$ are transmitted through a portion where no unit optical element 235c is included, which let light close to the front in the horizontal direction exit, to give the watcher side the light as it is.

Figure 18A:
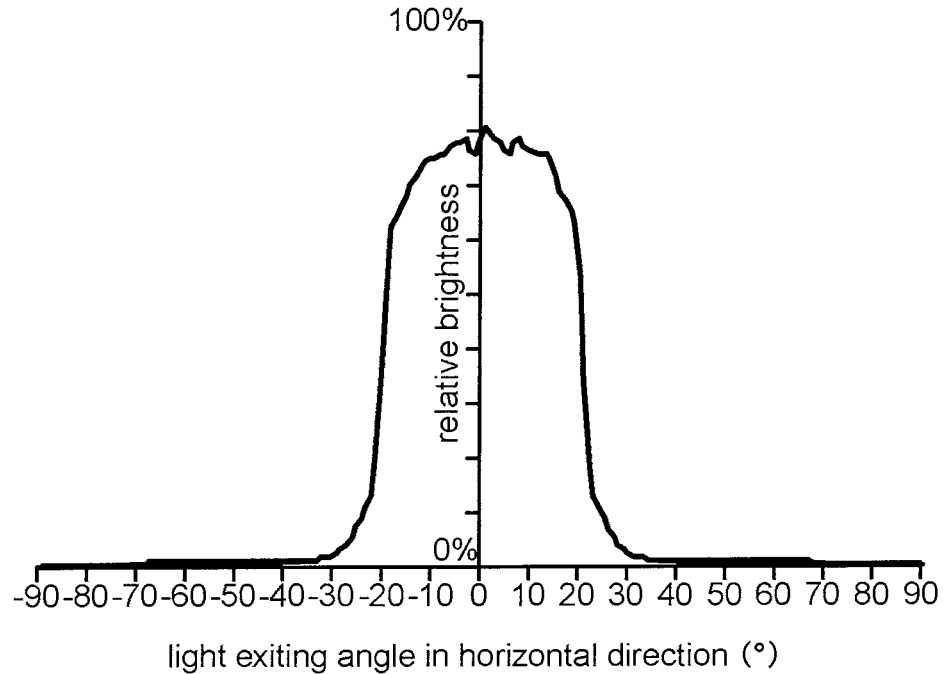
FIGS. 18A and 18B are explanatory graphs showing control of light in the second optical sheet 230.
Figure 18B:
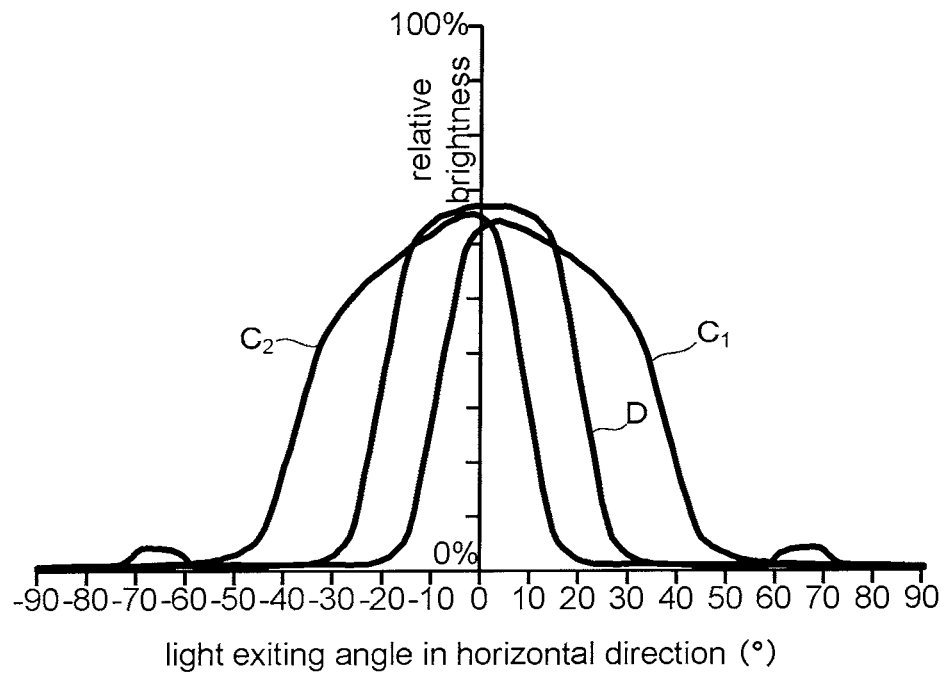

FIGS. 18A and 18B are explanatory graphs showing characteristics of the light exiting the sheet in the horizontal direction. In FIGS. 18A and 18B, the horizontal axis represents the light exiting angle with the direction of the normal line of the sheet face in the horizontal direction; the positive indicates the right and the negative indicates the left, to the front. The vertical direction represents a relative brightness when a certain brightness is defined as 100%

FIG. 18A shows one example where the light exiting side light controlling layer 235 is not provided. In this case, light exits as its light exiting angle is kept regulated in the optical functional layer, which results in the light exiting only in a direction having a small inclination (only in a direction within a range of approximately −30° and +30° in the example of FIG. 18A) from the normal line of the sheet face. Thus, a dark portion may be present especially at an outer circumferential end etc. of a screen when the screen is wide or when the screen is viewed a little obliquely.

FIG. 18B shows, in contrast, an example where the light exiting side light controlling layer 235 is included as this embodiment. The unit optical elements 235c arranged on the outer circumferential ends of the light exiting side light controlling layer 235 make it possible to control the peaks of the exiting directions of the lights exiting the unit optical elements 235c on one side of the outer circumferential end of the sheet ($C_1$) and that on the other side thereof ($C_2$) respectively, so that the peaks shift to the direction of the normal line of the sheet face (direction at 0°) as shown by $C_1$ and $C_2$ in FIG. 18B. Light exits as it is in a close direction to the normal line of the sheet face as shown by D on the central area of the sheet which is formed between the unit optical elements 235c on both outer circumferential ends, and where no unit optical element 235c is arranged. This makes it possible to prevent a dark portion from being present at an outer circumferential end etc. of a screen even when the screen is wide or when the screen is viewed a little obliquely since the light exiting the end part of the screen also inclines so as to direct to the direction where the watcher sees.

It is difficult to adjust the light exiting angle as described above only by the optical functional layer 232. Even if do so, the adjustment can be accompanied with defects such as a lowered brightness, and necessity of a complex structure. Against this, including the optical element layer 235b like the second optical sheet 230 makes it possible to efficiently control the light exiting angle.

The optical element layer 235b for controlling light as described above has a simple structure as described above, and takes an effect with such an easy structure.

Light is transmitted through such a light controlling member 229, which makes it possible to let the light exit in a vertical direction as desired, and to control the light exiting the outer circumferential ends in the horizontal direction. Such control may be efficiently performed with a simple structure.

The light exiting the light controlling member 229 enters the lower polarizing plate 14 of the liquid crystal panel 15. The lower polarizing plate 14 transmits one polarization component in the incident light, and absorbs the other polarization component. The light transmitted through the lower polarizing plate 14 is selectively transmitted through the upper polarizing plate 13 in accordance with the state of creation of an electric field for each pixel. In this manner, the liquid crystal panel 15 selectively transmits the light from the surface light source device 220 for each pixel, which makes it possible for a watcher of the liquid crystal display to observe an image. At this time, an image light is given a watcher via the functional film 40, to improve the quality of an image.

This embodiment described the example where the first optical sheet 30 and the second optical sheet 230 are combined to be employed as the light controlling member 229. Both are not always necessary to be combined, and the first optical sheet 30 and the second optical sheet 230 may be each independently employed. Each optical sheet may be separately used, or both may be combined according to an aspect of light control.

Figure 19:
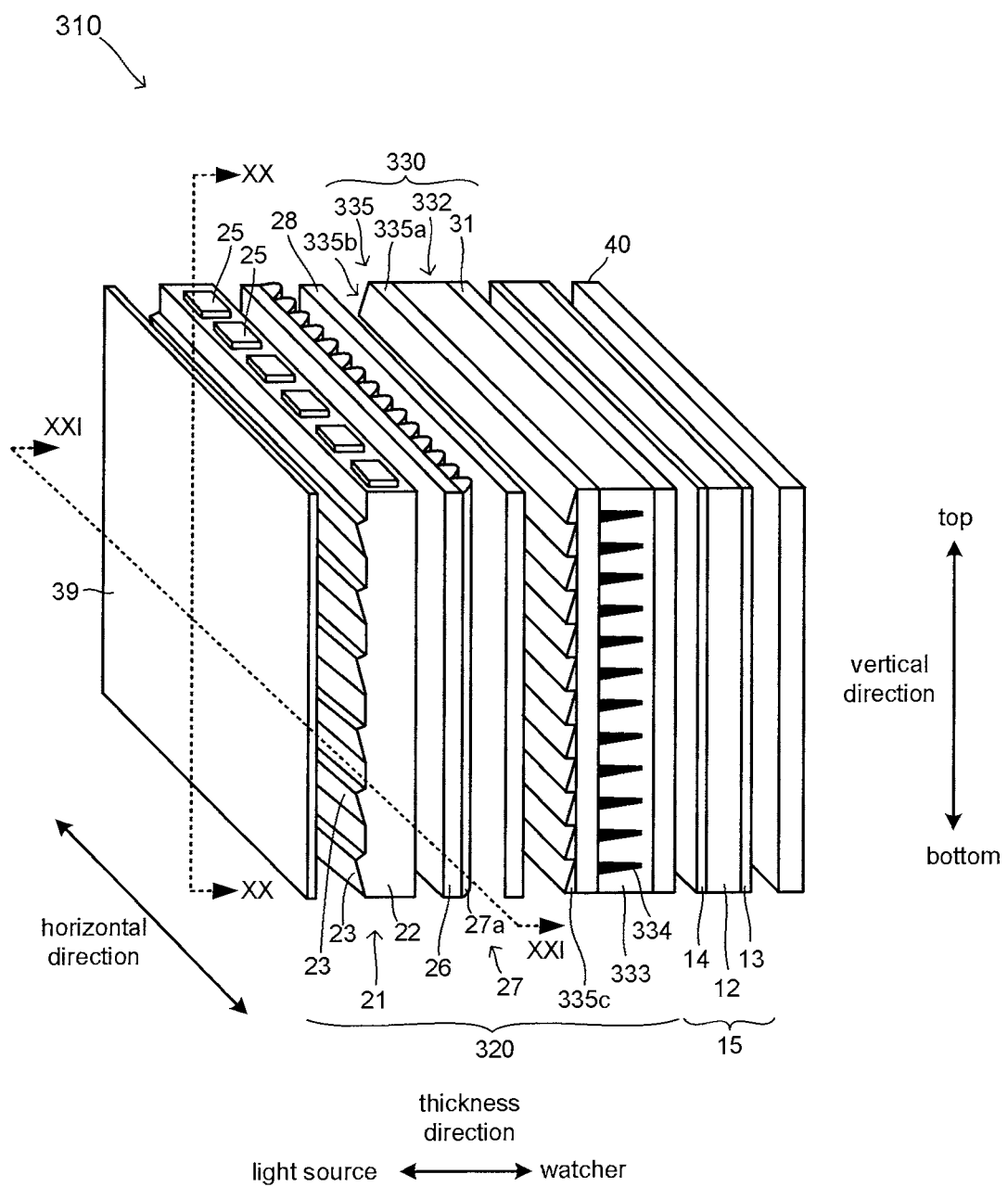
FIG. 19 is an explanatory exploded perspective view of an image source unit 310.
Figure 20:
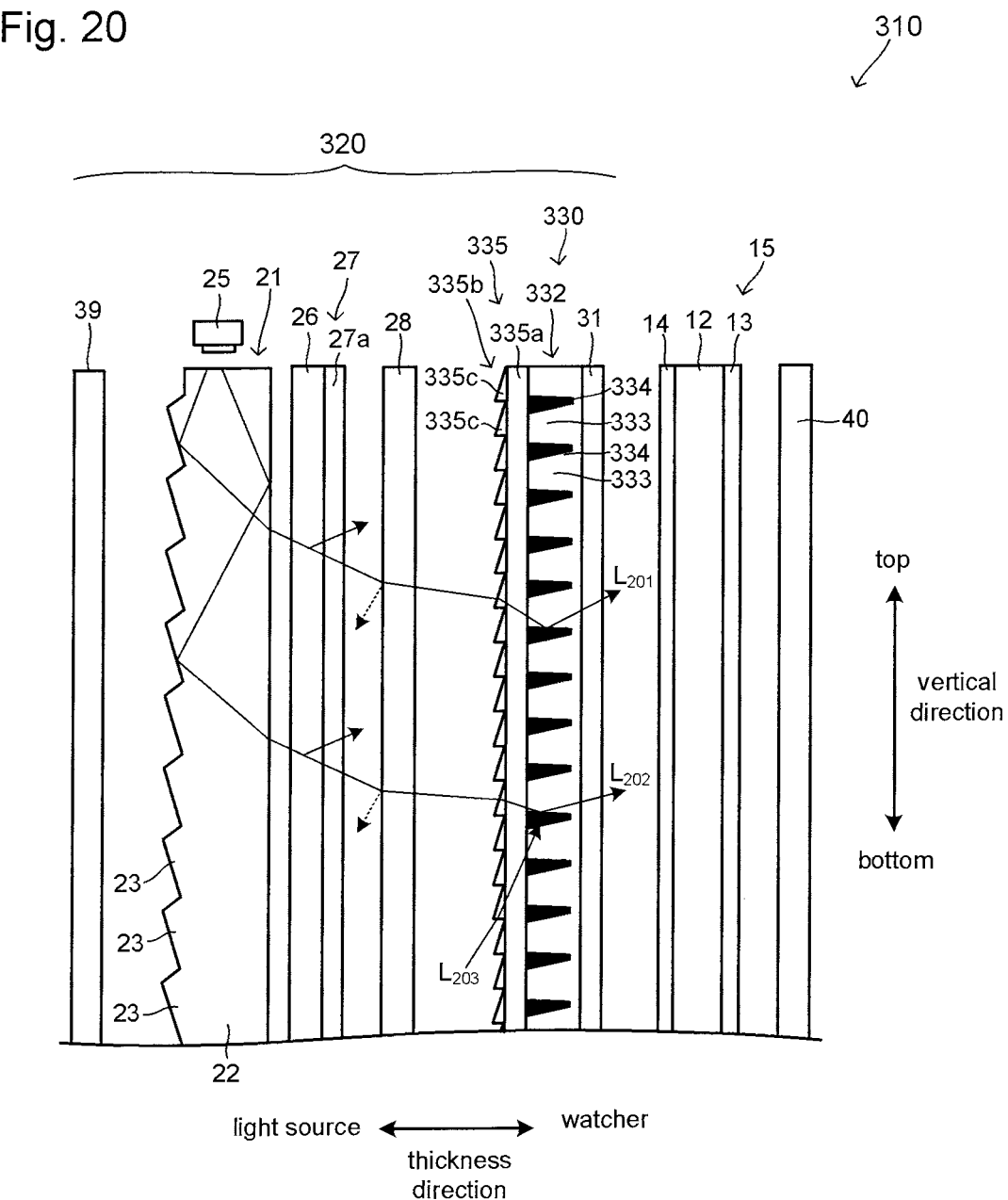
FIG. 20 is an exploded view showing a cross section of the image source unit 310.
Figure 21:
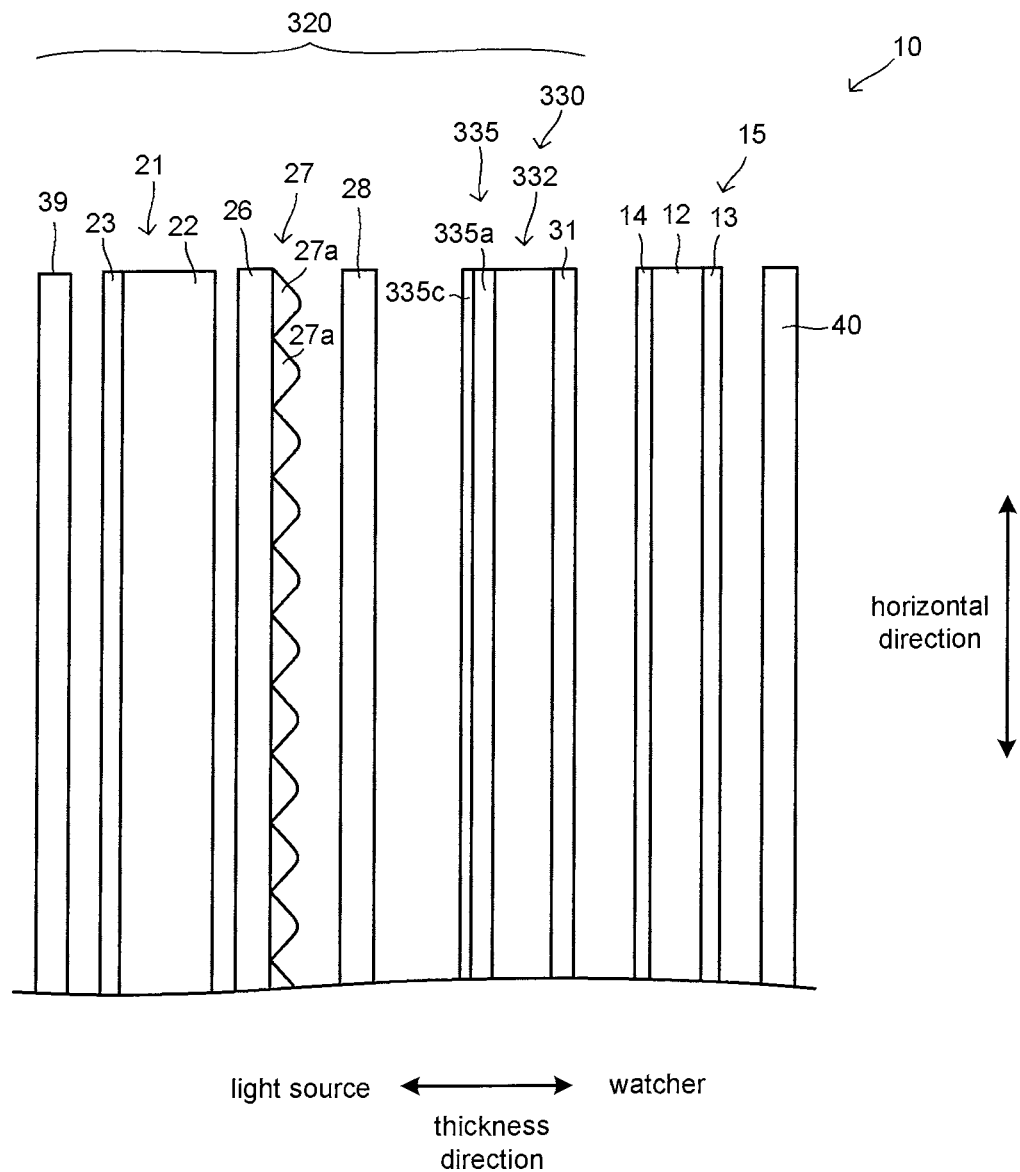
FIG. 21 is an exploded view showing another cross section of the image source unit 310.

FIG. 19 is an explanatory view of the forth embodiment, and is an exploded perspective view of an image source unit 310 including an optical sheet 330. FIG. 20 is a partially exploded cross-sectional view of the image source unit 310 taken along the line XX-XX in FIG. 19, and FIG. 21 is a partially exploded cross-sectional view of the image source unit 310 taken along the line XXI-XXI.

Such an image source unit 310 is also housed in a housing that is not shown, along with general devices necessary to operate as the image source unit 310 such as a power source to activate the image source unit 310, and an electronic circuit to control the image source unit, to constitute the display, detailed description of which is omitted. This embodiment will describe a liquid crystal image source unit as one aspect of the image source unit, and a liquid crystal display as one aspect of the display.

The image source unit 310 includes the liquid crystal panel 15, a surface light source device 320, and the functional film 40. In this embodiment, the optical sheet 330 is included in the surface light source device 320. FIGS. 19 to 21 show the directions where the display is installed, together.

Here, the liquid crystal panel 15 and the functional film 40 are the same as those in the image source unit 10, and thus the same reference signs are given them to omit description thereof.

The surface light source device 320 is arranged on a side opposite to the watcher side across the liquid crystal panel 15, and is a lighting device to exit a planar light toward the liquid crystal panel 15. As can be seen from FIGS. 19 to 21, the surface light source device 320 in this embodiment is also configured as an edge light type surface light source device, including the light guiding plate 21, the light source 25, the light diffusion plate 26, the prism layer 27, the reflection type polarizing plate 28, the optical sheet 330, and the reflection sheet 39.

Here, the members other than the optical sheet 330 are the same as those in the surface light source device 20 in the image source unit 10, and thus the same reference signs are given them to omit description thereof. In this embodiment, however, the unit prisms 27a of the prism layer 27 extend in a light guiding direction of the light guiding plate, and a plurality of the unit prisms 27a are aligned in the direction orthogonal to the light guiding direction of the light guiding plate.

Figure 22:
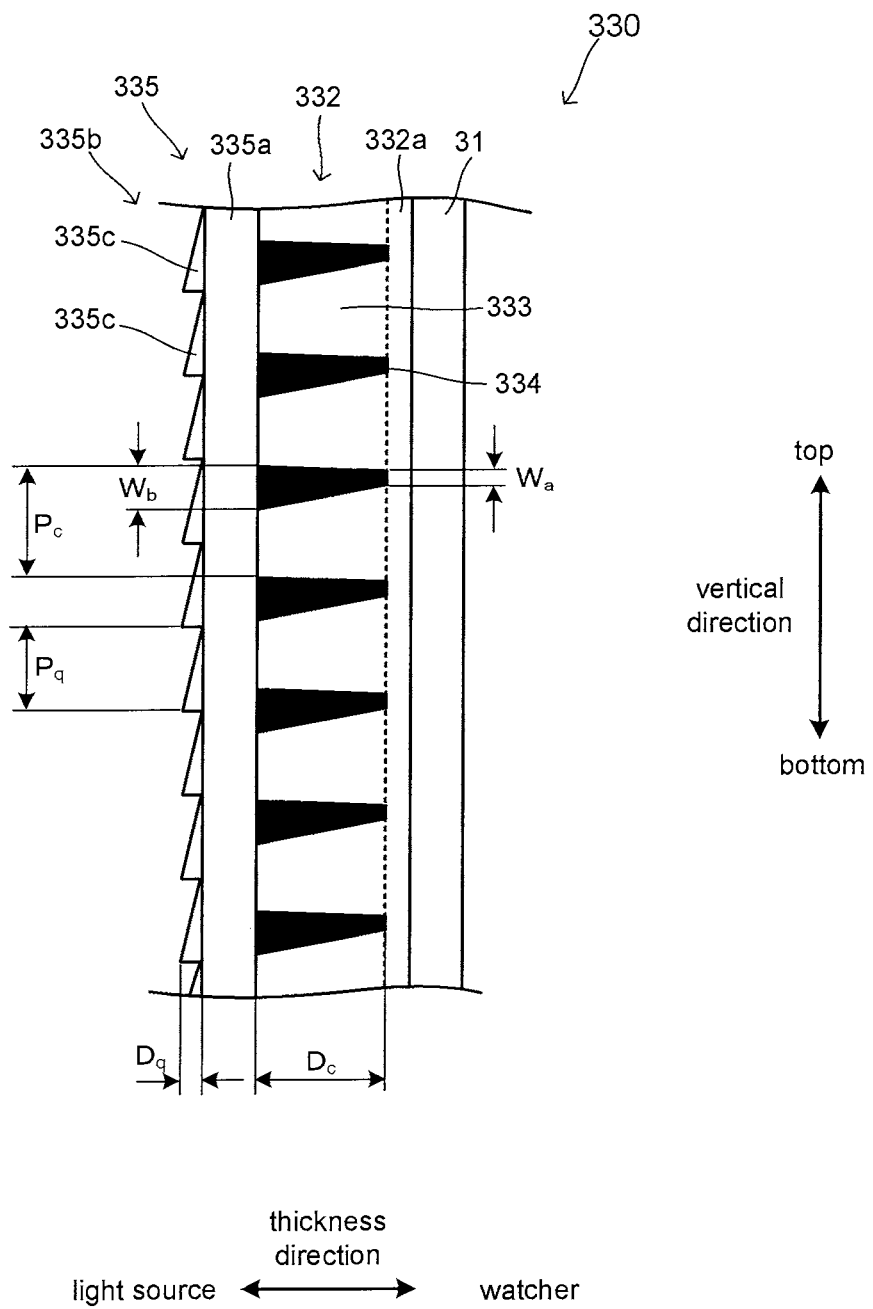
FIG. 22 is an enlarged view focusing on an optical sheet 330.

FIG. 22 partially shows an enlarged optical sheet 330 in the point of view of FIG. 20. As is seen from FIGS. 19 to 22, the optical sheet 330 includes the base material layer 31 formed in a sheet shape, an optical functional layer 332 provided for one face of the base material layer 31 (face on the light guiding plate 21 side in this embodiment), and a light entering side light controlling layer 335 that functions as a light controlling layer.

Here, the base material layer 31 is the same as that included in the optical sheet 30 of the image source unit 10, and thus the same reference signs are given it to omit description thereof.

The optical functional layer 332 is a layer laminated on one surface of the base material layer 31 (face on the light guiding plate 21 side in this embodiment), and light transmissive portions 333 and light absorbing portions 334 are alternately aligned along the layer face thereof.

The optical functional layer 332 has the cross section shown in FIG. 22, and has a shape extending from the back to the front on the drawing sheet (horizontal direction when the image source unit 310 is viewed in the front view). That is, the optical functional layer 332 includes the light transmissive portion 333 and the light absorbing portions 334: each of the light transmissive portions 333 has an approximately trapezoidal shape, and each of the light absorbing portions 334 is formed between two adjacent light transmissive portions 333 and has an approximately trapezoidal cross section, on the cross section shown in FIG. 22.

Each of the light transmissive portions 333 is a portion whose main function is to transmit light. In this embodiment, the light transmissive portion 333 is an element having an approximately trapezoidal cross sectional shape that has a longer lower base on the base material layer 31 side and a shorter upper base on the opposite side (light guiding plate 21 side, light entering side light controlling layer 335 side) on the cross section shown in FIGS. 20 and 22. The light transmissive portions 333 extend in the above described direction (horizontal direction in this embodiment) along the layer face of the base material layer 31 as keeping the above described cross sections, and are aligned at intervals in a different direction from the extending direction (vertical direction in this embodiment). A gap (groove) having an approximately trapezoidal cross section is formed between respective adjacent light transmissive portions 333. Therefore, each gap (groove) has a trapezoidal cross section having a longer lower base on the upper base side of the light transmissive portions 333 (light guiding plate 21 side, light entering side light controlling layer 335 side), and a shorter upper base on the lower base side of the light transmissive portions 333 (liquid crystal panel 15 side, base material layer 31 side). Necessary materials described later are filled in the gaps, to form the light absorbing portions 334. In this embodiment, a sheet-like sill portion 332a links adjacent light transmissive portions 333 at their longer lower base side.

The materials forming the light transmissive portions 333 and the light absorbing portions 334, and the refractive indexes thereof are understood same as those of the light transmissive portions 33 and the light absorbing portions 34 of the optical sheet 30.

Figure 23:
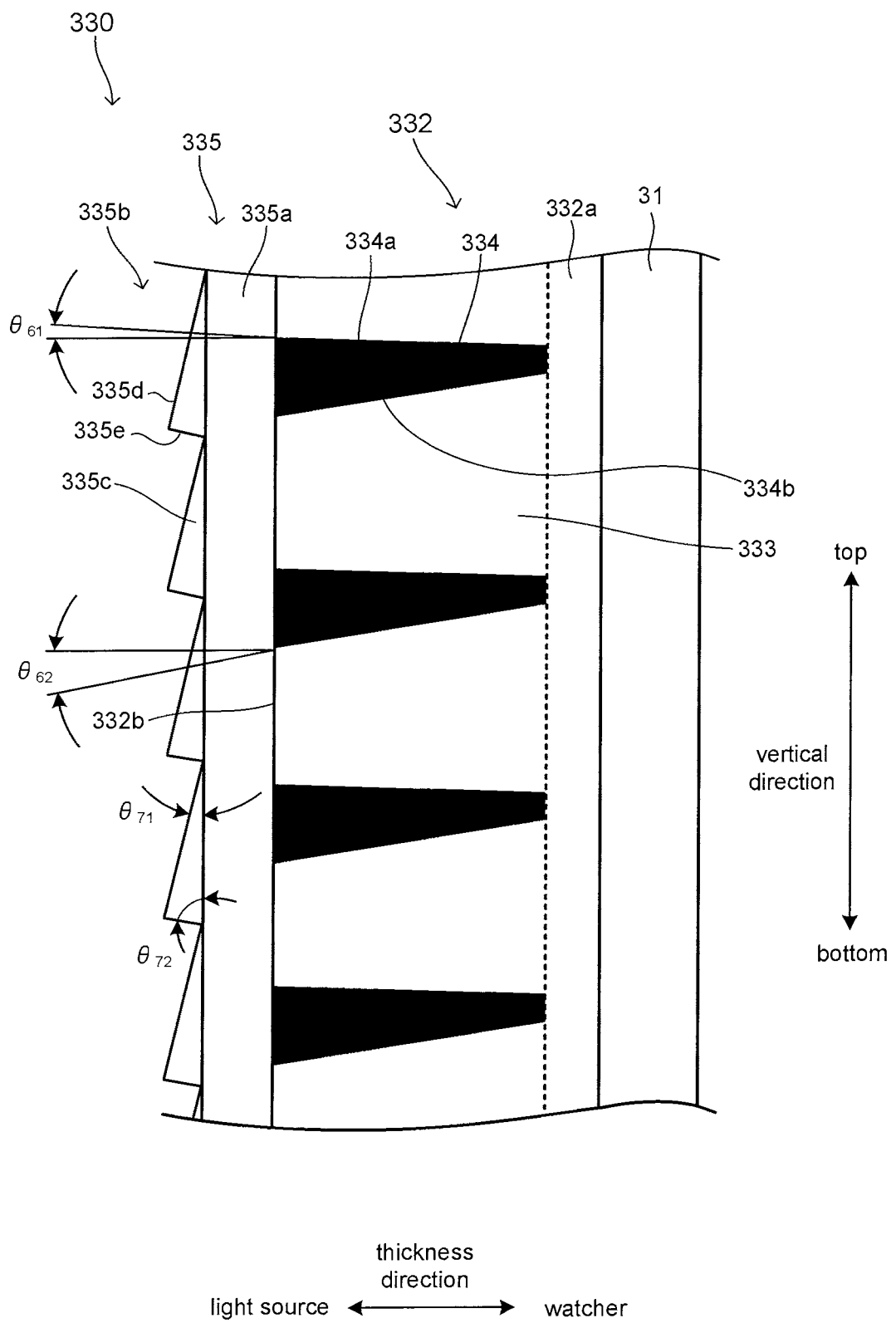
FIG. 23 is a further enlarged view of the optical sheet 330.

FIG. 23 is an explanatory view of angles $\theta_{61}$ and $\theta_{62}$ formed by interfaces between the light transmissive portions 333 and the light absorbing portions 334, and the normal line of the layer face of the optical functional layer 332. FIG. 23 is a partially further enlarged view of FIG. 22.

$\theta_{61}$ is an angle formed by an interface 334a, and the normal line of the layer face of the optical functional layer 332: the interface 334a is one of each interface between the light transmissive portions 333 and the light absorbing portions 334 which is on the upper side of the light absorbing portion 334 when the optical sheet 330 is arranged in a state as FIG. 19. $\theta_{62}$ is an angle formed by an interface 334b, and the normal line of the layer face of the optical functional layer 332: the interface 334b is one of each interface between the light transmissive portions 333 and the light absorbing portions 334 which is on the lower side of the light absorbing portion 334 in the same state.

$\theta_{61}$ is preferably 0° to 10° in this embodiment. $\theta_{61}$ of more than 0° means downward inclination from the light guiding plate 21 side (light entering side, light entering side light controlling layer 335) to the liquid crystal panel 15 side (light exiting side, base material layer 31 side). $\theta_{61}$ is more preferably no more than 4.0°, further preferably no more than 1.0°, and especially preferably 0°.

$\theta_{61}$ of less than 0° leads to difficulty in production. $\theta_{61}$ of more than 10° leads to a lowered effect on control of the direction of light in the optical functional layer 332 in combination with the light entering side light controlling layer 335. $\theta_{61}$ of more than 10° also requires large light absorbing portions 334 in the aligning direction (widths of the light absorbing portions, size in the vertical direction on the drawing sheet of FIG. 23), which tends to lead to defects such as a lowered transmittance ratio of light.

$\theta_{62}$ is preferably 0° to 10°. $\theta_{62}$ of more than 0° means upward inclination from the light guiding plate 21 side (light entering side, light entering side light controlling layer 335) to the liquid crystal panel 15 side (light exiting side, base material layer 31 side). $\theta_{62}$ is more preferably no more than 5.0°, and further preferably no more than 3.0°. This makes it possible to prevent a transmittance ratio of light from lowering, and to increase light directing upwards. $\theta_{62}$ of more than 10° requires large light absorbing portions 334 in the aligning direction (widths of the light absorbing portions, size in the vertical direction on the drawing sheet of FIG. 23), which tends to lead to defects such as a lowered transmittance ratio of light, and which may lead to reduced light directing upwards.

The relationship between $\theta_{61}$ and $\theta_{62}$ in size is preferably $\theta_{61} < \theta_{62}$. This makes it possible to widen the viewing angle of an image light given by the image source unit 310 on the upper side more than that on the lower side.

For example, the light transmissive portions 333 and the light absorbing portion 334 are formed as follows in the optical functional layer 332 without any specific restriction: that is, the pitch of the light transmissive portion 333 and the light absorbing portion 334, shown by $P_c$ in FIG. 22 is preferably 20 µm to 100 µm, and more preferably 30 µm to 100 µm. The thickness of the light absorbing portion 334 shown by $D_c$ in FIG. 22 is preferably 50 µm to 150 µm, and more preferably 60 µm to 150 µm. The pitch and thickness within these ranges make it possible to give more suitably balanced transmission and absorption of light.

In this embodiment, the example where each interface between the light transmissive portions 333 and the light absorbing portions 334 is in the form of a straight line on the cross section is given. The interface may be in the form of a polygonal line, a convex curved line, a concave curved line, etc. without limitation to the above. A plurality of the light transmissive portions 333 and the light absorbing portions 334 may have the same cross-sectional shape, or different cross-sectional shapes having regularity.

The light entering side light controlling layer 335 will be described. The light entering side light controlling layer 335 functions as a light controlling layer, to change the direction of the light entering the optical functional layer 332 in advance. The light is controlled to exit in a desired direction in the light entering side light controlling layer 335 and the optical functional layer 332.

In this embodiment, the light entering side light controlling layer 335 is formed so as to change the direction of the light travelling in the normal line direction of the optical sheet 330 to a desired direction. More specifically, in this embodiment, the light entering side light controlling layer 335 functions so that the direction of the light travelling in the normal line direction of the optical sheet 330 toward the watcher side is changed obliquely downwards on the watcher side in the state of FIGS. 19 to 22. This makes it possible for light to be reflected on the upper interface 334a between the light transmissive portions 333 and light absorbing portions 334, to be directed obliquely upwards as described later.

The light entering side light controlling layer 335 therefore is constituted of a supporting layer 335a and an optical element layer 335b.

The supporting layer 335a is a transparent sheet-like member that functions as a supporting body of the optical element layer 335b. The supporting layer 335a may be made from materials same as those of the base material layer 31 and the light transmissive portions 333.

The optical element layer 335b is a layer to change the direction of the light entering the optical functional layer 332, and is formed of a plurality of unit optical elements 335c aligned on a face of the supporting layer 335a which is on the opposite side to a face where the optical functional layer 332 is arranged. The unit optical elements 335c are formed so as to change the direction of the light travelling in the normal line direction of the optical sheet 330 to one direction as described above. In this embodiment, the unit optical elements 335c are formed so as to change the direction of the light travelling in the normal line direction of the optical sheet 330 obliquely downwards in the state of FIGS. 19 to 22.

In this embodiment, the unit optical elements 335c specifically have the following structure:

Each of the unit optical elements 335c is in the form of a triangular prism having a triangular cross section protruding opposite to the optical functional layer 332, which is across the base material layer 31, a ridge of which is constituted of a ridge line extending in the same direction as the extending direction of the light transmissive portions 333 and the light absorbing portions 334 (bias angle $\alpha_5=0°$) or extending as being offset in the front view of the optical sheet (bias angle $\alpha_5 \neq 0°$, as having that cross section. A plurality of the unit optical elements 335c are aligned in a direction different from their extending direction.

When the ridge line of each of the unit optical elements 335c extends as being offset from the extending direction of the light transmissive portions 333 and the light absorbing portions 334 in the front view of the optical sheet (bias angle $\alpha_5 \neq 0°$), preferably, the extending direction of the light transmissive portions 333 of the optical functional layer 332 relatively inclines from the extending direction of the ridge lines of the unit optical elements 335c by the bias angle $\alpha_5$ of more than 0° and no more than 45° in the front view of the optical sheet 330. This makes it possible to prevent moire due to the aligning structure of the light transmissive portions 333 and the light absorbing portions 334, and the aligning structure of the unit optical elements 335c. The angle $\alpha_5$ of more than 45° leads to lowered efficiency of the control of the direction of light in the unit optical elements 335c. The angle $\alpha_5$ is more preferably 1° to 10°.

Each of the unit optical elements 335c includes a main refracting face 335d and a rise face 335e as seen from FIG. 23. These main refracting face 335d and rise face 335e form two faces of a triangular prism, and the other one face is over the supporting layer 335a to be fixed to the supporting layer 335a.

The main refracting face 335d is a refracting face that functions so that the direction of the light travelling in the normal line direction of the optical sheet 330 is directed obliquely downwards. Thus, the main refracting face 335d inclines so as to be close to the supporting layer 335a (optical functional layer 332) on the upper side in the vertical direction, and separate from the supporting layer 335a (optical functional layer 332) on the lower side in the vertical direction. The inclination shown by $\theta_{71}$ in FIG. 23 has an angle with the direction along a light entering face 332b of the optical functional layer 332. A specific angle of $\theta_{71}$ is preferably more than 0° and less than 17°. This makes it possible to surely control light for improving brightness in a desired direction.

The rise face 335e is a face necessary for forming the main refracting face 335d. The rise face 335e also has a function to more surely block light exiting in an undesirable direction since the light entering the rise face 335e is refracted here, and travels through the optical functional layer 332 at such an angle that the light is easy to be absorbed in the light absorbing portion 334 as described later.

The inclination of the rise face 335e, which is shown by $\theta_{72}$, is preferably no more than 90° with the direction along the light entering face 332b of the optical functional layer 332. This angle of no less than 90° leads to difficulty in production. $\theta_{72}$ is preferably no less than 73°. This makes it possible to make the angle formed by the main refracting face 335d and the rise face 335e 90° or approximately 90°, and for the light entering the main refracting face 335d in the normal line direction of the main refracting face 335d to travel in a direction almost parallel to the rise face 335e, which makes it possible to suppress the light from being reflected on the rise face 335e to be a stray light.

The pitch of the unit optical element 335c shown by $P_q$ in FIG. 22 is preferably shorter than the pitch $P_c$ of the light absorbing portion 334, and further preferably not a pitch at an integral multiple of $P_c$, such as ⅔ and ⅖. This makes it possible to prevent moire due to the light absorbing portions 334 and the unit optical elements 335c. $P_q$ is more preferably no less than 3 μm as satisfying the above described conditions. $P_q$ of less than this lower limit leads to a defect of a deteriorated accuracy of processing.

The protruding height of the unit optical element 335c from the supporting layer 335a, which is shown by $D_q$ in FIG. 22 is preferably 1 μm to 15 μm. The height lower than this lower limit leads to a defect of a deteriorated accuracy of processing. The height higher than this upper limit makes it easy for moire to appear due to the light absorbing portions 334 and the unit optical elements 335c.

In this embodiment, a plurality of the unit optical elements 335c are continuously arranged without any gaps, but not limited to this. In another aspect, a gap may be provided between adjacent unit optical elements 335c, from which a face of the supporting layer 335a may be partially exposed.

All of a plurality of the unit optical elements 335c are not always necessary to have the same shape, and may suitably have different shapes from each other.

Such a supporting layer 335a and an optical element layer 335b (unit optical element 335c) of the light entering side light controlling layer 335 may be made from materials same as those of the base material layer 31 and the light transmissive portions 33.

Operations of the image source unit 310 having the above described structure will be described as showing examples of an optical path. The examples of an optical path are for conceptualistic explanation, and do not strictly give degrees of reflection and refraction.

First, the light exiting the light source 25 enters the light guiding plate 21 from the light entering face that is a side face (end face) of the light guiding plate 21 as shown in FIG. 20. FIG. 20 shows examples of the optical paths of lights $L_{201}$ and $L_{202}$ entering the light guiding plate 21 from the light source 25 as one example.

As shown in FIG. 20, the lights $L_{201}$ and $L_{202}$ entering the light guiding plate 21 repeat total reflection due to the difference in refractive index from the air, on the face of the light guiding plate 21 on the light exiting side, and the back face opposite to the face; and travel in the light guiding direction (downwards on the drawing sheet of FIG. 20).

Here, the back face optical elements 23 are arranged over the back face of the light guiding plate 21. The traveling directions of the lights $L_{201}$ and $L_{202}$ travelling through the light guiding plate 21 are therefore changed by the back face optical elements 23, and the lights $L_{201}$ and $L_{202}$ may enter the light exiting face and the back face at an incident angle narrower than the total reflection critical angle as shown in FIG. 20. In this case, the lights may exit the light exiting face of the light guiding plate 21, and the back face that is opposite to the light exiting face.

The lights $L_{201}$ and $L_{202}$ exiting the light exiting face are directed toward the light diffusion plate 26 arranged on the light exiting side of the light guiding plate 21. The light exiting the back face is reflected by the reflection sheet 39 arranged on the rear face of the light guiding plate 21; and enters again the light guiding plate 21 to travel through the light guiding plate 21.

The light travelling through the light guiding plate 21 and the light whose direction is changed on the back face optical elements 23 and which reaches the light exiting face at an incident angle narrower than the total reflection critical angle appear in each zone along the light guiding direction of the light guiding plate 21. Therefore, the light travelling through the light guiding plate 21 exits the light exiting face little by little. This enables a light amount distribution of the light exiting the light exiting face of the light guiding plate 21, along the light guiding direction, to be even.

The light exiting the light guiding plate 21 thereafter reaches the light diffusion plate 26, which improves uniformity thereof. The light diffused or collected as necessary by the prism layer 27 to exit the prism layer 27 then reaches the reflection type polarizing plate 28. Here, the light in a polarization direction along the transmission axis of the reflection type polarizing plate 28 is transmitted through the reflection type polarizing plate 28, to be directed toward the optical sheet 330.

The light in a polarization direction along the reflection axis of the reflection type polarizing plate 28 is reflected and returned to the light guiding plate 21 side as shown by the dotted arrows in FIG. 20. The returned light is reflected on the light guiding plate 21, the back face optical elements 23, or the reflection sheet 39, to travel again toward the reflection type polarizing plate 28. In this reflection, the polarization directions of some lights are changed, and these lights are partially transmitted through the reflection type polarizing plate 28. The rest of the lights is returned again to the light guiding plate side. In this way, repeated reflection makes it possible for the light reflected on the reflection type polarizing plate 28 to be also transmitted through the reflection type polarizing plate 28. This increases the use efficiency of the light from the light source 25.

Here, the polarization direction of the light exiting the reflection type polarizing plate 28 is a direction along the transmission axis of the lower polarizing plate 14, and this light is a light in a polarized state which allows the light to be transmitted through the lower polarizing plate 14.

Figure 24:
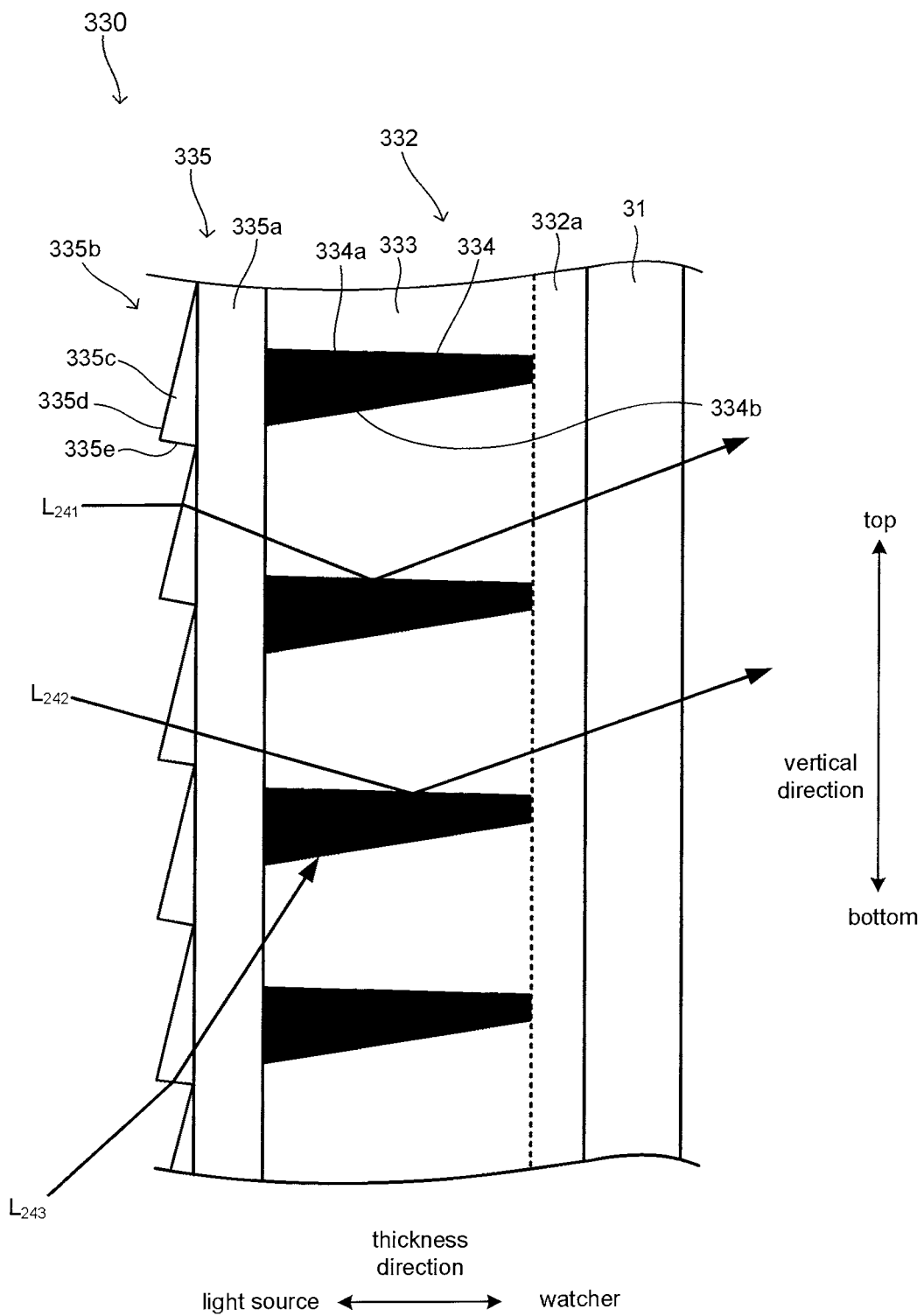
FIG. 24 is an explanatory view of optical paths transmitted through the optical sheet 330.

The light exiting the reflection type polarizing plate 28 reaches the optical sheet 330. The light entering the optical sheet 330 travels as having an optical path as follows. FIG. 24 shows examples of an optical path in the optical sheet 330.

The lights $L_{201}$ and $L_{202}$ shown in FIG. 20 and lights $L_{241}$ and $L_{242}$ shown in FIG. 24 enter the main refracting faces 335$d$ of the unit optical elements 335$c$, and are transmitted through the main refracting faces 335$d$ with or without refraction according to an incident angle with the main refracting faces 335$d$ (the light entering in the direction orthogonal to the inclining face of the main refracting face 335$d$ is transmitted through the main refracting face 335$d$ without refraction (light $L_{242}$)). This makes most light obliquely downwards on the watcher side, and this light is directed to the interface 334$a$ that is one of each interface between the light transmissive portions 333 and the light absorbing portions 334 on the upper side of the light absorbing portion 334. Then the light is totally reflected on the interface 334$a$ to be an obliquely upward light toward the watcher side, to be controlled in a desired direction. Specifically, when the inclination angle $\theta_{61}$ of the interface 334$a$ (see FIG. 23) is 0°, the light may be directed more upwards. In contrast, adjusting $\theta_{61}$ also makes it possible to direct the light upwards and within a desired range.

At this time, if the interface 334$b$ of interfaces of the light transmissive portions 333 and the light absorbing portions 334, which is on the lower side of the light absorbing portion 334, inclines as being directed obliquely upwards on the watcher side, it becomes difficult for the light absorbing portions 334 to block light as the lights $L_{201}$, $L_{202}$, $L_{241}$, and $L_{242}$ from travelling, which makes it possible to guide more light in a desired direction.

Therefore, in the optical sheet 330, the combination of the inclination angle of the main refracting face 335$c$ shown by $\theta_{71}$ in FIG. 23, and that of the interface 334$a$ shown by $\theta_{61}$ in FIG. 23 makes it easy to efficiently guide light in a desired direction. Either one of them limitedly guides directions of light, and combined effect of the combination makes it possible to easily control the travelling direction of light.

The light $L_{203}$ shown in FIG. 20 and the light $L_{243}$ shown in FIG. 24 enter the rise face 335$e$ of the unit optical element 335$c$, and are transmitted through the rise face 335$e$ with or without refraction according to an incident angle with the rise face 335$e$. Most of the light transmitted through the rise face 335$e$ as described above is obliquely upward on the watcher side, and travels at such an angle to be transmitted through interfaces between the light transmissive portions 333 and the light absorbing portions 334 without total reflection on the interfaces, and thus is transmitted through the interface 334$b$ to be absorbed in the light absorbing portions 334.

This makes it possible to efficiently absorb and block the light exiting at a viewing angle that is no less than a desired angle, and further to efficiently control the travelling direction of light.

This also makes it possible to absorb such light entering the liquid crystal panel to probably lead to defects such as deteriorated contrast and color inversion.

The light exiting the optical sheet 330 enters the lower polarizing plate 14 of the liquid crystal panel 15. The lower polarizing plate 14 transmits one polarization component in the incident light, and absorbs the other polarization component. The light transmitted through the lower polarizing plate 14 is selectively transmitted through the upper polarizing plate 13 in accordance with the state of creation of an electric field for each pixel. In this manner, the liquid crystal panel 15 selectively transmits the light from the surface light source device 320 for each pixel, which makes it possible for a watcher of the liquid crystal display to observe an image. At this time, an image light is given a watcher via the functional film 40, to improve the quality of an image.

As described above, the optical sheet 330 makes it easy for the light entering the optical sheet 330 to exit upwards, using refraction in the optical element layer 335$b$, and total reflection on the interface 334$a$ between the light transmissive portions 333 and the light absorbing portions 334, and limits a downward exit. That is, for example, using the optical sheet 330 makes it possible for the incident light to efficiently exit upwards, that is, in a driver's point of view, and makes it possible to improve brightness of the light exiting upwards. Using the optical sheet 330 also makes it possible to prevent a reflection in a windshield since making it easy for the light exiting much upwards to be absorbed in the light absorbing portions.

Thus, using the optical sheet in this embodiment for a liquid display makes it possible to easily control light, to improve visibility in a driver's point of view, compared with the case of using a conventional optical sheet.

Figure 25:
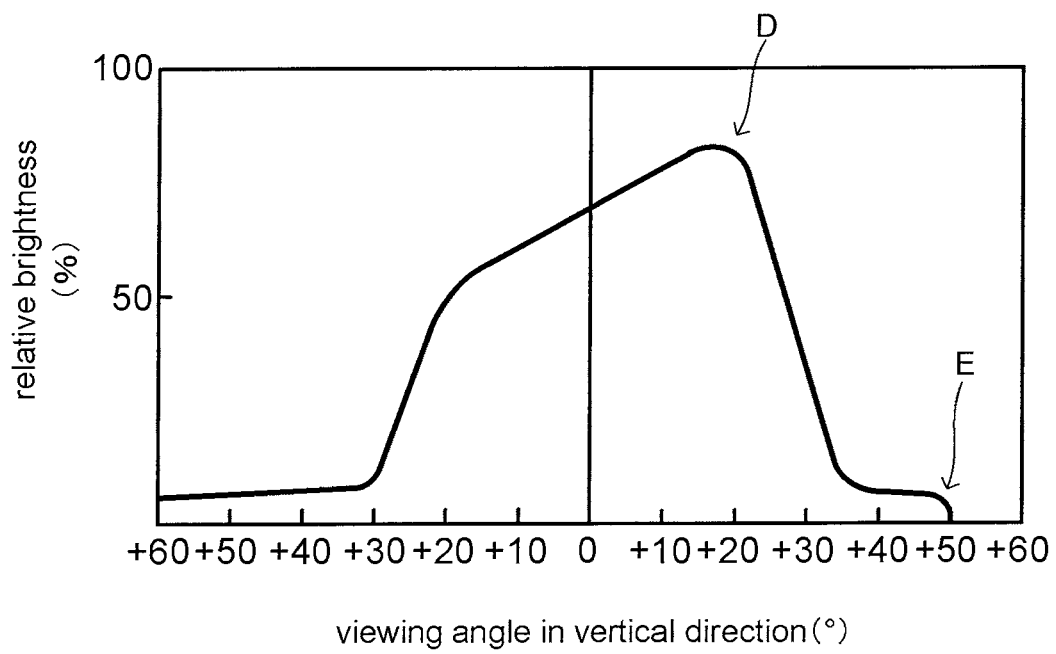
FIG. 25 is an explanatory graph showing light exiting characteristics of the optical sheet 330.

This can easily achieve light exiting characteristics as shown in, for example, FIG. 25. FIG. 25 is a graph where the horizontal axis represents a viewing angle in the vertical direction, and the vertical axis represents a relative brightness. In the horizontal axis, the positive (+) indicates the upward in the vertical direction and the negative (−) indicates the downward in the vertical direction.

As seen from FIG. 25, the peak of the relative brightness is approximately at +20° (20° upward in the vertical direction) as seen from the coordinates shown by D in FIG. 25 when the viewing angle in the vertical direction is seen. That is, light is controlled so that the peak of the brightness is in a direction of a watcher's point of view, different from the front (0°). Further, as seen from the coordinates shown by E in FIG. 25, the relative brightness suddenly drops at approximately +50° (50° upward in the vertical direction). That is, such a light travelling much upwards which may be a cause of a reflection in a windshield in an automobile may be more surely blocked.

Optical sheets and image source units according to each of the above described embodiments were made, and the performance thereof was tested.

Test Example A

In Test Example A, a test was performed in view of control of the direction of exiting light in optical sheets according to the example of the image source unit 10.

Structures of Optical Sheets in Test Example A

Test Example $A_1$

In Test Example $A_1$, optical sheets according to the example of the image source unit 10 including the light exiting side light controlling layer 35, except that $\theta_{21}$ shown in FIG. 5 was changed were prepared. Specific shapes of the optical sheets other than $\theta_{21}$ were as follows:

(Base Material Layer)
material: polycarbonate resin
thickness: 130 μm
(Optical Functional Layer)
pitch of a light transmissive portion and a light absorbing portion ($P_a$ in FIG. 4): 39 μm
width of an upper base of a light absorbing portion ($W_a$ in FIG. 4): 4 μm
width of a lower base of a light absorbing portion ($W_b$ in FIG. 4): 10 μm
upper inclination angle of a light absorbing portion ($\theta_{11}$ in FIG. 5): 3°
lower inclination angle of a light absorbing portion ($\theta_{12}$ in FIG. 5): 0°
thickness of a light absorbing portion ($D_a$ in FIG. 4): 102 μm
thickness of the optical functional layer: 127 μm
thickness of the sill portion: 25 μm
material and refractive index of the light transmissive portions: ultraviolet curable urethane acrylate resin having a refractive index of 1.56
material and refractive index of the light absorbing portions: 20 mass % of a carbon black—containing acrylic beads having a mean particle diameter of 4 μm was dispersed in an ultraviolet curable urethane acrylate resin having a refractive index of 1.49
inclination angle formed by the light transmissive portions and light absorbing portions, and the aligning direction of the pixels in the liquid crystal layer (bias angle $\alpha_1$): 5°
(Light Exiting Side Light Controlling Layer)
angle of a rise face ($\theta_{22}$ in FIG. 5): 90°
pitch of a unit optical element ($P_o$ in FIG. 4): 18 μm
material of the unit optical elements: ultraviolet curable urethane acrylate resin having a refractive index of 1.50
inclination angle with the bias angle $\alpha_1$ (bias angle $\alpha_2$): 3°
Here, the bias angle $\alpha_2$ was such an angle that the light exiting side light controlling layer rotated in the same direction as that where the bias angle $\alpha_1$ was formed in the front view of the optical sheet (which is also applied to the following examples). Thus, in this example, the inclination angle formed by the extending direction of the unit optical elements, and the aligning direction of the pixels in the liquid crystal layer was: $\alpha_1 + \alpha_2 = 8°$.
angle of a main refracting face ($\theta_{21}$ in FIG. 5): 85° (Test Example $A_1$-1), 80° (Test Example $A_1$-2), 70° (Test Example $A_1$-3), and 60° (Test Example $A_1$-4)

Test Example $A_2$

In Test Example $A_2$, optical sheets according to the example of the image source unit including the light exiting side light controlling layer 135 shown in FIG. 9, except that $\theta_{31}$ was changed were prepared. The structure other than the light exiting side light controlling layer 135 was the same as that in Test Example $A_1$. The angle of a rise face was fixed, that is, 90°. The angle of a main refracting face ($\theta_{31}$ in FIG. 9) was 85° (Test Example $A_2$-1), 80° (Test Example $A_2$-2), 70° (Test Example $A_2$-3), and 60° (Test Example $A_2$-4).

Test Example $A_3$

In Test Example $A_3$, the angle of a rise face (corresponding to $\theta_{22}$ in FIG. 5) was changed to 80° (Test Example $A_3$-1), and 100° (Test Example $A_3$-2) from those of the optical sheets of Test Example $A_2$-2. The other conditions were the same as those for Test Example $A_2$-2.

Test Example $A_4$

In Test Example $A_4$, an optical sheet had a structure of excluding the light exiting side light controlling layer from the optical sheets of Test Example $A_1$. The other portions were the same as in the optical sheets of Test Example $A_1$.

[Evaluation Method for Test Example A]

Figure 26:
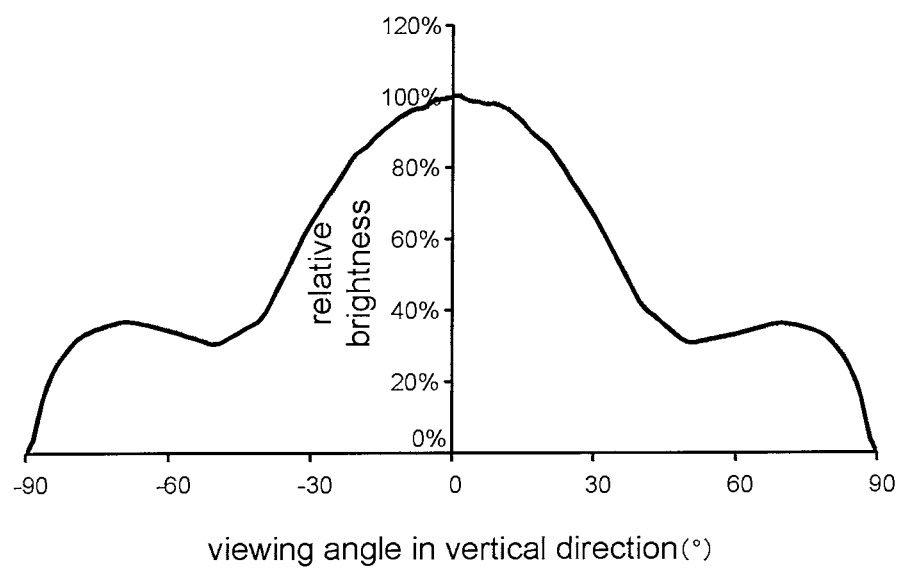
FIG. 26 is a graph showing characteristics of a light source in Test Example A.

Each of the above optical sheets was modeled, to obtain the relationship between a light exiting angle and brightness at each light exiting angle through simulation. Light Tools (Synopsys, Inc.) was used for simulation software. Characteristics of a light source are shown in FIG. 26. In FIG. 26, the horizontal axis represents a viewing angle in the vertical direction (the positive indicates the upward and the negative indicates the downward), and the vertical axis represents a relative brightness if a brightness when the viewing angle is 0° is defined as 100%.

Results of Test Example A

Figure 27:
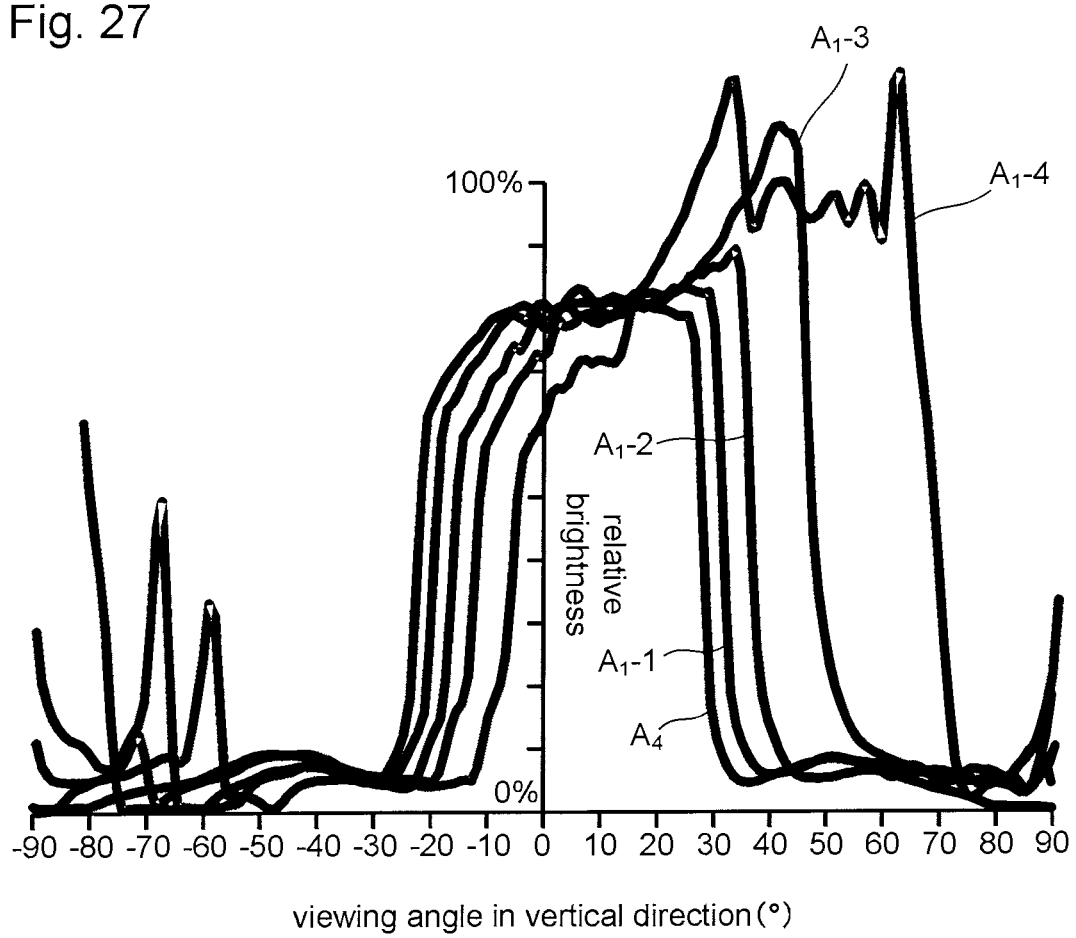
FIG. 27 is a graph showing the results of Test Example $A_1$.
Figure 28:
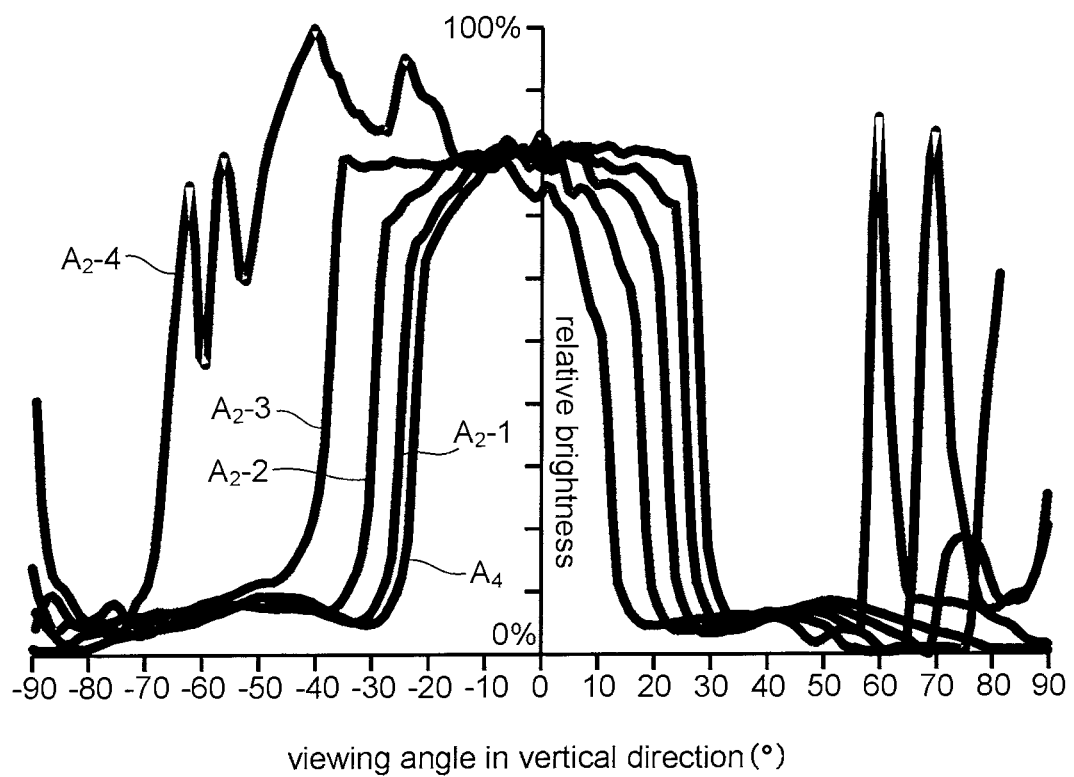
FIG. 28 is a graph showing the results of Test Example $A_2$.
Figure 29:
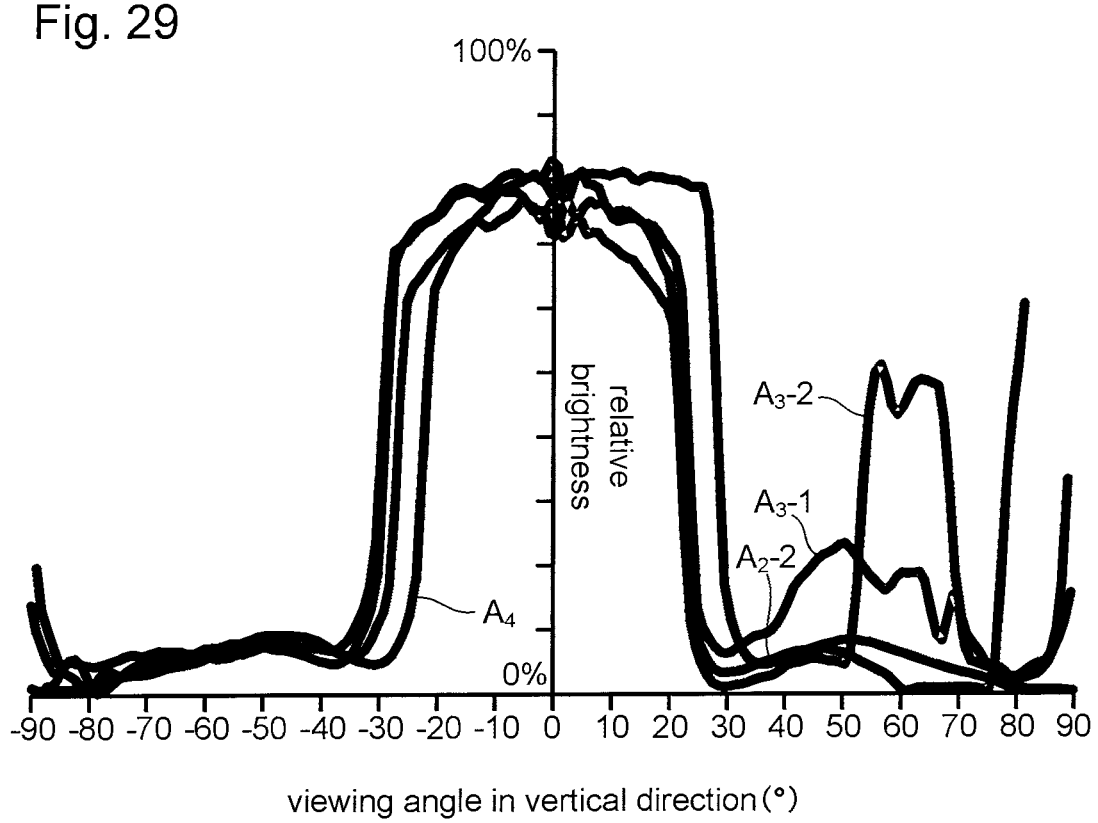
FIG. 29 is a graph showing the results of Test Example $A_3$.

FIG. 27 shows the results of Test Example $A_1$, FIG. 28 shows the results of Test Example $A_2$, and FIG. 29 shows the results of Test Example $A_3$. In FIGS. 27 to 29, the graph showing Test Example $A_4$ is represented by $A_4$.

In FIG. 27, Test Example $A_1$-1 is represented by $A_1$-1, Test Example $A_1$-2 is represented by $A_1$-2, Test Example $A_1$-3 is represented by $A_1$-3, and Test Example $A_1$-4 is represented by $A_1$-4.

Likewise, in FIG. 28, Test Example $A_2$-1 is represented by $A_2$-1, Test Example $A_2$-2 is represented by $A_2$-2, Test Example $A_2$-3 is represented by $A_2$-3, and Test Example $A_2$-4 is represented by $A_2$-4.

In FIG. 29, Test Example $A_3$-1 is represented by $A_3$-1, and Test Example $A_3$-2 is represented by $A_3$-2. In FIG. 29, $A_2$-2 is also shown together.

In each graph, the horizontal axis represents a viewing angle in the vertical direction; the positive indicates the upward and the negative indicates the downward, and the vertical axis represents a relative brightness when characteristics of the light source shown in FIG. 26 are 100%.

As is seen from these graphs, the optical sheets according to Test Examples $A_1$, $A_2$, and $A_3$ made it possible to more efficiently control the light exiting angle in a desired direction more precisely than the optical sheet according to Test Example $A_4$.

When the light exiting angle is changed so as to largely shift as in Test Examples $A_1$-3, $A_1$-4, $A_2$-3, and $A_2$-4, and when the angle of a rise face is more than, or less than 90° as in Test Examples $A_3$-1 and $A_3$-2, a relative brightness at a light exiting angle within a range of 60° to 90° on the positive or negative side may increase. This is believed to be caused by a stray light on the rise face. Most of such a stray light may be absorbed in a polarizing plate. Thus, such a stray light is hard to result in defects.

Test Example B

In Test Example B, a test was performed in view of control of the direction of exiting light in optical sheets according to the example of the image source unit 210.

Structures of Light Controlling Member in Test Example $B_1$

In Test Example $B_1$, a light controlling member was prepared according to the example of the light controlling member 229. Specific aspect thereof was as follows:
<First Optical Sheet>
(Base Material Layer)
material: polycarbonate resin
thickness: 130 μm
(Optical Functional Layer)
pitch of a light transmissive portion and a light absorbing portion ($P_a$ in FIG. 4): 47 μm
width of an upper base of a light absorbing portion ($W_a$ in FIG. 4): 3 μm
width of a lower base of a light absorbing portion ($W_b$ in FIG. 4): 22 μm
upper inclination angle of a light absorbing portion ($\theta_{11}$ in FIG. 5): 4.5°
lower inclination angle of a light absorbing portion ($\theta_{12}$ in FIG. 5): 4.5°
thickness of a light absorbing portion ($D_a$ in FIG. 4): 120 μm
thickness of the optical functional layer: 145 μm
thickness of the sill portion: 25 μm
material and refractive index of the light transmissive portions: ultraviolet curable urethane acrylate resin having a refractive index of 1.56
material and refractive index of the light absorbing portions: 20 mass % of a carbon black—containing acrylic beads having a mean particle diameter of 4 μm was dispersed in an ultraviolet curable urethane acrylate resin having a refractive index of 1.49
(Light Exiting Side Light Controlling Layer)
inclination angle of a main refracting face ($\theta_{21}$ in FIG. 5): 70°
inclination angle of a rise face ($\theta_{22}$ in FIG. 5): 90°
thickness of the supporting layer: 25 μm
pitch of a unit optical element ($P_o$ in FIG. 4): 26 μm
material of the unit optical elements: ultraviolet curable urethane acrylate resin having a refractive index of 1.50
bias angle $\alpha_3$ formed by the extending direction of the light transmissive portions, and the extending direction of the unit optical elements: 5°
<Second Optical Sheet>
(Base Material Layer)
material: polycarbonate resin
thickness: 130 μm
(Optical Functional Layer)
pitch of a light transmissive portion and a light absorbing portion ($P_b$ in FIG. 15): 47 μm
width of an upper base of a light absorbing portion ($W_c$ in FIG. 15): 3 μm
width of a lower base of a light absorbing portion ($W_d$ in FIG. 15): 22 μm
inclination angle of a light absorbing portion on one side ($\theta_{41}$ in FIG. 16): 4.5°
inclination angle of a light absorbing portion on the other side ($\theta_{42}$ in FIG. 16): 4.5°
thickness of a light absorbing portion ($D_b$ in FIG. 15): 120 μm
thickness of the optical functional layer: 145 μm
thickness of the sill portion: 25 μm
material and refractive index of the light transmissive portions: ultraviolet curable urethane acrylate resin having a refractive index of 1.56
material and refractive index of the light absorbing portions: 20 mass % of a carbon black—containing acrylic beads having a mean particle diameter of 4 μm was dispersed in an ultraviolet curable urethane acrylate resin having a refractive index of 1.49
(Light Exiting Side Light Controlling Layer)
portion where no unit optical element was arranged: 5.0 mm across the center symmetrically in the aligning direction of unit optical elements ($W_3$ in FIGS. 14 and 15, by 2.5 mm on each of the left and right sides)
inclination angle of a main refracting face ($\theta_{51}$ in FIG. 16): continuously changing so as to be 90° on the central side of the sheet (portion where no unit optical element was provided substantially) and 68° at the most end portions thereof (size of the second optical sheet in the aligning direction of the unit optical elements ($W_4$ in FIG. 15) was 300 mm)
inclination angle of a rise face ($\theta_{52}$ FIG. 16): 90°
thickness of the supporting layer: 25 μm
pitch of a unit optical element ($P_p$ in FIG. 15): 26 μm
material of the unit optical elements: ultraviolet curable urethane acrylate resin having a refractive index of 1.50
bias angle $\alpha_4$ formed by the extending direction of the light transmissive portions, and the extending direction of the unit optical elements: 5°
<Light Controlling Member>
The first optical sheet described above was arranged so that the extending direction of the light transmissive portions was in the horizontal direction, and the second optical sheet was laminated onto the first optical sheet to be arranged so as to be closer to the light exiting side than the first optical sheet was, to form the light controlling member. At this time, the extending direction of the light transmissive portions of the second optical sheet was in the vertical direction (see FIG. 12).

Structure of Light Controlling Member of Test Example $B_2$

In Test Example $B_2$, a light controlling member of excluding the light exiting side light controlling layers of the first and second optical sheets from the light controlling member according to Test Example $B_1$ was used.

Evaluation Method for Test Example B

The light controlling members of Test Example B were modeled, to obtain the relationship between a light exiting angle and brightness in each of the vertical and horizontal directions through simulation.

Figure 30:
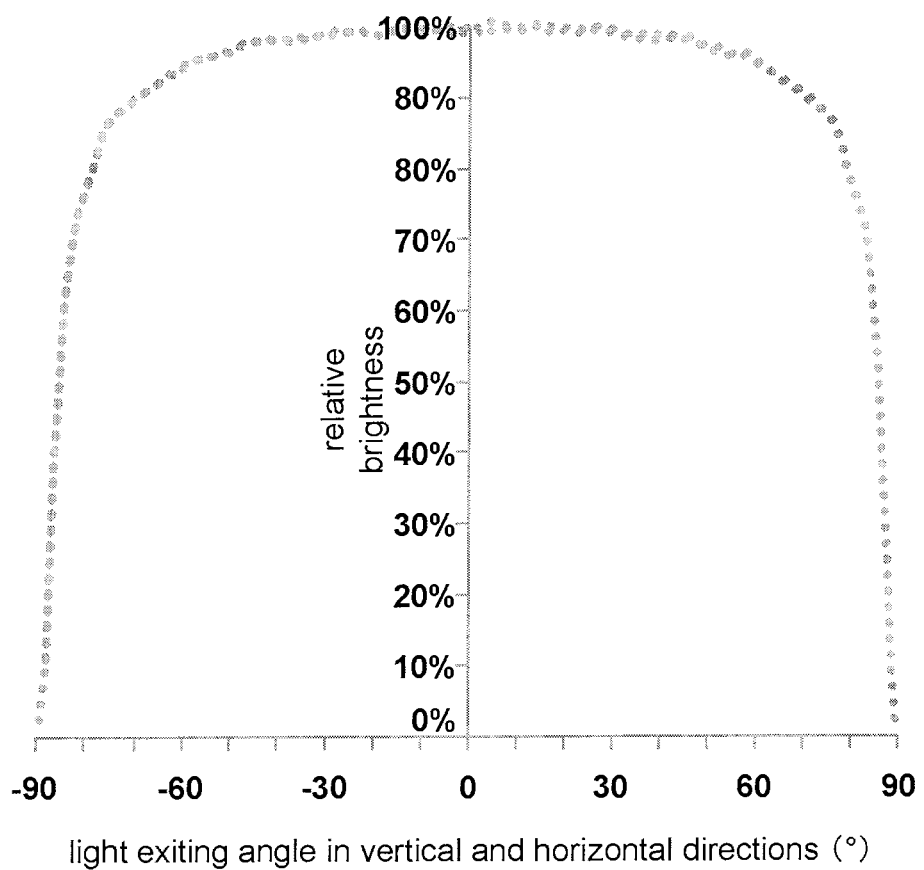
FIG. 30 is a graph showing characteristics of a light source in Test Example B.

Light Tools (Synopsys, Inc.) was used for simulation software. Characteristics of a light source are shown in FIG. 30. In FIG. 30, the horizontal axis represents a light exiting angle in the vertical and horizontal directions, and the vertical axis represents a relative brightness if a brightness when the light exiting angle is 0° is defined as 100%.

Results of Test Example B

Figure 31A:
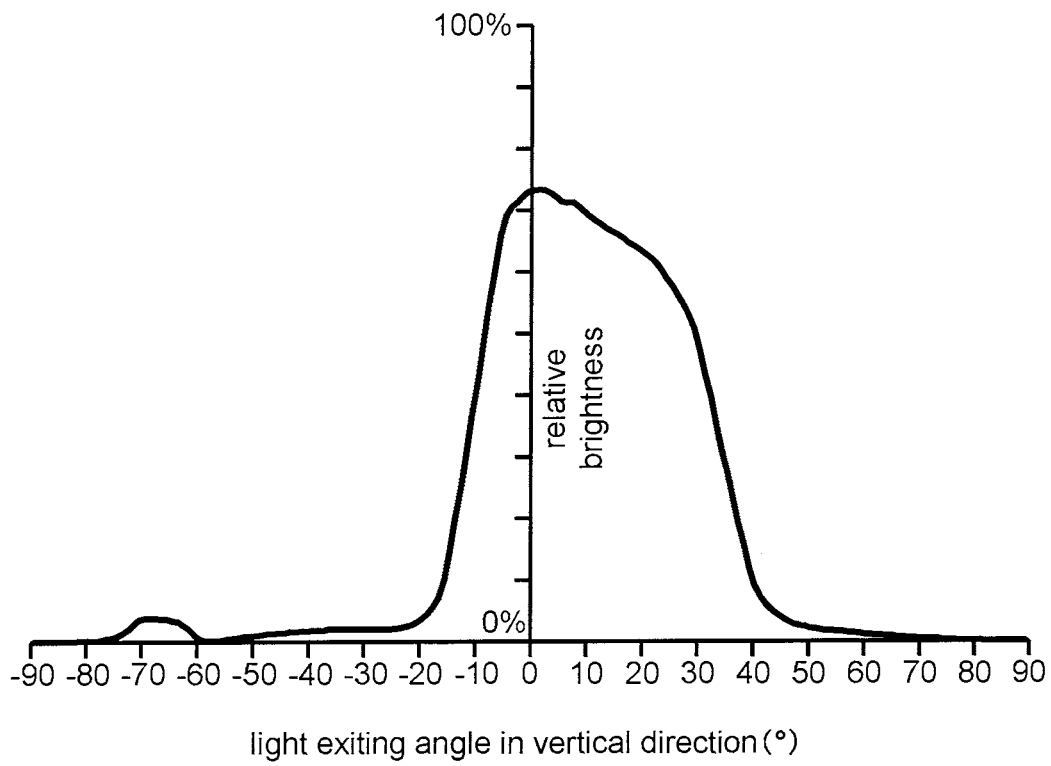
FIGS. 31A and 31B are graphs showing the results of Test Example $B_1$.
Figure 31B:
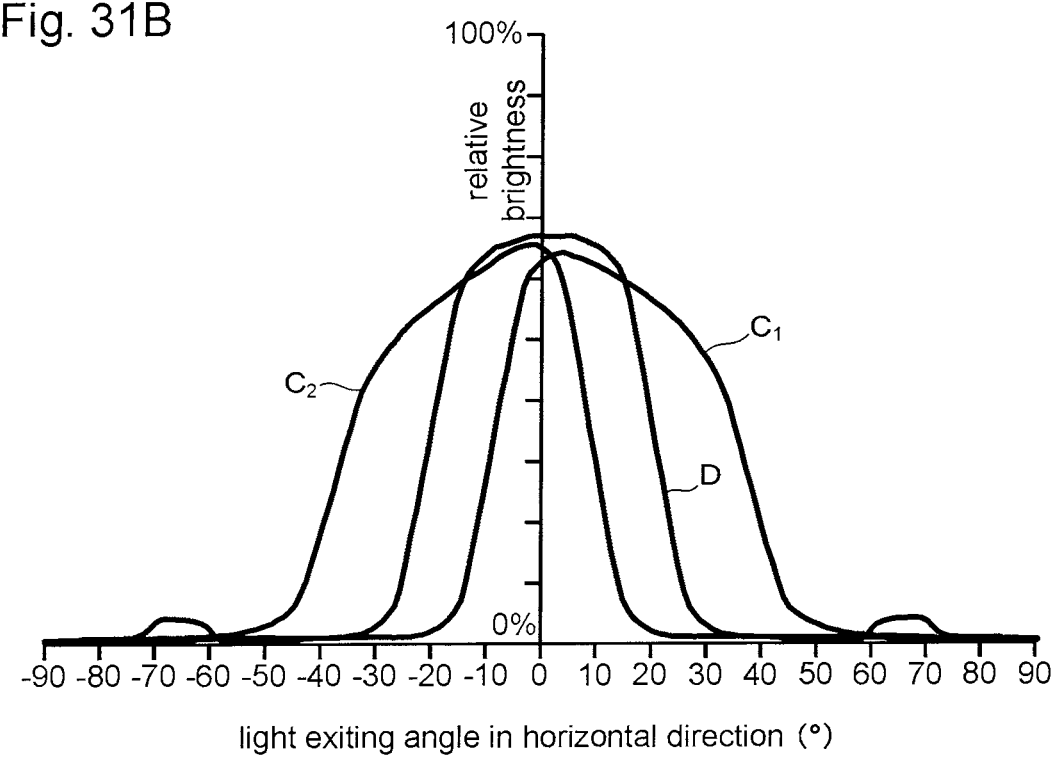

FIGS. 31A and 31B show the evaluation results of the light controlling member of Test Example $B_1$. In FIG. 31A, the horizontal axis represents a light exiting angle in the vertical direction, and the vertical axis represents a relative brightness to 100% in FIG. 30. In FIG. 31B, the horizontal axis represents a light exiting angle in the horizontal direction, and the vertical axis represents a relative brightness to 100% in FIG. 30.

Figure 32A:
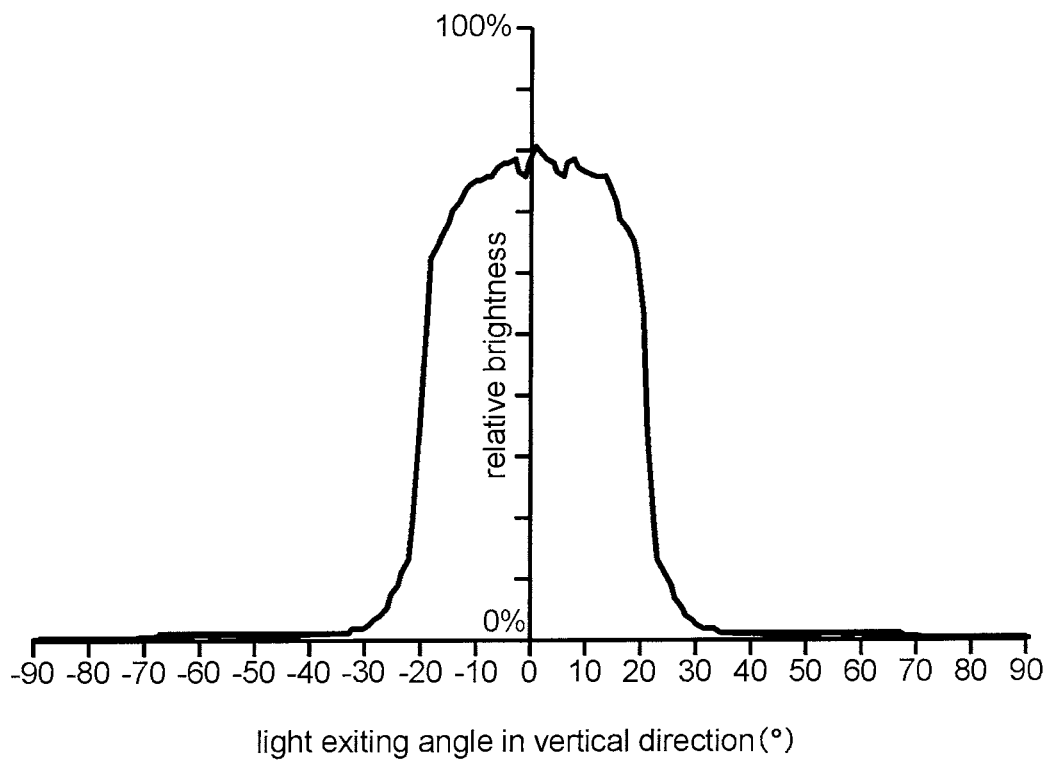
FIGS. 32A and 32B are graphs showing the results of Test Example $B_2$.
Figure 32B:
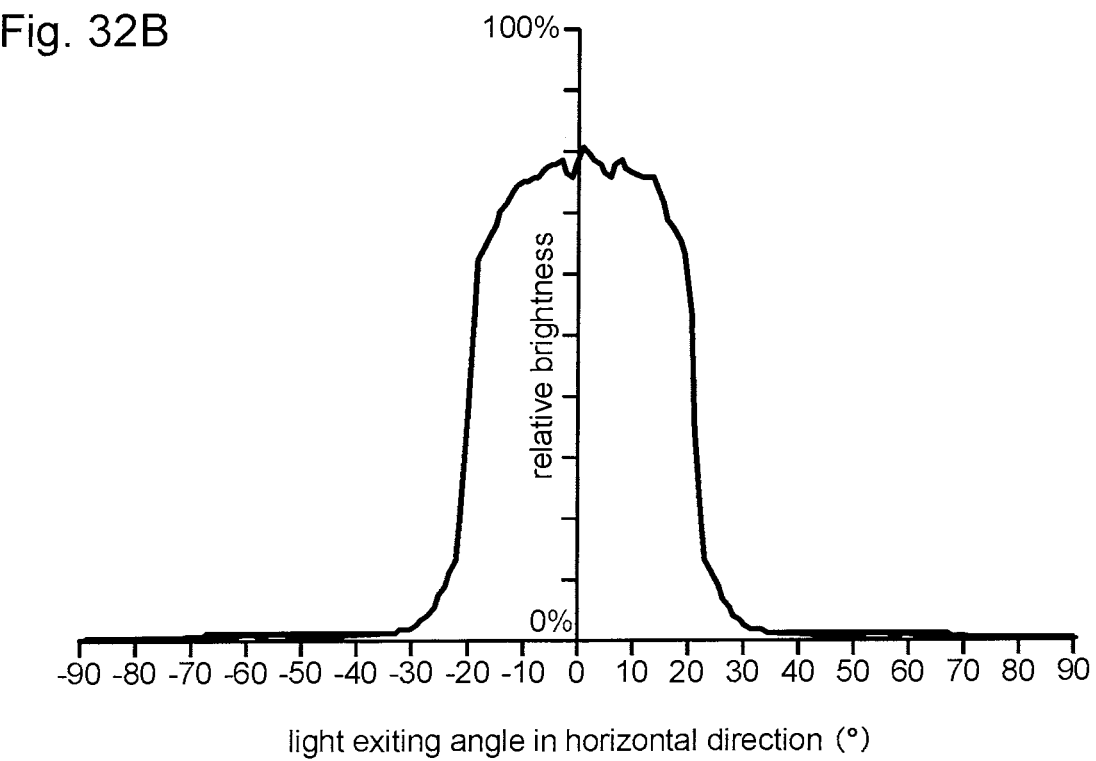

FIGS. 32A and 32B show the evaluation results of the light controlling member of Test Example $B_2$. In FIG. 32A, the horizontal axis represents a light exiting angle in the vertical direction, and the vertical axis represents a relative brightness to 100% in FIG. 30. In FIG. 32B, the horizontal axis represents a light exiting angle in the horizontal direction, and the vertical axis represents a relative brightness to 100% in FIG. 30.

As is seen from the comparison between FIGS. 31A and 32A, providing an optical element layer like the first optical sheet made it possible to control the light exiting angle so that the angle shifted.

As is seen from the comparison between FIGS. 31B and 32B, providing an optical element layer like the second optical sheet made it possible to control the light exiting angle in the horizontal direction as described in FIG. 18B.

Test Example C

In Test Example C, a test was performed in view of prevention of moire using a rough face in addition to control of the direction of exiting light according to the examples of the image source units 10 and 210.

Structures of Optical Sheet in Test Example C

Test Example $C_1$

In Test Example $C_1$, optical sheets according to the example of the image source unit 10 including the light exiting side light controlling layer 35, except that $\theta_{21}$ shown in FIG. 5, and degrees of surface roughness of a refracting face and a rise face were changed, were prepared. Specific forms of the other portions were as follows:
  (Base Material Layer)
  material: polycarbonate resin
  thickness: 130 μm
  (Optical functional layer)
  pitch of a light transmissive portion and a light absorbing portion ($P_a$ in FIG. 4): 39 μm
  width of an upper base of a light absorbing portion ($W_a$ in FIG. 4): 4 μm
  width of a lower base of a light absorbing portion ($W_b$ in FIG. 4): 10 μm
  upper inclination angle of a light absorbing portion ($\theta_{11}$ in FIG. 5): 3°
  lower inclination angle of a light absorbing portion ($\theta_{12}$ in FIG. 5): 0°
  thickness of a light absorbing portion ($D_a$ in FIG. 4): 102 μm
  thickness of the optical functional layer: 127 μm
  thickness of the sill portion: 25 μm
  material and refractive index of the light transmissive portions: ultraviolet curable urethane acrylate resin having a refractive index of 1.56
  material and refractive index of the light absorbing portions: 20 mass % of a carbon black—containing acrylic beads having a mean particle diameter of 4 μm was dispersed in an ultraviolet curable urethane acrylate resin having a refractive index of 1.49
  inclination angle formed by the light transmissive portions and the light absorbing portions, and the aligning direction of the pixels in the liquid crystal layer (bias angle $\alpha_1$): 0°
  (Light Exiting Side Light Controlling Layer)
  angle of a rise face ($\theta_{22}$ in FIG. 5): 90°
  pitch of a unit optical element ($P_o$ in FIG. 4): 18 μm
  material of the unit optical elements: ultraviolet curable urethane acrylate resin having a refractive index of 1.50
  inclination angle with the bias angle $\alpha_1$ (bias angle $\alpha_2$): 4°
  angle of a main refracting face ($\theta_{21}$ in FIG. 5, four angles): 85°, 80°, 70°, and 60°
  formation of rough faces over a main refracting face and a rise face (two ways): formed by a molding die blasted with glass having a mean particle diameter of 10 μm; and formed by a molding die blasted with alumina having a mean particle diameter of 2 μm (see FIG. 33)

Figure 33:
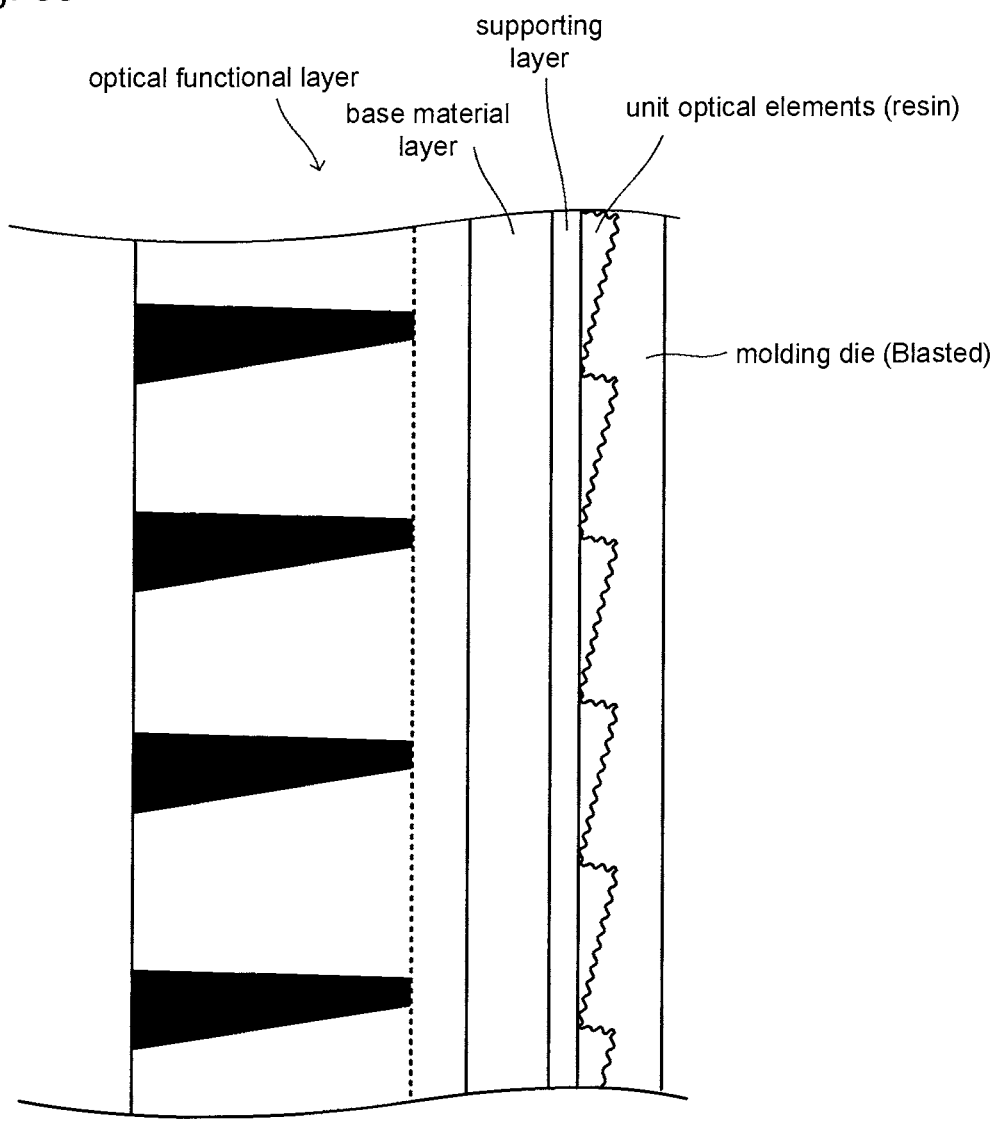
FIG. 33 shows a scene where surfaces of unit optical elements are formed into rough faces.

Unit optical elements of "four angles of $\theta_{21}$×two types of rough faces=eight types in total" were molded using the blasted dies (see FIG. 33). An optical sheet corresponding to each of them was prepared.

Test Example $C_2$

In Test Example $C_2$, image source units including optical sheets according to the example of the second optical sheet 230 instead of the optical sheet of Test Example $C_1$ were prepared. Specific forms thereof were as follows:
  (Base Material Layer)
  material: polycarbonate resin
  thickness: 130 μm
  (Optical Functional Layer)
  pitch of a light transmissive portion and a light absorbing portion ($P_b$ in FIG. 15): 47 μm
  width of an upper base of a light absorbing portion ($W_c$ in FIG. 15): 3 μm
  width of a lower base of a light absorbing portion ($W_d$ in FIG. 15): 22 μm
  inclination angle of a light absorbing portion on one side ($\theta_{41}$ in FIG. 16): 4.5°
  inclination angle of a light absorbing portion on the other side ($\theta_{42}$ in FIG. 16): 4.5°
  thickness of a light absorbing portion ($D_b$ in FIG. 15): 120 μm
  thickness of the optical functional layer: 145 μm
  thickness of the sill portion: 25 μm
  material and refractive index of the light transmissive portions: ultraviolet curable urethane acrylate resin having a refractive index of 1.56
  material and refractive index of the light absorbing portions: 20 mass % of a carbon black containing acrylic beads having a mean particle diameter of 4 μm was dispersed in an ultraviolet curable urethane acrylate resin having a refractive index of 1.49
  inclination angle formed by the light transmissive portions and the light absorbing portions, and the aligning direction of the pixels in the liquid crystal layer (bias angle $\alpha_1$): 0°
  (Light Exiting Side Light Controlling Layer)
  portion where no unit optical element was arranged: 5.0 mm across the center symmetrically in the aligning direction of the unit optical elements ($W_3$ in FIGS. 14 and 15, by 2.5 mm on each of the left and right sides)
  inclination angle of a main refracting face ($\theta_{51}$ in FIG. 16): continuously changing so as to be 90° on the central side of the sheet (portion where no unit optical element was provided substantially) and 68° on the most end portions (size of the second optical sheet in the aligning direction of the unit optical elements ($W_4$ in FIG. 15) was 300 mm)

inclination angle of a rise face ($\theta_{52}$ FIG. 16): 90° thickness of the supporting layer: 25 μm pitch of a unit optical element ($P_p$ in FIG. 15): 18 μm material of the unit optical elements: ultraviolet curable urethane acrylate resin having a refractive index of 1.50 bias angle $\alpha_4$ formed by the extending direction of the light transmissive portions, and the extending direction of the unit optical elements: 4° formation of rough faces over a refracting face and a rise face (two ways): formed by a molding die blasted with glass having a mean particle diameter of 10 μm; and formed by a molding die blasted with alumina having a mean particle diameter of 2 μm (see FIG. 33)

Unit optical elements having rough faces of two types were formed using the blasted dies. An optical sheet corresponding to each of them was prepared.

Test Example $C_3$

In Test Example $C_3$, an optical sheet according to the forms of the optical sheets of Test Example $C_1$, except that no rough face was formed on a main refracting face or a rise face was prepared.

Test Example $C_4$

In Test Example $C_4$, an optical sheet according to the forms of the optical sheets of Test Example $C_2$, except that no rough face was formed on a main refracting face or a rise face was prepared.

[Evaluation and Results of Test Example C]

Moire was observed for the image source units according to Test Example C by visual recognition. As a result, moire was slightly observed in Test Examples $C_3$ and $C_4$ where no rough face was formed. In contrast, no moire was observed in Test Examples $C_1$ and $C_2$ where rough faces were formed.

The direction of the exiting light was able to be suitably controlled in every Example.

Test Example D

In Test Example D, a test was performed according to the example of the image source unit 10, except that the relationship between the aligning pitch of the light transmissive portions (light absorbing portions), and the aligning pitch of the unit optical elements was changed, in view of appearance of moire in addition to control of the direction of exiting light.

The pitch of a unit optical element ($P_o$ in FIG. 4) was changed from that in the forms of Test Example $C_1$, to observe whether moire appeared by visual recognition. Table 1 shows the conditions and results. In Table 1, $P_a$ is the pitch of a light transmissive portion (light absorbing portion) (μm), and $P_o$ is a pitch of a unit optical element (μm).

The inventor focused on $P_{mx}$ obtainable based on $P_m$ as follows:

$P_m$ is calculated by:

$$P_m = |(a \cdot P_a \cdot b \cdot P_o)/(a \cdot P_a - b \cdot P_o)|$$

Here, $P_a \geq P_o$, and a and b are each integers of 1 to 10. The combinations of $P_a$ and $P_o$, which is a pitch from the same magnification (once) as, to ten times larger than $P_a$ are considered. This makes it possible to evaluate appearance of moire in a wide range of considering pitches at integral multiples.

The maximum $P_m$ in $P_m$ obtained from all the combinations of varied a and b in a certain combination of $P_a$ and $P_o$ is $P_{mx}$. In this example, $P_a$ was 39 μm, and $P_o$ was varied.

As for $P_{mx}$, the case where moire was observed as a result was expressed by "yes", and the case where no moire was observed was expressed by "no".

TABLE 1

| $P_a$ (μm) | $P_o$ (μm) | $P_{mx}$ (μm) | visually recognized |
|---|---|---|---|
| 39 | 39 | — | Yes |
| 39 | 38 | 14820 | Yes |
| 39 | 37 | 7215 | No |
| 39 | 36 | 14040 | Yes |
| 39 | 35 | 122850 | Yes |
| 39 | 34 | 74256 | Yes |
| 39 | 33 | 18018 | Yes |
| 39 | 32 | 12480 | Yes |
| 39 | 31 | 48360 | Yes |
| 39 | 30 | 24570 | Yes |
| 39 | 29 | 27144 | Yes |
| 39 | 28 | 38220 | Yes |
| 39 | 27 | 24570 | Yes |
| 39 | 26 | — | Yes |
| 39 | 25 | 7800 | No |
| 39 | 24 | 12480 | Yes |
| 39 | 23 | 13455 | Yes |
| 39 | 22 | 12870 | Yes |
| 39 | 21 | 6143 | No |
| 39 | 20 | 7800 | No |
| 39 | 19.5 | — | Yes |
| 39 | 19 | 7410 | No |
| 39 | 18 | 4212 | No |
| 39 | 17 | 7956 | No |
| 39 | 16 | 6240 | No |
| 39 | 15 | 4680 | No |
| 39 | 14 | 2621 | No |
| 39 | 13 | — | Yes |
| 39 | 12 | 4680 | No |
| 39 | 11 | 6006 | No |
| 39 | 10 | 3120 | No |
| 39 | 9.75 | — | Yes |

As is seen from Table 1, adjusting the pitches ($P_a$, $P_o$) so that $P_{mx}$ was no more than 10000 (μm) made it possible to prevent appearance of moire.

Test Example E

In Test Example E, optical sheets according to the optical sheet 330 shown in FIGS. 19 to 23, and an optical sheet for comparison therewith were prepared, to perform a test.

Structures of Optical Sheets in Test Example E

Test Example $E_1$ (Base Material Layer)
material: polycarbonate resin
thickness: 130 μm
(Optical Functional Layer)
pitch ($P_c$ in FIG. 22): 39 μm
width of an upper base of a light absorbing portion ($W_a$ in FIG. 22): 4 μm
width of a lower base of a light absorbing portion ($W_b$ in FIG. 22): 10 μm
upper inclination angle of a light absorbing portion ($\theta_{61}$ in FIG. 23): 0°
lower inclination angle of a light absorbing portion ($\theta_{62}$ in FIG. 23): 3° thickness of a light absorbing portion ($D_c$ in FIG. 22): 102 µm thickness of the optical functional layer: 127 µm material and refractive index of the light transmissive portions: ultraviolet curable urethane acrylate resin having a refractive index of 1.56 material and refractive index of the light absorbing portions: 20 mass % of a carbon black—containing acrylic beads having a mean particle diameter of 4 µm was dispersed in an ultraviolet curable urethane acrylate resin having a refractive index of 1.49

(Light Entering Side Light Controlling Layer)

thickness of the supporting layer (thickness of the supporting layer $335a$ in FIG. 23): 130 µm pitch of a unit optical element ($P_q$ in FIG. 22): 30 µm inclination angle of a main refracting face of a unit optical element ($\theta_{71}$ in FIG. 23): 5° inclination angle of a rise face ($\theta_{72}$ in FIG. 23): 90° material: ultraviolet curable urethane acrylate resin having a refractive index of 1.50

Test Example $E_2$

The structure was the same as that in Test Example $E_1$ except that the inclination angle of a main refracting face of a unit optical element ($\theta_{71}$ in FIG. 23) was 10°.

Test Example $E_3$

The structure was the same as that in Test Example $E_1$ except that the inclination angle of a main refracting face of a unit optical element ($\theta_{71}$ in FIG. 23) was 20°.

Test Example $E_4$

Figure 34:
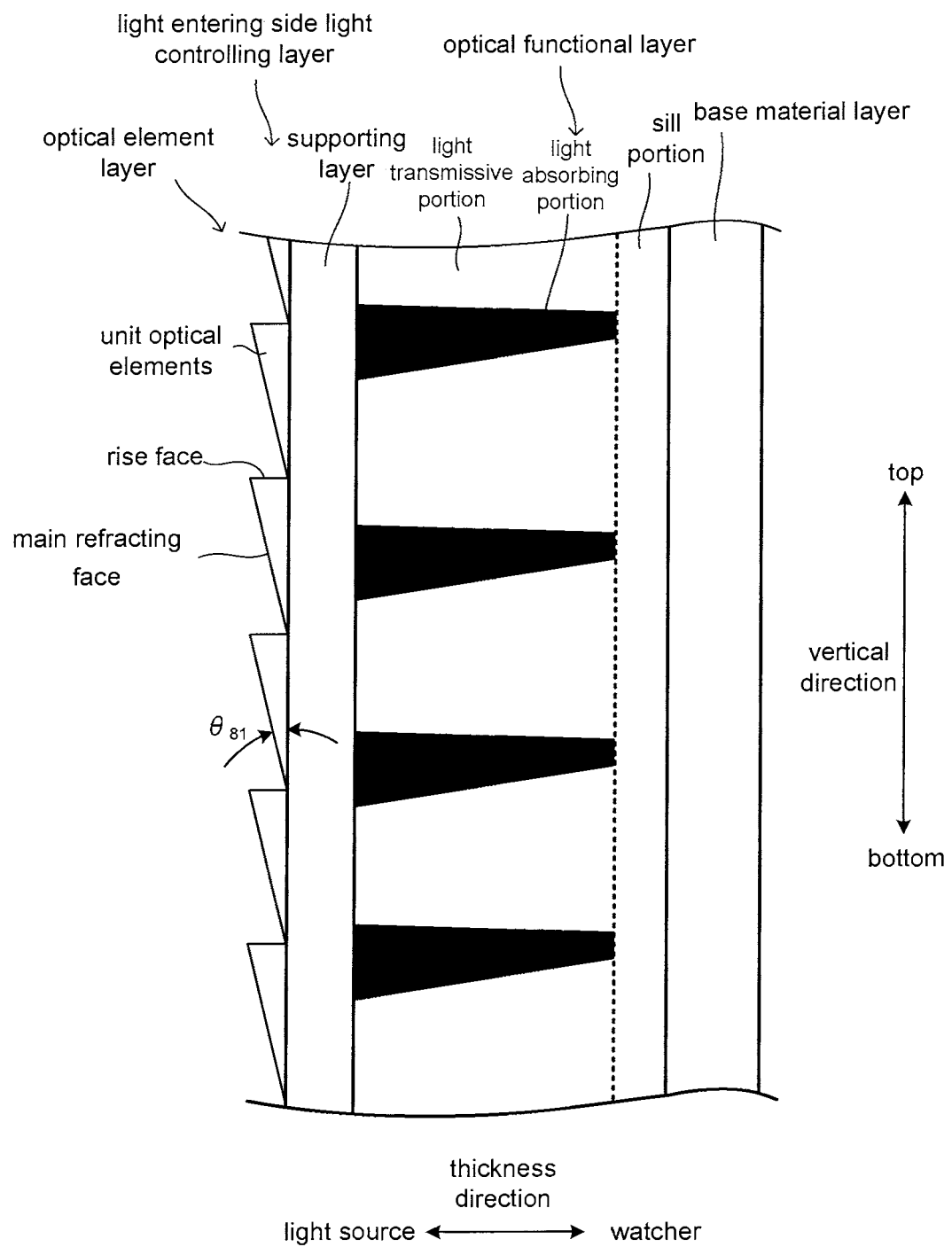
FIG. 34 is an explanatory view of the structure of an optical sheet of Test Example $E_4$.

As shown in FIG. 34, a main refracting face of a unit optical element inclined toward the light source side from the top to the bottom, and the angle of a main refracting face shown by $\theta_{81}$ in FIG. 34 was 5°. This state was defined as that the inclination angle of a main refracting face of a unit optical element is "−5°". The other structure was the same as that in Test Example $E_1$.

Test Example $E_5$

The structure was the same as that in Test Example $E_1$ except that the inclination angle of a main refracting face of a unit optical element ($\theta_{71}$ in FIG. 23) was 0°, that is, no optical element layer was formed.

[Structure of Display]

Surface light source devices were formed by using the optical sheets according to Test Example E, and by arranging the other components according to the example shown in FIG. 19.

[Method for Evaluation]

<Measurement Position>

Brightness at the viewing angles of the following three types was measured for each Test Example, and was represented as a brightness ratio to a brightness of each type which was defined as 100% when a light source was lit as the optical sheet was excluded from the surface light source device, which is the example shown in FIG. 19.

(1) brightness ratio based on brightness from the center of a screen toward the direction of the normal line of the screen (front brightness)

(2) brightness ratio based on a brightness at a viewing angle of 40° in the horizontal direction and 20° upward in the vertical direction, with the center of the screen (so-called driver's point of view). A driver's point of view means a point of view when a display of a car navigation system etc. is seen from a driver's seat in a case where the display is arranged in the middle of the driver's seat and the passenger seat in an automobile.

(3) brightness ratio based on the total brightness at a viewing angle of 0° in the horizontal direction and 40° to 80° (by 5°) upward in the vertical direction with the center of the screen (light causing reflection).

<Method for Measuring Brightness>

Brightness of a transmitted light at each of the viewing angles (1) to (3) was measured using an automatic goniophotometer (GP-500 by MURAKAMI COLOR RESEARCH LABORATORY CO., Ltd.).

[Results]

Figure 35A:
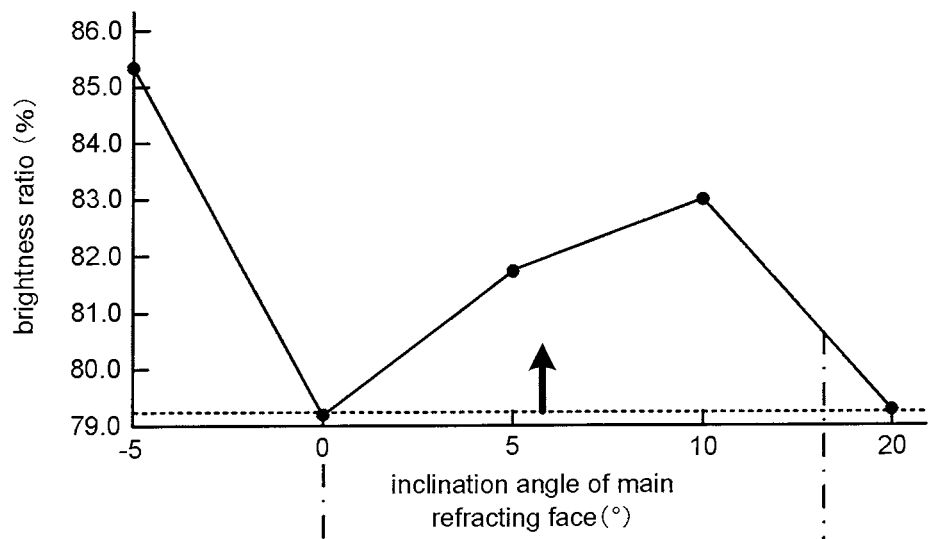
FIGS. 35A, 35B, and 35C are graphs showing the results of Test Example E.
Figure 35B:
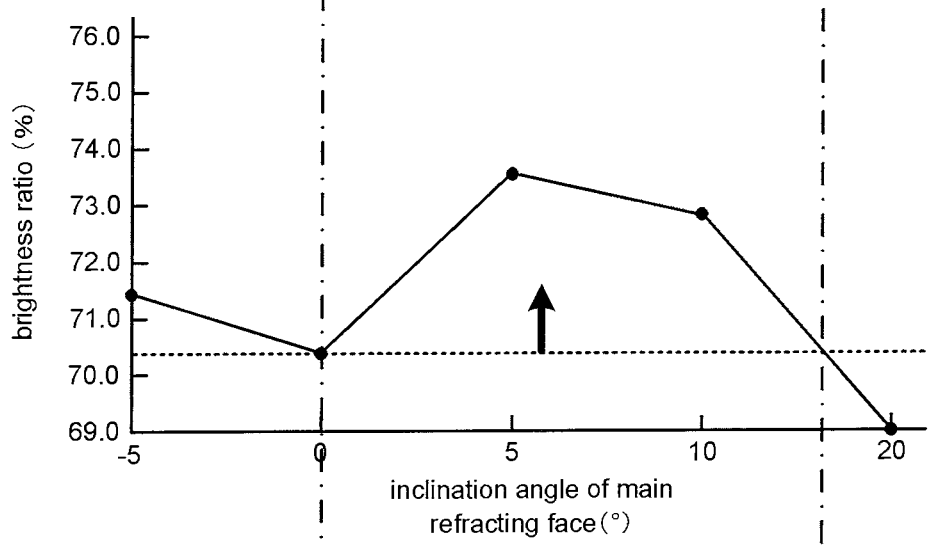
Figure 35C:
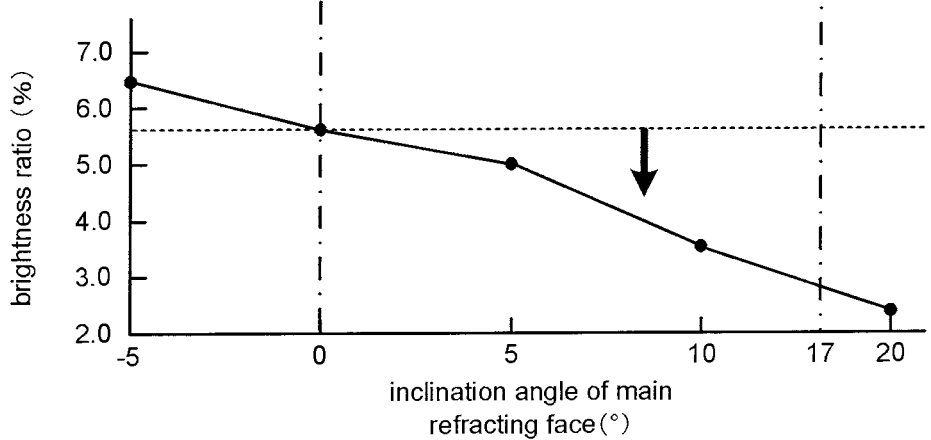

Table 2 shows the brightness ratio at each of the viewing angles. FIGS. 35A to 35C are graphs based on the results. FIG. 35A shows the results of (1), FIG. 35B shows the results of (2), and FIG. 35C shows the results of (3). In each graph, the dotted line represents the standard of the brightness ratio when the inclination angle of a main refracting face ($\theta_{71}$ in FIG. 23) is 0°.

TABLE 2

| | brightness ratio | | | | |
|---|---|---|---|---|---|
| viewing angle | $\theta_{81} = -5°$ (Test Ex. $E_4$) | $\theta_{71} = 0°$ (Test Ex. $E_5$) | $\theta_{71} = 5°$ (Test Ex. $E_1$) | $\theta_{71} = 10°$ (Test Ex. $E_2$) | $\theta_{71} = 20°$ (Test Ex. $E_3$) |
| (1) | 85.3% | 79.1% | 81.8% | 83.0% | 79.2% |
| (2) | 71.4% | 70.3% | 73.6% | 72.9% | 69.0% |
| (3) | 6.4% | 5.7% | 5.0% | 3.6% | 2.3% |

At the viewing angle (1), the brightness ratio is preferably higher than that when the inclination angle of the main refracting face is 0° as shown by the straight arrow in FIG. 35A. A high ratio means that the front brightness is high.

At the viewing angle (2), the brightness ratio is preferably higher than that when the inclination angle of the main refracting face is 0° as shown by the straight arrow in FIG. 35B. A high ratio means that brightness at the driver's point of view is high.

At the viewing angle (3), the brightness ratio is preferably lower than that when the inclination angle of the main refracting face is 0° as shown by the straight arrow in FIG. 35C. A low ratio means that reflection in a windshield can be suppressed when a display of a car navigation system etc. is arranged in the middle of the driver's seat and the passenger seat in an automobile.

In view of the above, an inclination angle satisfying all the preferred results for (1) to (3) is between two dashed-and-dotted lines; specifically, such a form that the inclination angle of a main refracting face of a unit optical element included in the light entering side light controlling layer ($\theta_{71}$ in FIG. 23) is more than 0° and less than 17° satisfies all the preferred results. This makes it possible to easily control light so as to satisfy a plurality of optical characteristics in a well-balanced manner.

REFERENCES SIGN LIST

10, 210, 310, image source unit
15 liquid crystal panel
20, 220, 320 surface light source device
21 light guiding plate 25 light source
26 light diffusion plate
27 prism layer
28 reflection type polarizing plate
30, 230, 330 optical sheet
31, 231 base material layer
32, 232, 332 optical functional layer
33, 233, 333 light transmissive portion
34, 234, 334 light absorbing portion
35, 135, 235 light exiting side light controlling layer (light controlling layer)
35b, 135b, 235b, 335b optical element layer
35c, 135c, 235c, 335c unit optical element
35d, 135d, 235d, 335d main refracting face
35e, 135e, 235e, 335e rise face
335 light entering side light controlling layer (light controlling layer)

The invention claimed is:

1. An optical sheet that is made of a plurality of laminated layers, the optical sheet comprising:
  an optical functional layer that is one of a plurality of the laminated layers; and
  an optical element layer that is another one of a plurality of the laminated layers,
  wherein the optical functional layer has a plurality of light transmissive portions extending in one direction, the light transmissive portions being arranged at intervals in a direction different from the one direction, and a light absorbing portion that is arranged between respective adjacent light transmissive portions,
  the optical element layer extends so as to be offset from the one direction at an angle of 0° to 45° in a front view of the optical sheet, the optical element layer having a plurality of unit optical elements that are ridges aligned in a direction different from a direction in which the optical element layer extends,
  wherein $P_{mx}$ is no more than 10000 (μm),
  wherein an aligning pitch of the light transmissive portions is $P_a$ (μm), an aligning pitch of the unit optical elements is $P_o$ (μm), and a and b are each integers of 1 to 10,
  wherein $P_m = |(a \cdot P_a \cdot b \cdot P_o)/(a \cdot P_a - b \cdot P_o)|$, and
  wherein a largest $P_m$ obtained by all combinations of a and b for $P_a$ and $P_o$ is $P_{mx}$ (μm).

2. The optical sheet according to claim 1, wherein each of the light transmissive portions has a trapezoidal cross section, a longer lower base of the trapezoidal cross section facing the unit optical elements.

3. The optical sheet according to claim 1, wherein each of the unit optical elements has a main refracting face, a rise face, and a triangular cross section, and
  wherein the main refracting face is a face inclining in a direction of a normal line of a light exiting face of the optical functional layer at more than 45° and no more than 89°.

4. The optical sheet according to claim 3, wherein an angle formed by one of the main refracting faces of the unit optical elements and the normal line of the light exiting face of the optical functional layer is different between a central area of the optical sheet and an outer circumferential area of the optical sheet.

5. The optical sheet according to claim 4, wherein the optical element layer is made of a linear Fresnel lens.

6. The optical sheet according to claim 1, wherein each of the unit optical elements has a main refracting face, a rise face, and a triangular cross section, and
  wherein the main refracting face inclines toward a face of the optical functional layer at more than 0° and less than 17°.

7. The optical sheet according to claim 6, wherein each of the light transmissive portions has a trapezoidal cross section, a shorter upper base of the trapezoidal cross section facing the unit optical elements.

8. The optical sheet according to claim 1, wherein a surface of each of the unit optical elements is formed into a rough face.

9. A light controlling member, wherein the number of the optical sheets according to claim 1 arranged is at least two, and
  wherein an extending direction of the light transmissive portions of one of the optical sheets and that of the light transmissive portions of another one of the optical sheets cross each other in the front view of the optical sheets.

10. A surface light source device comprising:
  a light source; and
  the optical sheet according to claim 1, the optical sheet being arranged closer to a watcher than the light source is.

11. A surface light source device comprising:
  a light source; and
  the light controlling member according to claim 9, the light controlling member being arranged closer to a watcher than the light source is.

12. An image source unit comprising:
  the surface light source device according to claim 10; and
  a liquid crystal panel that is arranged on a light exiting side of the surface light source device.

13. The image source unit according to claim 12, wherein the light transmissive portions, the light absorbing portion, and the unit optical elements extend in a horizontal direction, and are aligned in a vertical direction.

14. A display comprising:
  a housing; and
  the image source unit according to claim 12, the image source unit being housed in the housing.

* * * * *